(12) United States Patent
Christiansen

(10) Patent No.: US 7,206,669 B2
(45) Date of Patent: *Apr. 17, 2007

(54) TWO-WIRE CONTROLLING AND MONITORING SYSTEM FOR THE IRRIGATION OF LOCALIZED AREAS OF SOIL

(75) Inventor: Tom N. Christiansen, Hørsholm (DK)

(73) Assignee: S-Rain Control A/S, Kvistgaard (DK)

( * ) Notice: Subject to any disclaimer, the term of this patent is extended or adjusted under 35 U.S.C. 154(b) by 0 days.

This patent is subject to a terminal disclaimer.

(21) Appl. No.: 11/352,932

(22) Filed: Feb. 13, 2006

(65) Prior Publication Data

US 2006/0206239 A1    Sep. 14, 2006

Related U.S. Application Data

(63) Continuation-in-part of application No. 11/283,028, filed on Nov. 18, 2005, which is a continuation of application No. 10/886,395, filed on Jul. 7, 2004, now Pat. No. 6,993,416, which is a continuation of application No. 09/721,461, filed on Nov. 22, 2000, now Pat. No. 6,766,221, which is a continuation of application No. PCT/DK00/00635, filed on Nov. 15, 2000.

(30) Foreign Application Priority Data

Nov. 25, 1999    (EP) .................... 99610074

(51) Int. Cl.
G05D 11/00    (2006.01)
(52) U.S. Cl. .................... 700/284; 239/69; 137/78.2
(58) Field of Classification Search ................ 700/284, 700/19, 3, 9, 22, 282–283; 239/63, 67, 69; 137/78.2, 624.11, 624.12, 624.22
See application file for complete search history.

(56) References Cited

U.S. PATENT DOCUMENTS

| | | |
|---|---|---|
| 3,723,753 A | 3/1973 | Davis |
| 4,004,612 A | 1/1977 | Hummel, Jr. et al. |
| 4,007,458 A | 2/1977 | Hollabaugh |
| 4,131,882 A | 12/1978 | Hollabaugh et al. |
| 4,176,395 A | 11/1979 | Evelyn-Veere et al. |
| 4,535,401 A | 8/1985 | Penn |
| 5,570,030 A | 10/1996 | Wightman |
| 5,848,609 A | 12/1998 | Marchesseault et al. |

(Continued)

*Primary Examiner*—Zoila Cabrera
(74) *Attorney, Agent, or Firm*—Klein, O'Neill & Singh, LLP; Howard J. Klein

(57) ABSTRACT

A two-wire controlling and monitoring system for irrigation of localized areas of soil includes a water pipeline, a plurality of controllable irrigation valves, a plurality of field sensors measuring specific irrigation parameters, and a plurality of localized irrigation control units. Each irrigation control unit has a sensor decoder connected to a specific field sensor and/or a line decoder connected to a specific controllable irrigation valve. The system further includes a controller and power supply unit that applies a first alternating DC voltage signal to a two-wire cable interconnecting the controller and power supply unit and the irrigation control units. The two-wire cable provides power from the controller and power supply unit to each of the irrigation control units, it transmits schedules of instructions to the irrigation control units through the two-wire cable, and it receives the irrigation parameters from the irrigation control units through the two-wire cable.

39 Claims, 25 Drawing Sheets

U.S. PATENT DOCUMENTS 6,402,048 B1   6/2002   Collins
6,766,221 B1   7/2004   Christiansen
6,993,416 B2 *  1/2006   Christiansen ............... 700/284
2004/0130378 A1 *  7/2004   Kihara ....................... 327/362

* cited by examiner

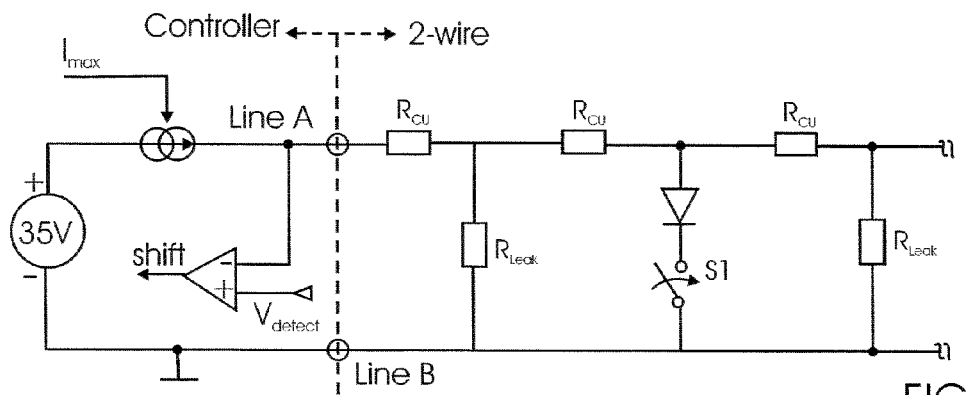
FIG. 17
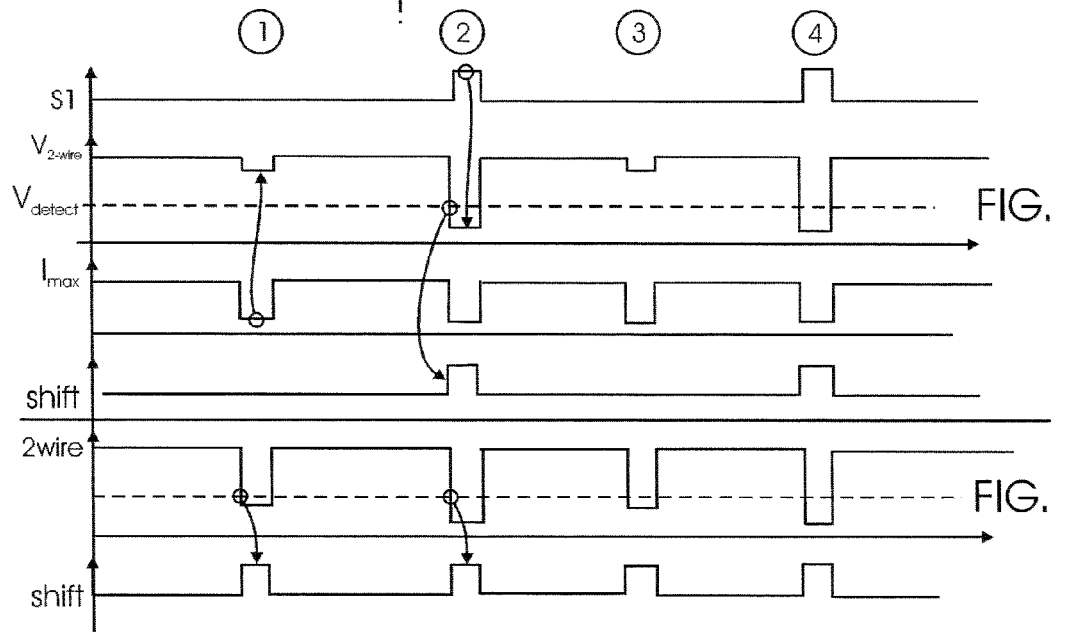
FIG. 18
FIG. 19

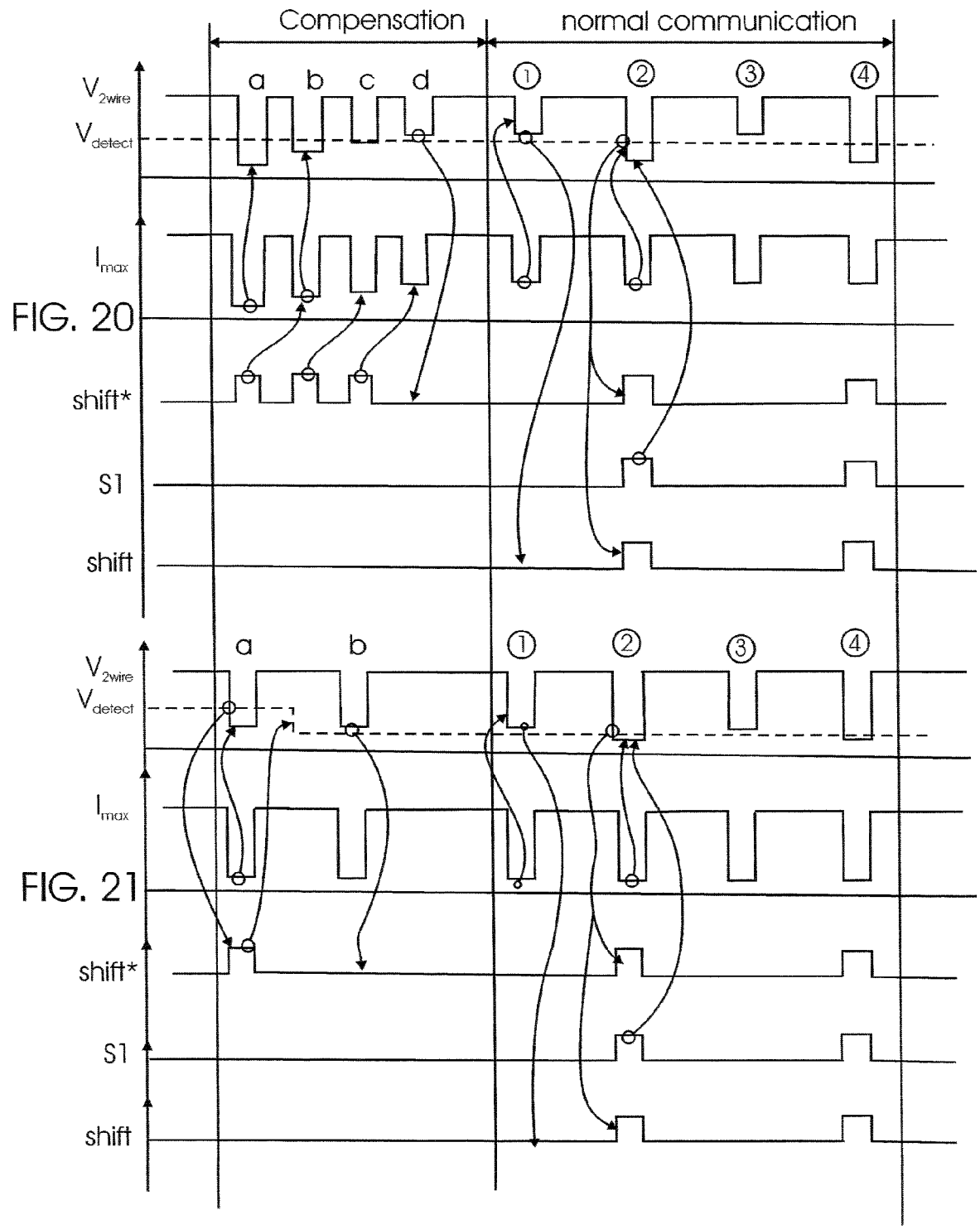

| 22A | 22B |
| 22C | 22D |

| 23A | 23B |
|---|---|
| 23C | 23D |

TWO-WIRE CONTROLLING AND MONITORING SYSTEM FOR THE IRRIGATION OF LOCALIZED AREAS OF SOIL

CROSS-REFERENCE TO RELATED APPLICATIONS

This application is a Continuation-in-Part of co-pending application Ser. No. 11/283,028, filed Nov. 18, 2005; which is a Continuation of application Ser. No. 10/886,395, filed Jul. 7, 2004, now U.S. Pat. No. 6,993,416; which is a Continuation of application Ser. No. 09/721,461, filed Nov. 22, 2000, now U.S. Pat. No. 6,766,221; which is a Continuation of International Application No. PCT/DK00/00635, filed Nov. 15, 2000. This application is also related to co-pending application Ser. No. 11/283,505, filed Nov. 18, 2005. The disclosures of all of these prior applications are expressly incorporated herein by reference.

FEDERALLY SPONSORED RESEARCH OR DEVELOPMENT

Not Applicable

BACKGROUND OF THE INVENTION

This invention relates generally to a two-wire controlling and monitoring system for, in particular, irrigation of localized areas of soil.

DESCRIPTION OF THE RELATED ART

The most commonly known two-wire irrigation control systems, such as control systems described in U.S. patents U.S. Pat. No. 3,723,753, U.S. Pat. No. 4,004,612, U.S. Pat. No. 4,007,458, U.S. Pat. No. 4,131,882, U.S. Pat. No. 4,176,395, U.S. Pat. No. 4,535,401, U.S. Pat. No. 5,570,030, U.S. Pat. Nos. 5,848,609 and 6,823,239 and in U.S. publication Ser. No. 10/886,395 to which reference is made and which are hereby incorporated in the present specification by reference, provide control of a number of remotely located irrigation or sprinkler valves from a central location by means of control signals encoded on to a single pair of power transmission lines linking a central encoder and a number of remote decoders.

The two-wire irrigation control system according to U.S. Pat. No. 4,007,458 encodes and transmits an address of a specific remotely located irrigation valve and on/off signals onto an alternating current signal (AC) by clipping half portions of the signal to represent zero values.

Similarly the two-wire interactive irrigation control system according to U.S. Pat. No. 4,176,395 transmits data by selectively clipping the original power frequency signal during eight consecutive cycles, suppressing the power frequency signal during the following full cycle, during which time a feedback signal may be transmitted from sensors located at specific areas, then transmitting eight undistorted power frequency cycles, and suppressing the power frequency signal for one following cycle, during which time a feedback signal relating to a portable operator may be transmitted.

Both two-wire irrigation control systems according to U.S. Pat. No. 4,007,458 and U.S. Pat. No. 4,176,395 communicate to remotely located irrigation valves or decoders by clipping of the power signals consistently while performing a transmission on the power line power to the remotely located irrigation valves or decoders is significantly reduced.

Furthermore the two-wire irrigation control systems according to U.S. Pat. No. 4,007,458 and U.S. Pat. No. 4,176,395 utilize sinusoidal signals for transmitting power to remotely located irrigation valves or decoders. Sinusoidal signals being AC signals generally need to be converted into DC in order to drive microprocessor electronic circuitry adding total costs of the two-wire irrigation systems for the electronics incorporated in the remotely located irrigation valves or decoders.

SUMMARY OF THE INVENTION

An object of the present invention is to provide a two-wire controlling and monitoring system for in particular controlling a plurality of controllable irrigation or sprinkler valves placed at specific localized areas, monitoring specific irrigation parameters at the specific localized areas and communicating through a two-wire cable with line and sensor decoders located at the specific localized areas while limiting above described power loss due to signalling on the two-wire cable.

Moreover it is an object of the present invention to compensate for leak currents in the two-wire cable.

A particular advantage of the present invention is the utilisation of a power supply signal for the operation of the controllable irrigation valves hence performing an improved power transmission within general safety specifications.

A further particular advantage of the present invention is the compensation of leak currents. The degree of compensation of the leak currents represents a measure of the quality of the signalling forth and back on and through the two-wire cable.

A particular feature of the present invention is an improved corrosion resistance.

The above object, the above advantage and the above feature together with numerous other objects, advantages and features which will be evident from the below detailed description of a preferred embodiment of the present invention is according to a first aspect of the present invention obtained by a two-wire controlling and monitoring system for in particular irrigation of localized areas of soil and comprising:

a water pipeline providing water to said localized areas of soil, a first plurality of controllable irrigation valves each positioned at a specific area of said localized areas of soil, communicating with said water pipeline, providing watering or non-watering of said specific area of said localized areas of soil and having a pair of valve control inputs, a second plurality of field sensors positioned at specific areas of said localized areas of soil, providing specific irrigation parameters and having a pair of sensor outputs, a third plurality of localized irrigation control units each comprising a sensor decoder having a pair of sensor inputs connected to said pair of sensor outputs of a specific field sensor of said second plurality of field sensors for providing power to said second plurality of field sensors and recording said specific irrigation parameters from said second plurality of field sensors and/or a line decoder having a pair of valve control outputs connected to said pair of valve control inputs of a specific controllable irrigation valve of said first plurality of controllable irrigation valves for providing valve control signals to said first plurality of controllable irrigation valves, said sensor decoder and said line decoder further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a current maximum having a third pulse width and defining a current minimum having a fourth pulse width to said pair of control and power outputs, a two-wire cable interconnecting said controller and power supply unit and said third plurality of localized irrigation control units and connecting said pair of control and power outputs of said controller and power supply unit to said control and power inputs of said third plurality of localized irrigation control units and providing said power from said controller and power supply unit to each of said third plurality of localized irrigation control units, and said controller and power supply unit transmitting said schedules of instructions to said third plurality of localized irrigation control units through said two-wire cable and receiving said specific irrigation parameters from said third plurality of localized irrigation control units through said two-wire cable.

According to the basic realization of the first aspect of the present invention the application of two alternating DC voltage signals having respectively inverted polarity on to the two-wire cable provides an improved power transmission with respect to prior art's application of sinusoidal voltage signals. The improvement is approximately a factor 2. Sinusoidal voltage signals although ideal for some purposes impose a restriction on maximum attainable power transmission during a time frame caused by the inherent shape of the voltage signal squared as compared to a square wave voltage signal squared. Furthermore, by relying on slow alternating DC voltage signals for powering of the decoders instead of relying on sinusoidal voltage signals having standard 50 Hz or 60 Hz network frequencies a less noise sensitive and subsequently cheaper circuit may be implemented, since relatively little attention should be given to noise considerations. Additionally, the square wave structure of the alternating DC voltage signal provides an ideal platform for carrying binary information, which will be further described below.

The water pipeline characteristic of the two-wire irrigation controlling and monitoring system according to the first aspect of the present invention is wholly or partly buried under ground, or the water pipeline is placed on the ground. Parts of the pipelines being above ground level provide movable sections that may easily be moved into positions according to the conditions of the local areas. Furthermore the water pipeline is constructed from plastic materials or metal materials such as iron, steel, copper, silver, gold or any alloys thereof in any combinations thereof. Generally plastic tubes are favourable since the price is low with respect to metal material pipes and since plastic tubes are more flexible rendering it possible to rearrange the layout of the pipes without causing severe expenses.

The first plurality of controllable irrigation valves according to the first aspect of the present invention are magnetically, electrically, hydraulically or pneumatically operated or combinations thereof. The first plurality of controllable irrigation valves according to the first aspect of the present invention is preferably electrically operated and opened by applying an inrush voltage or current signal followed by a hold voltage or current signal to the pair of valve control inputs and closed by applying no voltage or current signal to the pair of valve control inputs. Further according to the first aspect of the present invention the line decoders provide the inrush voltage, the hold voltage and the zero voltage to the first plurality of controllable irrigation valves by supplying from the pair of valve control outputs a pulsed alternating DC control signal to the pair of valve control inputs in accordance with the transmitted schedules of instructions. The pulsed alternating DC voltage signal defines a maximum differential voltage in the range of 25V to 45V such as ranges 27V to 43V or 30V to 40V or preferably the maximum differential voltage is 35V, defines a minimum differential voltage in the range of 0V to 5V such as ranges 0V to 3V or 0V to 1V or preferably the minimum differential voltage is 0V and defines a line decoder output pulse width in the range of 10 µs to 0.1 s such as ranges 200 µs to 2 ms or 800 µs to 1.25 ms or preferably the line decode output pulse width is 1 ms. The line decoder output pulse width defines a first part having the maximum differential voltage and a second part having the minimum differential voltage. The pulsed alternating DC voltage signal constitutes the inrush voltage by having the first part longer than or equal to the second part during a period in the range 10 ms to 1 s such as 30 ms to 100 ms and constitutes the hold voltage by having the first part shorter than the second part during a period determined in accordance with the schedule of instructions transmitted to the line decoders by the controller and power supply unit. The parts may have any particular lengths to provide for any composition of signals generating a wide variety of average voltages, however the composition described above is optimal for driving an electrically driven irrigation valve with respect to power consumption of the line decoder.

The first pulse width of the first and second alternating DC voltage signals according to the first aspect of the present invention is equal to the second pulse width, is smaller than the second pulse width or is greater than the second pulse width. Preferably the first pulse width is substantially equal to the second pulse width thereby constituting a square wave voltage signal.

The first alternating DC voltage signal and the second alternating DC voltage signal according to the first aspect of the present invention alternate with a frequency less than AC frequency of power networks such as 50 Hz or 60 Hz. The first pulse width of the first alternating DC voltage signal and the second alternating DC voltage signal is in the range 100 ms to 10 s such as ranges 200 ms to 2 s, 300 ms to 1 s, 400 ms to 800 ms, 450 ms to 550 ms, 475 ms to 525 ms or 490 ms to 510 ms, or preferably the first pulse width is 500 ms and the second pulse width of the first alternating DC voltage signal and the second alternating DC voltage signal is in the range 100 ms to 10 s such as ranges 200 ms to 2 s, 300 ms to 1 s, 400 ms to 800 ms, 450 ms to 550 ms, 475 ms to 525 ms or 490 ms to 510 ms, or preferably the second pulse width is 500 ms. By reducing frequency of alternation, toggling or inversion of the first and the second alternating DC voltage signals the noise sensitivity of the circuitry is reduced and furthermore the tolerances as to acceptable accuracy of pulse widths is shifted from µs range to ms range.

The first alternating DC voltage signal and the second alternating DC voltage signal according to the first aspect of the present invention during the first pulse width and the second pulse width averages voltages greater than or equal to zero voltage. Alternatively, the first alternating DC voltage signal and the second alternating DC voltage signal during the first pulse width and the second pulse width averages voltages less than or equal to zero voltage. In particular the first alternating voltage signal and the second alternating voltage signal during the first pulse width and the second pulse width averages an average voltage in the range −5V to −0.5V such as ranges −4V to −1V or −2.5V to −1.5V, or preferably the average voltage is −2V. The voltage maximum of the first and second alternating DC voltage signals according to the first aspect of the present invention is in a range from +10V to +20V, such as ranges +13V to +19V or +14V to +17V, or preferable the voltage maximum is +15V and the voltage minimum in a range from −15V to −25V, such as ranges −17V to −23V and −19V to −21V, or preferable the voltage minimum is −20V. By applying a numerically larger minimum voltage compared to maximum voltage off setting the average voltage below ground voltage the risk for deterioration of the two-wire cable caused by corrosion is significantly reduced since the deterioration of the two-wire cable at locations where the presence of an insulating layer around the two-wire cable has been damaged will be based on an alkaline process. The alkaline process donates electrons to the ground level due to the voltage difference and accepts a layer of ions substituting the missing electrons and thus the layer of ion creates a saturation layer at the exposed part of the two-wire cable reducing further corrosion of the two-wire.

The maximum current according to the first aspect of the present invention is in the range of 0.5 A to 2 A such as 0,75 A to 1.5 A and e.g. preferably the maximum current is 1.1 A, and the minimum current is in the range 20 mA to 150 mA such as ranges 30 mA to 100 mA or 35 mA to 85 mA, or preferably the minimum current is 40 mA. Additionally, the third pulse width defining a part of the alternating DC current signal is greater than the fourth pulse width, and the fourth pulse width defining another part of the alternating DC current signal is in the range 0.1 ms to 10 ms such as range 0.5 ms to 7 ms or preferably the fourth pulse width is shorter than 5 ms. The alternating DC current signal provides low current sequences during which communication may be performed from irrigation control units placed at specific locations to the controller and power supply unit.

Communication from the controller and power supply unit to the irrigation control units placed at specific locations may consist of schedules of instructions according to the first aspect of the present invention. The schedules of instructions are transmitted onto the two-wire system by re-scaling the first pulse width or the second pulse width of the first and second alternating DC voltage signals to a fifth pulse width in the range 10 ms to 49 ms such as ranges 15 ms to 35 ms or 17 ms to 25 ms, or preferably the fifth pulse width is 20 ms indicating a binary "1", or by re-scaling the first pulse width or the second pulse width of the first and second alternating DC voltage signals to a sixth pulse width in the range 0.5 ms to 9 ms such as ranges 1 ms to 8 ms or 2 ms to 5 ms, or preferably the sixth pulse width is 5 ms indicating binary "0". By modulating pulse width of the first and second alternating DC voltage signals instead of clipping of portions of the voltage signals significantly improves power transmission from the controller and power supply unit to the irrigation control units while providing ingenious means for communication.

The transmitted schedules of instructions according to the first aspect of the present invention comprise a type declaration determining additional content of a transmission from the controller and power supply unit to the third plurality of localized irrigation control units. The additional content such as an address of a specific designated localized irrigation control unit of the third plurality of localized irrigation control units, data disclosing information regarding actions to be taken by the specific designated localized irrigation control unit of the third plurality of localized irrigation control units and/or a first check and a second check ensuring a safe reception of the transmission is terminated by stop signal having a seventh pulse width. The seventh pulse width is in the range 50 ms to 70 ms such as 55 ms to 65 ms, or preferably the seventh pulse width is 60 ms. The content of transmissions may have numerous purposes and achieve numerous tasks and provide means for performing a wide variety of transmissions comprising a plurality of information types.

The above described type declaration comprising 4 bits provides 16 optional operations such as Arbitration, Data, Control (On/Off), Broadcast, Test and Pole leaving room for still 10 possible operations which according to today's needs is sufficient. However an increase of the transmission size of the type declaration to 8, 16 or 32 bits will even further expand the possible variety of operations.

The address of the specific designated localized irrigation control unit of the third plurality of localized irrigation control units comprises an address transmission size in the range 0 to 128 bits such as ranges 0 to 64 bits or 0 to 32, or the address transmission size is preferably 16 bits. The address transmission size determines the maximum number of possible communicative or addressable irrigation control units connected to the controller and power supply. Therefore, if additional irrigation control units are needed for either operation of sensors or control of irrigation valves the address transmission size may be extended accordingly.

The data disclosing information regarding actions to be taken by the specific designated localized irrigation control unit of the third plurality of localized irrigation control units comprises a data transmission size in the range of 0 to 64 KBYTE. The data contained in a transmission may include information regarding timing of opening and closing of the controllable irrigation valves, however the data may include a wide variety of information.

The first check and the second check ensuring a safe reception of the transmission comprise a check transmission size in the range 0 to 128 bits such as ranges 0 to 64 bits or 0 to 32 bits or preferably the check transmission size is 4 bit for each of the first and second check. The first and second check provides means for checking if transmitted information has been properly received.

The controller and power supply unit according to the first aspect of the present invention comprises a microprocessor, a storage unit for storing the schedules of instructions, an output section for providing power to the two-wire cable and transmitting the schedules of instruction on the two-wire cable, and an input section for monitoring voltage of the two-wire cable. An interrupt window is initiated following a DC alternation of the first alternating DC voltage signal and the second alternating DC voltage signal and a power supply period. The power supply period is in the range 250 ms to 550 ms such as ranges 300 ms to 500 ms or 350 ms to 450 ms, or preferably the power supply time period is 400 ms and the interrupt window is in the range of 0 ms to 20 ms or preferably the interrupting window is shorter than 5 ms. The microprocessor controls the output section to apply the minimum current to the two-wire cable during an interrupt window. The interrupt window allows the sensor decoders or line decoders to perform an interrupt during which the decoders may communicate information to the controller and power supply unit.

Each of the sensor decoders and/or line decoders comprises a short circuiting circuit providing an interrupt signal during the interrupt window to the controller and power supply unit by unidirectional short circuiting the pair of control and power supply inputs hence reducing differential voltage of the two-wire cable and no interrupt signal by open circuiting the pair of control and power supply inputs. The interrupt signal is constituted by a voltage drop of the differential voltage of the two-wire cable in the range 5V to 35V such as range 15V to 30V, or preferably the voltage drop is 25V thus the differential voltage is 10V. Hence the voltage of the two-wire cable during the interrupt signals is negative relative to ground voltage e.g. −10V, and therefore the alkaline process described earlier is maintained during interrupt signals. The microprocessor records the interrupt signal from at least one sensor decoder and/or line decoder of the third plurality of localized irrigation control units through the input section monitoring voltage of the two-wire cable and subsequently operates the output section to perform a DC alternation of the first alternating DC voltage signal and the second alternating DC voltage signal and operates the output section to terminate the interrupt window and apply the maximum current to the two-wire cable. Additionally, the microprocessor following a recording of the interrupt signal from at least one interrupting sensor decoder and/or line decoder of the third plurality of localized irrigation control units performs a DC alternation of the first alternating DC voltage signal and the second alternating DC voltage signal and transmits the type declaration Arbitration followed by a series of binary "1"s including an answer window for the at least one interrupting sensor decoder and/or line decoder of the third plurality of localized irrigation control units to answer as described below to the binary "1". The answer window is initiated following a DC alternation of the first alternating DC voltage signal and the second alternating DC voltage signal and a pause period, the pause period is in the range 2 ms to 10 ms such as ranges 3 ms to 8 ms or 4 ms to 6 ms, or preferably the pause period is 5 ms. The answer window is in the range of 0 ms to 20 ms or preferably the answer window is shorter than 2.5 ms. The series of binary "1"s constitute an opportunity for the interrupting decoder to answer yes or no during an answer window in accordance with the interrupting decoder's address. By selecting a series of binary "1"s for obtaining the address from the interrupting decoder the shortest Arbitration transmission is achieved since in case of several interrupting decoders the decoder with the lowest address will be addressed first and decoders with higher addresses will be addressed subsequently at next possible interrupt.

As in the case of the interrupt signal the short circuiting circuit provides an answer signal during the answer window to the controller and power supply unit by unidirectional short circuiting the pair of control and power supply inputs hence reducing differential voltage of the two-wire cable and no answer signal by open circuiting the pair of control and power supply inputs. The answer signal is constituted by a voltage drop of the differential voltage on the two-wire cable in the range 5V to 35V such as range 15V to 30V, or preferably the voltage drop is 25V or the differential voltage is 10V. Hence the voltage of the two-wire cable during the answer signals is negative relative to ground voltage e.g. −10V, and therefore the alkaline process described above is maintained during the answer window. The microprocessor interprets the answer signal as an indication of a binary "0" and no answer signal as a binary "1".

The microprocessor according to the first aspect of the present invention further controls the output section to supply the minimum current to the two-wire cable during the answer window, so as to avoid unnecessary power loss caused by answering decoders transmission of binary "0"s. As soon as the answer form the answering decoder is detected by the controller and power supply unit the controller and power supply unit applies the maximum current to the two-wire cable. Hence the power loss is significantly reduced as compared to techniques in state of the art control irrigation systems.

The second plurality of field sensors according to the first aspect of the present invention comprises a selection of temperature sensors, humidity sensors, pressure sensors, magnetic field sensors, mechanical movement sensors, mechanical strain sensors, flow sensors, fertiliser sensors or any combination thereof. The objective of these sensors is to provide specific parameters giving a complete picture of the conditions of the specific localized areas and may further be implemented in a wide variety of ways in order to obtain specific requested information regarding the conditions of the ground. A further objective of these sensors is to provide irrigation parameters giving a complete picture of the working conditions, functionality and operation of the controllable irrigation valves.

The controller and power supply unit according to the first aspect of the present invention during a declared type of transmission of schedules of instructions requests the specific irrigation parameters from an addressed sensor decoder of the third plurality of localized irrigation control units and subsequently the controller and power supply unit transmits a series of binary "1" including the answer window for the addressed decoder to answer to the binary "1". The microprocessor records the answer signal from at least one sensor decoder of the third plurality of localized irrigation control units through the input section monitoring the voltage of the two-wire cable and operates the output section to perform a DC alternation of the first alternating DC voltage signal and the second alternating DC voltage signal and subsequently operates the output section to terminate the answer window and apply the maximum current to the two-wire cable. The term DC alternation is to be conceived as a generic term for toggle, inversion or switching between the maximum and minimum voltages of the first and second alternating DC voltage signal. By implementing the communication from the irrigation control units as described above a series of advantages are achieved. The two-wire irrigation controlling and monitoring system consumes little power during normal operation and during transmission of information between the controller and power supply unit and the irrigation control units. By accomplishing the transmission of information using a pulse width defining a binary "1" and a pulse width defining a binary "0" the two-wire irrigation controlling and monitoring system provides an undisturbed power transmission at the same time as exchange of information.

The above objects, the above advantages and the above features together with numerous other objects, advantages and features which will be evident from the below detailed description of a preferred embodiment of the present invention is according to a second aspect of the present invention obtained by a method for controlling and monitoring in particular irrigation of localized areas of soil and comprising the following steps of:

provicing water to said localized areas of soil through a water pipeline, controlling discharge or supply of water from said water pipeline, providing watering or non-watering of a specific area of said localized areas of soil through a first plurality of controllable irrigation valves each positioned at said specific area of said localized areas of soil and said first plurality of controllable irrigation valves having a pair of valve control inputs, measuring specific irrigation parameters through a second plurality of field sensors positioned at said specific areas of said localized areas of soil and said second plurality of field sensors having a pair of sensor outputs, transmitting control signals to said first plurality of controllable irrigation valves and said second plurality of field sensors though a third plurality of localized irrigation control units comprising a sensor decoder and a line decoder, providing valve control signals to said first plurality of controllable irrigation valves and/or recording said specific irrigation parameters from said second plurality of field sensors, each of said third plurality of localized irrigation control units having a pair of valve control outputs connected to the pair of valve control inputs of a specific controllable irrigation valve of said first plurality of controllable irrigation valves and/or a pair of sensor inputs connected to said pair of sensor outputs of a specific field sensor of the second plurality of field sensors and having a pair of control and power supply inputs, providing a set of schedules of instructions by means of a controller and power supply unit having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to said first alternating DC voltage signal to another of said pair of control and power outputs and applying an alternating DC current defining a current maximum having a third pulse width and defining a current minimum having a fourth pulse width to said pair of control and power outputs, providing a two-wire cable, interconnecting said controller and power supply unit and said third plurality of localized irrigation control units through a two-wire cable connecting said pair of control and power outputs of said controller and power supply unit to said control and power inputs of said third plurality of localized irrigation control units and providing said power from said control and power unit to each of said third plurality of localized irrigation control units, and transmitting said schedules of instructions from said controller and power supply unit to said third plurality of localized irrigation control units through said two-wire cable and receiving said specific irrigation parameters from said third plurality of localized irrigation control units through said two-wire cable.

The method according to the second aspect of the present invention describes operation of a two-wire controlling and monitoring system which includes any of the above discussed features and provides a method for achieving significant reductions in power consumption relative to today's state of the art.

The above objects, the above advantages and the above features together with numerous other objects, advantages and features which will be evident from the below detailed description of a preferred embodiment of the present invention is according to a third aspect of the present invention obtained by a localized irrigation control unit for a two-wire controlling and monitoring system including a controller and power supply unit and for in particular irrigation of localized areas of soil and said localized irrigation control unit comprising:

a field sensor decoder for receiving input signals from a field sensor, converting said input signals to a binary number and transmitting said binary number to said controller and power supply unit, and a line decoder for receiving instructions from said controller and power supply unit or a mark sender unit, converting said instructions to a control signal and providing said control signal to a controllable irrigation valve.

The localized irrigation control unit according to the third aspect of the present invention provides means for irrigating of the localized areas, means for measuring of specific irrigation parameters describing the conditions of the localized areas, means for communicating with the mark sender unit and means performing communication with the controller and power supply unit. The localized irrigation control unit circuitry may be implemented for carrying out communication on a two-wire conducting cable, but may however be implemented for carrying out communication on optic cables or be implemented for carrying out communication through radio transmitted signals. The input signals comprising analogue voltage signals, analogue current signals, digital pulse count signals, digital pulse width modulation signals or digital pulse frequency modulation signals or any combinations thereof. The mark sender provides the possibility for manually controlling the operation of the controllable irrigation valves irrespective of the schedules of instructions transmitted by the controller and power supply unit. The mark sender ensures that an operator may initiate irrigation at localized areas by transmitting control signals to the controllable irrigation valve from the mobile mark sender.

The sensor decoder included in the localized irrigation control unit according the third aspect of the present invention comprises a field sensor power supply and field sensor signal amplifier having a pair of sensor inputs connected to a pair of sensor outputs of a specific field sensor, a control and power supply input section having pair of control and power supply inputs connected to a two-wire cable interconnecting the sensor decoder and the controller and power supply unit, a short circuiting circuit having switching means connected between the pair of control and power supply inputs, and a first microprocessor unit interconnecting the field sensor power supply and field sensor signal amplifier and the short circuiting circuit.

The line decoder included in the localized irrigation control unit according the third aspect of the present invention comprises a control and power supply input section having a pair of control and power supply inputs connected to the two-wire cable interconnecting the line decoder and the controller and power supply unit, a valve control power output stage having at least one pair of valve control outputs connected to a pair of valve control inputs of a specific controllable irrigation valve, and a second microprocessor unit interconnecting the control and power supply input section and the valve control output.

The above object, the above advantage and the above feature together with numerous other objects, advantages and features which will be evident from the below detailed description of a preferred embodiment of the present invention is according to a fourth aspect of the present invention obtained by a two-wire controlling and monitoring system for in particular irrigation of localized areas of soil comprising:

a water pipeline providing water to the localized areas of soil, a first plurality of controllable irrigation valves each positioned at a specific area of the localized areas of soil, communicating with the water pipeline, providing watering of the specific area controlled by the controlling and monitoring system and having a pair of valve control inputs, a third plurality of localized irrigation control units each comprising a line decoder having a pair of valve control outputs connected to the pair of valve control inputs of a specific controllable irrigation valve of the first plurality of controllable irrigation valves for providing valve control signals to the first plurality of controllable irrigation valves, the line decoders further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to the first alternating DC voltage signal to another of the pair of control and power outputs and applying an alternating DC current defining a current maximum having a third pulse width and defining a current minimum having a fourth pulse width to the pair of control and power outputs, a two-wire cable interconnecting the controller and power supply unit and the third plurality of localized irrigation control units and connecting the pair of control and power outputs of the controller and power supply unit to the control and power inputs of the third plurality of localized irrigation control units and providing the power from the controller and power supply unit to each of the third plurality of localized irrigation control units, the controller and power supply unit transmitting the schedules of instructions to the third plurality of localized irrigation control units through the two-wire cable and receiving the specific irrigation parameters from the third plurality of localized irrigation control units through the two-wire cable, and a first time frame being defined in the first alternating DC voltage signal, within the first time frame of a first occurring first alternating DC voltage signal, the controller and power supply unit reducing the alternating DC current to a first short circuiting current detection level and measuring any reduction of the first alternating DC voltage signal, and within the first time frame of a succeeding first alternating DC voltage signal the controller and power supply unit increasing the first short circuiting current detection level to an increased first short circuiting current detection level so as to compensate any reduction of the first alternating DC voltage signal.

The two-wire controlling and monitoring system in the fourth aspect of the present invention further comprising:

a second time frame being defined in the second alternating DC voltage signal, within the second time frame of a first occurring second alternating DC voltage signal, the controller and power supply unit reducing the alternating DC current to the increased first short circuiting current detection level and measuring any reduction of the second alternating DC voltage signal, and within the second time frame of a succeeding second alternating DC voltage signal the controller and power supply unit increasing the increased first short circuiting current detection level to a second short circuiting current detection level so as to compensate any reduction of the second alternating DC voltage signal.

According to the basic realization of the fourth aspect of the present invention, during the first time frame the controller and power supply unit does not transmit the schedules of instructions to the third plurality of localized irrigation control units and during the second time frame the controller and power supply unit not transmitting the schedules of instructions to the third plurality of localized irrigation control units.

According to the basic realization of the fourth aspect of the present invention the controller and power supply unit subsequently applies during the first and second alternating DC voltage signals the increased first short circuiting current detection level and the second short circuiting current detection level.

According to the basic realization of the fourth aspect of the present invention the two-wire controlling and monitoring system further comprises a second plurality of field sensors positioned at specific areas of the localized areas of soil, providing specific irrigation parameters and having a pair of sensor outputs, and the third plurality of localized irrigation control units further comprises a sensor decoder having a pair of sensor inputs connected to the pair of sensor outputs of a specific field sensor of the second plurality of field sensors for providing power to the second plurality of field sensors and recording the specific irrigation parameters from the second plurality of field sensors, and the sensor decoders further each having a pair of control and power supply inputs.

The above object, the above advantage and the above feature together with numerous other objects, advantages and features which will be evident from the below detailed description of a preferred embodiment of the present invention is according to a fifth aspect of the present invention obtained by a two-wire controlling and monitoring system for in particular irrigation of localized areas of soil comprising:

a water pipeline providing water to the localized areas of soil, a first plurality of controllable irrigation valves each positioned at a specific area of the localized areas of soil, communicating with the water pipeline, providing watering of the specific area of the localized areas controlled by the controlling and monitoring system of soil and having a pair of valve control inputs, a second plurality of field sensors positioned at specific areas of the localized areas of soil, providing specific irrigation parameters and having a pair of sensor outputs, a third plurality of localized irrigation control units each comprising a sensor decoder having a pair of sensor inputs connected to the pair of sensor outputs of a specific field sensor of the second plurality of field sensors for providing power to the second plurality of field sensors and recording the specific irrigation parameters from the second plurality of field sensors, the sensor decoders further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to the first alternating DC voltage signal to another of the pair of control and power outputs and applying an alternating DC current defining a current maximum having a third pulse width and defining a current minimum having a fourth pulse width to the pair of control and power outputs, a two-wire cable interconnecting the controller and power supply unit and the third plurality of localized irrigation control units and connecting the pair of control and power outputs of the controller and power supply unit to the control and power inputs of the third plurality of localized irrigation control units and providing the power from the controller and power supply unit to each of the third plurality of localized irrigation control units, the controller and power supply unit transmitting the schedules of instructions to the third plurality of localized irrigation control units through the two-wire cable and receiving the specific irrigation parameters from the third plurality of localized irrigation control units through the two-wire cable, and a first time frame being defined in the first alternating DC voltage signal, within the first time frame of a first occurring first alternating DC voltage signal, the controller and power supply unit reducing the alternating DC current to a first short circuiting current detection level and measuring any reduction of the first alternating DC voltage signal, and within the first time frame of a succeeding first alternating DC voltage signal the controller and power supply unit increasing the first short circuiting current detection level to an increased first short circuiting current detection level so as to compensate any reduction of the first alternating DC voltage signal.

The two-wire controlling and monitoring system in the fifth aspect of the present invention further comprises a second time frame being defined in the second alternating DC voltage signal, within the second time frame of a first occurring second alternating DC voltage signal, the controller and power supply unit reducing the alternating DC current to the increased first short circuiting current detection level and measuring any reduction of the second alternating DC voltage signal, and within the second time frame of a succeeding second alternating DC voltage signal the controller and power supply unit increasing the increased first short circuiting current detection level to a second short circuiting current detection level so as to compensate any reduction of the second alternating DC voltage signal.

According to the basic realization of the fifth aspect of the present invention during the first time frame the controller and power supply unit does not transmit the schedules of instructions to the third plurality of localized irrigation control units and during the second time frame the controller and power supply unit does not transmit the schedules of instructions to the third plurality of localized irrigation control units.

According to the basic realization of the fifth aspect of the present invention the controller and power supply unit subsequently apply during the first and second alternating DC voltage signals the increased first short circuiting current detection level and the second short circuiting current detection level.

According to the basic realization of the fifth aspect of the present invention the third plurality of localized irrigation control units each further comprises a line decoder having a pair of valve control outputs connected to the pair of valve control inputs of a specific controllable irrigation valve of the first plurality of controllable irrigation valves for providing valve control signals to the first plurality of controllable irrigation valves, the line decoders further each having a pair of control and power supply inputs.

The above object, the above advantage and the above feature together with numerous other objects, advantages and features which will be evident from the below detailed description of a preferred embodiment of the present invention is according to a sixth aspect of the present invention obtained by a two-wire controlling and monitoring system for in particular irrigation of localized areas of soil and comprising:

a water pipeline providing water to the localized areas of soil, a first plurality of controllable irrigation valves each positioned at a specific area of the localized areas of soil, communicating with the water pipeline, providing watering of the specific area controlled by the controlling and monitoring system and having a pair of valve control inputs, a third plurality of localized irrigation control units each comprising a line decoder having a pair of valve control outputs connected to the pair of valve control inputs of a specific controllable irrigation valve of the first plurality of controllable irrigation valves for providing valve control signals to the first plurality of controllable irrigation valves, the line decoders further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to the first alternating DC voltage signal to another of the pair of control and power outputs and applying an alternating DC current defining a current maximum having a third pulse width and defining a current minimum having a fourth pulse width to the pair of control and power outputs, a two-wire cable interconnecting the controller and power supply unit and the third plurality of localized irrigation control units and connecting the pair of control and power outputs of the controller and power supply unit to the control and power inputs of the third plurality of localized irrigation control units and providing the power from the controller and power supply unit to each of the third plurality of localized irrigation control units, the controller and power supply unit transmitting the schedules of instructions to the third plurality of localized irrigation control units through the two-wire cable and receiving the specific irrigation parameters from the third plurality of localized irrigation control units through the two-wire cable, and a third time frame being defined in the first alternating DC voltage signal, and a first short circuit voltage signalling detection level being defined, within the third time frame the controller and power supply unit measuring a measuring level of the first alternating DC voltage signal for detecting any reduction of the first alternating DC voltage signal, and provided the measuring level of the first alternating DC voltage signal being below the first short circuit voltage signalling detection level, the first short circuit voltage signalling detection level being set below the measuring level of the first alternating DC voltage.

The two-wire controlling and monitoring system in the sixth aspect further comprises a fourth time frame being defined in the second alternating DC voltage signal, and a second short circuit voltage signalling detection level being defined, within the fourth time frame the controller and power supply unit measuring a measuring level of the second alternating DC voltage signal for detecting any reduction of the second alternating DC voltage signal, and provided the measuring level of the second alternating DC voltage signal being below the second short circuit voltage signalling detection level, the second short circuit voltage signalling detection level being set below the measuring level of the second alternating DC voltage signal.

According to the basic realization of the sixth aspect of the present invention during the third time frame the controller and power supply unit not transmitting the schedules of instructions to the third plurality of localized irrigation control units and during the fourth time frame the controller and power supply unit not transmitting the schedules of instructions to the third plurality of localized irrigation control units.

According to the basic realization of the sixth aspect of the present invention the controller and power supply unit subsequently apply during the first and second alternating DC voltage signals the first and second short circuiting voltage signalling detection levels.

According to the basic realization of the sixth aspect of the present invention the two-wire controlling and monitoring system further comprises a second plurality of field sensors positioned at specific areas of the localized areas of soil, providing specific irrigation parameters and having a pair of sensor outputs, and the third plurality of localized irrigation control units further comprising a sensor decoder having a pair of sensor inputs connected to the pair of sensor outputs of a specific field sensor of the second plurality of field sensors for providing power to the second plurality of field sensors and recording the specific irrigation parameters from the second plurality of field sensors, and the sensor decoders further each having a pair of control and power supply inputs.

The above object, the above advantage and the above feature together with numerous other objects, advantages and features which will be evident from the below detailed description of a preferred embodiment of the present invention is according to a seventh aspect of the present invention obtained by a two-wire controlling and monitoring system for in particular irrigation of localized areas of soil and comprising:

a water pipeline providing water to the localized areas of soil, a first plurality of controllable irrigation valves each positioned at a specific area of the localized areas of soil, communicating with the water pipeline, providing watering of the specific area of the localized areas controlled by the controlling and monitoring system of soil and having a pair of valve control inputs, a second plurality of field sensors positioned at specific areas of the localized areas of soil, providing specific irrigation parameters and having a pair of sensor outputs, a third plurality of localized irrigation control units each comprising a sensor decoder having a pair of sensor inputs connected to the pair of sensor outputs of a specific field sensor of the second plurality of field sensors for providing power to the second plurality of field sensors and recording the specific irrigation parameters from the second plurality of field sensors, the sensor decoders further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to the first alternating DC voltage signal to another of the pair of control and power outputs and applying an alternating DC current defining a current maximum having a third pulse width and defining a current minimum having a fourth pulse width to the pair of control and power outputs, a two-wire cable interconnecting the controller and power supply unit and the third plurality of localized irrigation control units and connecting the pair of control and power outputs of the controller and power supply unit to the control and power inputs of the third plurality of localized irrigation control units and providing the power from the controller and power supply unit to each of the third plurality of localized irrigation control units, the controller and power supply unit transmitting the schedules of instructions to the third plurality of localized irrigation control units through the two-wire cable and receiving the specific irrigation parameters from the third plurality of localized irrigation control units through the two-wire cable, and a third time frame being defined in the first alternating DC voltage signal, and a first short circuit voltage signalling detection level being defined, within the third time frame the controller and power supply unit measuring a measuring level of the first alternating DC voltage signal for detecting any reduction of the first alternating DC voltage signal, and provided the measuring level of the first alternating DC voltage signal being below the first short circuit voltage signalling detection level, the first short circuit voltage signalling detection level being set below the measuring level of the first alternating DC voltage signal.

The two-wire controlling and monitoring system in the seventh aspect further comprises a fourth time frame being defined in the second alternating DC voltage signal, and a second short circuit voltage signalling detection level being defined, within the fourth time frame the controller and power supply unit measuring a measuring level of the second alternating DC voltage signal for detecting any reduction of the second alternating DC voltage signal, and provided the measuring level of the second alternating DC voltage signal being below the second short circuit voltage signalling detection level, the second short circuit voltage signalling detection level being set below the measuring level of the second alternating DC voltage signal.

According to the basic realization of the seventh aspect of the present invention during the third time frame the controller and power supply unit does not transmit the schedules of instructions to the third plurality of localized irrigation control units and during the fourth time frame the controller and power supply unit does not transmit the schedules of instructions to the third plurality of localized irrigation control units.

According to the basic realization of the seventh aspect of the present invention the controller and power supply unit subsequently applying during the first and second alternating DC voltage signals the first and second short circuiting voltage signalling detection levels.

According to the basic realization of the seventh aspect of the present invention the third plurality of localized irrigation control units each further comprises a line decoder having a pair of valve control outputs connected to the pair of valve control inputs of a specific controllable irrigation valve of the first plurality of controllable irrigation valves for providing valve control signals to the first plurality of controllable irrigation valves, the line decoders further each having a pair of control and power supply inputs.

The above object, the above advantage and the above feature together with numerous other objects, advantages and features which will be evident from the below detailed description of a preferred embodiment of the present invention is according to an eighth aspect of the present invention obtained by a two-wire controlling and monitoring system for in particular irrigation of localized areas of soil and comprising:

a water pipeline providing water to the localized areas of soil, a first plurality of controllable irrigation valves each positioned at a specific area of the localized areas of soil, communicating with the water pipeline, providing watering of the specific area controlled by the controlling and monitoring system and having a pair of valve control inputs, a third plurality of localized irrigation control units each comprising a line decoder having a pair of valve control outputs connected to the pair of valve control inputs of a specific controllable irrigation valve of the first plurality of controllable irrigation valves for providing valve control signals to the first plurality of controllable irrigation valves, the line decoders further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to the first alternating DC voltage signal to another of the pair of control and power outputs and applying an alternating DC current defining a current maximum having a third pulse width and defining a current minimum having a fourth pulse width to the pair of control and power outputs, a two-wire cable interconnecting the controller and power supply unit and the third plurality of localized irrigation control units and connecting the pair of control and power outputs of the controller and power supply unit to the control and power inputs of the third plurality of localized irrigation control units and providing the power from the controller and power supply unit to each of the third plurality of localized irrigation control units, the controller and power supply unit transmitting the schedules of instructions to the third plurality of localized irrigation control units through the two-wire cable and receiving the specific irrigation parameters from the third plurality of localized irrigation control units through the two-wire cable, a first time frame being defined in the first alternating DC voltage signal, within the first time frame of a first occurring first alternating DC voltage signal, the controller and power supply unit reducing the alternating DC current to a first short circuiting current detection level and measuring any reduction of the first alternating DC voltage signal, and within the first time frame of a succeeding first alternating DC voltage signal the controller and power supply unit increasing the first short circuiting current detection level to an increased first short circuiting current detection level so as to compensate any reduction of the first alternating DC voltage signal, a second time frame being defined in the second alternating DC voltage signal, within the second time frame of a first occurring second alternating DC voltage signal, the controller and power supply unit reducing the alternating DC current to the increased first short circuiting current detection level and measuring any reduction of the second alternating DC voltage signal, and within the second time frame of a succeeding second alternating DC voltage signal the controller and power supply unit increasing the increased first short circuiting current detection level to a second short circuiting current detection level so as to compensate any reduction of the second alternating DC voltage signal, a third time frame being defined in the first alternating DC voltage signal, and a first short circuit voltage signalling detection level being defined, within the third time frame the controller and power supply unit measuring a measuring level of the first alternating DC voltage signal for detecting any reduction of the first alternating DC voltage signal, and provided the measuring level of the first alternating DC voltage signal being below the first short circuit voltage signalling detection level, the first short circuit voltage signalling detection level being set below the measuring level of the first alternating DC voltage signal, and a fourth time frame being defined in the second alternating DC voltage signal, and a second short circuit voltage signalling detection level being defined, within the fourth time frame the controller and power supply unit measuring a measuring level of the second alternating DC voltage signal for detecting any reduction of the second alternating DC voltage signal, and provided the measuring level of the second alternating DC voltage signal being below the second short circuit voltage signalling detection level, the second short circuit voltage signalling detection level being set below the measuring level of the second alternating DC voltage signal.

According to the basic realization of the eighth aspect of the present invention during the first and second time frames the controller and power supply unit does not transmit the schedules of instructions to the third plurality of localized irrigation control units and during the third and fourth time frames the controller and power supply unit does not transmit the schedules of instructions to the third plurality of localized irrigation control units.

According to the basic realization of the eighth aspect of the present invention the controller and power supply unit subsequently apply during the first and second alternating DC voltage signals the increased first short circuiting current detection level, the second short circuiting current detection level, and the first and second short circuit voltage signalling detection levels.

According to the basic realization of the eighth aspect of the present invention, the two-wire controlling and monitoring system further comprises a second plurality of field sensors positioned at specific areas of the localized areas of soil, providing specific irrigation parameters and having a pair of sensor outputs, and the third plurality of localized irrigation control units further comprising a sensor decoder having a pair of sensor inputs connected to the pair of sensor outputs of a specific field sensor of the second plurality of field sensors for providing power to the second plurality of field sensors and recording the specific irrigation parameters from the second plurality of field sensors, and the sensor decoders further each having a pair of control and power supply inputs.

The above object, the above advantage and the above feature together with numerous other objects, advantages and features which will be evident from the below detailed description of a preferred embodiment of the present invention is according to a ninth aspect of the present invention obtained by a two-wire controlling and monitoring system for in particular irrigation of localized areas of soil and comprising:

a water pipeline providing water to the localized areas of soil, a first plurality of controllable irrigation valves each positioned at a specific area of the localized areas of soil, communicating with the water pipeline, providing watering of the specific area of the localized areas controlled by the controlling and monitoring system of soil and having a pair of valve control inputs, a second plurality of field sensors positioned at specific areas of the localized areas of soil, providing specific irrigation parameters and having a pair of sensor outputs, a third plurality of localized irrigation control units each comprising a sensor decoder having a pair of sensor inputs connected to the pair of sensor outputs of a specific field sensor of the second plurality of field sensors for providing power to the second plurality of field sensors and recording the specific irrigation parameters from the second plurality of field sensors, the sensor decoders further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to the first alternating DC voltage signal to another of the pair of control and power outputs and applying an alternating DC current defining a current maximum having a third pulse width and defining a current minimum having a fourth pulse width to the pair of control and power outputs, a two-wire cable interconnecting the controller and power supply unit and the third plurality of localized irrigation control units and connecting the pair of control and power outputs of the controller and power supply unit to the control and power inputs of the third plurality of localized irrigation control units and providing the power from the controller and power supply unit to each of the third plurality of localized irrigation control units, the controller and power supply unit transmitting the schedules of instructions to the third plurality of localized irrigation control units through the two-wire cable and receiving the specific irrigation parameters from the third plurality of localized irrigation control units through the two-wire cable, a first time frame being defined in the first alternating DC voltage signal, within the first time frame of a first occurring first alternating DC voltage signal, the controller and power supply unit reducing the alternating DC current to a first short circuiting current detection level and measuring any reduction of the first alternating DC voltage signal, and within the first time frame of a succeeding first alternating DC voltage signal the controller and power supply unit increasing the first short circuiting current detection level to an increased first short circuiting current detection level so as to compensate any reduction of the first alternating DC voltage signal, a second time frame being defined in the second alternating DC voltage signal, within the second time frame of a first occurring second alternating DC voltage signal, the controller and power supply unit reducing the alternating DC current to the increased first short circuiting current detection level and measuring any reduction of the second alternating DC voltage signal, and within the second time frame of a succeeding second alternating DC voltage signal the controller and power supply unit increasing the increased first short circuiting current detection level to a second short circuiting current detection level so as to compensate any reduction of the second alternating DC voltage signal, a third time frame being defined in the first alternating DC voltage signal, and a first short circuit voltage signalling detection level being defined, within the third time frame the controller and power supply unit measuring a measuring level of the first alternating DC voltage signal for detecting any reduction of the first alternating DC voltage signal, and provided the measuring level of the first alternating DC voltage signal being below the first short circuit voltage signalling detection level, the first short circuit voltage signalling detection level being set below the measuring level of the first alternating DC voltage signal, and a fourth time frame being defined in the second alternating DC voltage signal, and a second short circuit voltage signalling detection level being defined, within the fourth time frame the controller and power supply unit measuring a measuring level of the second alternating DC voltage signal for detecting any reduction of the second alternating DC voltage signal, and provided the measuring level of the second alternating DC voltage signal being below the second short circuit voltage signalling detection level, the second short circuit voltage signalling detection level being set below the measuring level of the second alternating DC voltage signal.

According to the basic realization of the ninth aspect of the present invention during the first and second time frames the controller and power supply unit does not transmit the schedules of instructions to the third plurality of localized irrigation control units and during the third and fourth time frames the controller and power supply unit does not transmit the schedules of instructions to the third plurality of localized irrigation control units.

According to the basic realization of the ninth aspect of the present invention the controller and power supply unit subsequently apply during the first and second alternating DC voltage signals the increased first short circuiting current detection level, the second short circuiting current detection level, and the first and second short circuit voltage signalling detection levels.

According to the basic realization of the ninth aspect of the present invention the third plurality of localized irrigation control units each further comprises a line decoder having a pair of valve control outputs connected to the pair of valve control inputs of a specific controllable irrigation valve of the first plurality of controllable irrigation valves for providing valve control signals to the first plurality of controllable irrigation valves, the line decoders further each having a pair of control and power supply inputs.

According to the basic realization of the ninth aspect of the present invention the voltage maximum is in a range from +10V to +20V, such as ranges +13V to +19V or +14V to +17V, or preferable the voltage maximum is +15V and/or wherein the voltage minimum in a range from −15V to −25V, such as ranges −17V to −23V and −19V to −21V, or preferable the voltage minimum is −20V.

According to the basic realization of the ninth aspect of the present invention the first alternating DC voltage signal and the second alternating DC voltage signal during the first pulse width and the second pulse width averages voltages greater than or equal to zero voltage or wherein the first alternating DC voltage signal and the second alternating DC voltage signal during the first pulse width and the second pulse width averages voltages less than or equal to zero voltage and/or wherein the first alternating DC voltage signal and the second alternating DC voltage signal averages during the first pulse width and the second pulse width an average voltage in the range −5V to −0.5V such as ranges −4V to −1V or −2.5V to −1.5V, or preferably the average voltages are −2V.

BRIEF DESCRIPTION OF THE DRAWINGS

FIG. 17 shows a principle diagram of the controller and power supply unit supplying a DC voltage to the two-wire cable.

FIG. 18 shows a non-compensated system where leak currents is no problem.

FIG. 19 shows a compensated system where leak currents is a problem.

FIG. 20 shows a compensated system where leak currents are compensated for by means of current compensation.

FIG. 21 shows a compensated system where leak currents are compensated for by means of voltage compensation.

DETAILED DESCRIPTION OF THE INVENTION

Figure 1:
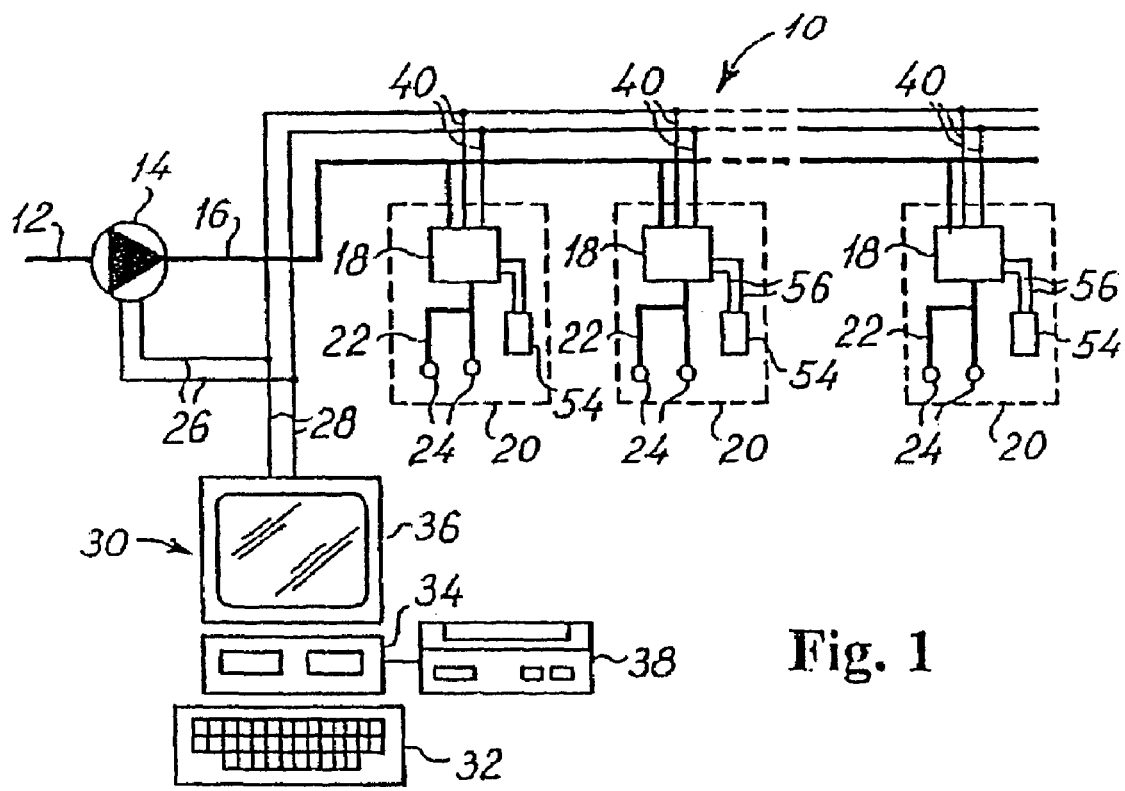
FIG. 1 shows a schematic overview of the two-wire controlling and monitoring system according to the preferred embodiment of the present invention.

The two-wire controlling and monitoring system, designated by numeral 10 in its entirety and shown in FIG. 1, provides irrigation of localized areas e.g. a golf course having certain areas needing a particular amount of irrigation and others a smaller amount of irrigation, parks having tree sections, lawns or flower beds all needing particular amounts of irrigation, greenhouse production lines having a series of production steps for plants, flowers or vegetables all needing a particular amount of irrigation or farming fields having a variety of produce needing a variety of amounts of irrigation.

The two-wire controlling and monitoring system 10 has an inlet connection 12 supplying water from a general household water pump station or a water tank to a pump 14. The pump 14 is mechanically, pneumatically, hydraulically, electrically or magnetically driven or driven by combinations thereof and provides a water pressure on a water pipeline 16 enabling the water pipeline 16 to supply water to a plurality of localized irrigation control units 18 positioned at a series of localized areas of soil 20.

The water pipeline 16 may be constructed from metal pipes produced in materials such as iron, steel, copper, aluminum, silver, gold or any alloys thereof and/or plastic pipes produced in materials such as PVC, PP or PE or any combinations thereof.

The localized irrigation control units 18 are positioned at the series of localized areas of soil 20 and provide irrigation to specific areas of each of the localized areas of soil 20 through a plurality of local pipelines 22 possibly mounted with sprinkling gadgets 24. The localized irrigation control units 18 utilizes connections 40 and the pump 14 utilizes connections 26 to communicate through a two-wire cable 28 interconnecting a controller and power supply unit 30 with the plurality of localized irrigation control units 18 and the pump 14. The controller and power supply unit 30 transmits power and schedules of instructions to the plurality of localized irrigation control units 18.

The controller and power supply unit 30 comprises a keyboard 32 for a user to communicate schedules of instructions i.e. controlling timing of irrigation and position of irrigation to be stored and executed by a computer 34. The controller and power supply unit 30 further comprises a monitor 36 for displaying the operation of the two-wire controlling and monitoring system 10 and a printer 38 for printing out information from the computer 34. The computer 34 may include a an internal or external modem through which remotely monitoring and controlling of the computer 34 is achieved and thereby remotely monitoring and controlling of the controller and power supply unit 30. The computer 34 may further have access to internet facilities which similarly provides the possibility for remotely monitoring and controlling of the computer 34 and thereby the controller and power supply unit 30.

Additionally, a series of computers for example operating irrigation monitoring and controlling systems like the computer 34 may be monitored and controlled from a central unit located at any position world-wide hooked up to the internet or connecting to the series of computers through use of modems.

Figure 2:
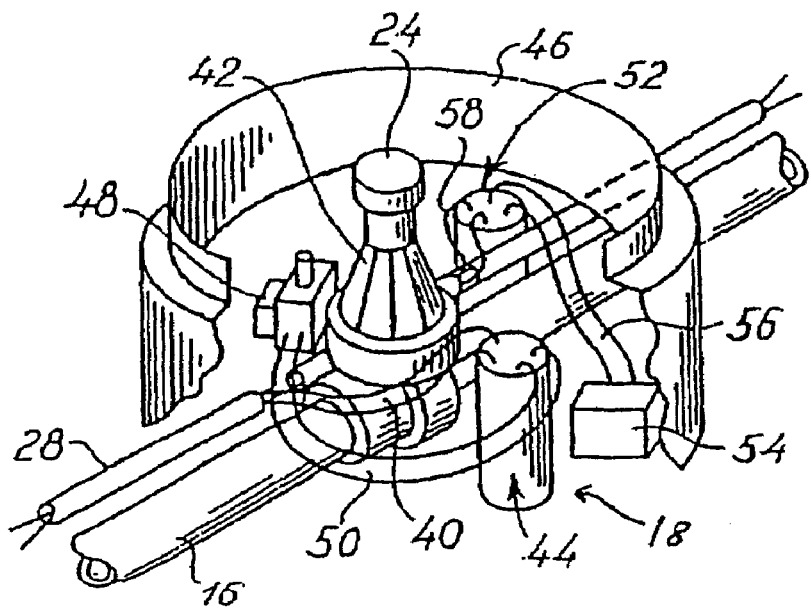
FIG. 2 shows in perspective a localized irrigation control unit according to the preferred embodiment of the present invention and interconnecting a two-wire cable and a controllable irrigation valve in communication with a water pipeline, and the localized irrigation control unit further being connected to a field sensor.

The localized irrigation control units 18 are situated in a house or cabinet 46, shown in FIG. 2, made of a wear resistant material such as metals like aluminum or steel or plastics like PVC, PP or PE. The house 46 protects the localized irrigation control units 18 from any hostile environment the house is positioned in.

Each of the localized irrigation control units 18, as shown in FIG. 2, may comprise a controllable irrigation valve 42 controlling release of water from the water pipeline 16 and a line decoder 44 transmitting the necessary schedules of instructions to the controllable irrigation valve 42.

The controllable irrigation valve 42 may be magnetically, electrically, hydraulically or pneumatically operated or combinations thereof, however, according to the presently preferred embodiment of the invention the controllable irrigation valve 42 is electrically operated through connectors placed in a connector box 48 in the house 46. The connector box 48 comprises a solenoid, which controls the valve in an open or closed position. Variations of current applied to the solenoid cause the induction of magnetic fields, which subsequently activate the valve.

Figure 5:
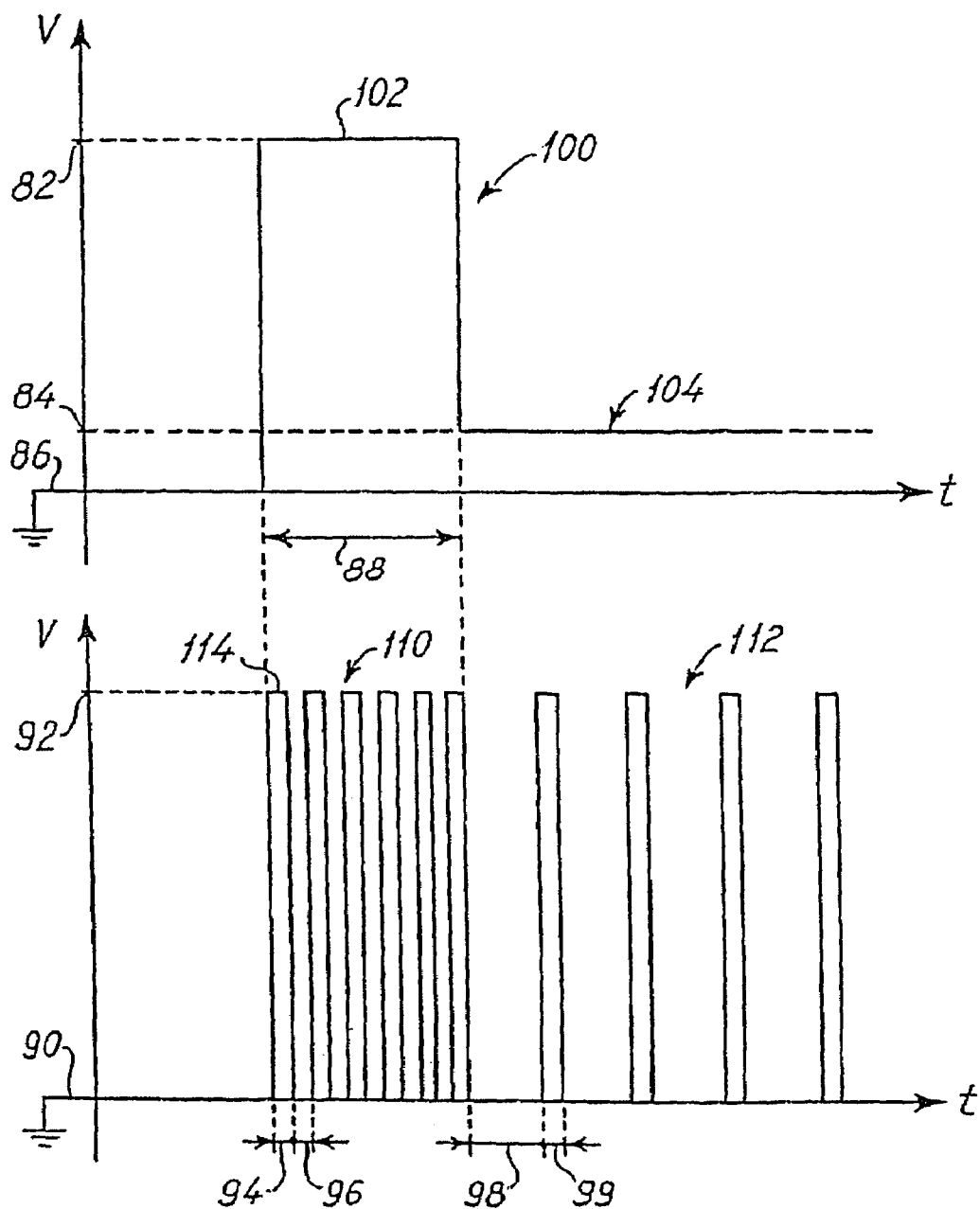
FIG. 5 shows a control voltage signal versus time provided by a line decoder in one of the localized irrigation control units to one of the controllable irrigation valves.

The line decoder 44 receives transmissions of schedules of instructions from the controller and power supply unit 30 through the two-wire cable 28. A pair of control and power inputs 40 connects the line decoder 44 to the two-wire cable 28. A pair of valve control outputs 50 connects the connector box 48 to the line decoder 44. The line decoder 44 applies control signals 100 to the connector box 48 through the pair of valve control outputs 50, which control signals 100, described in further detail below with reference to FIG. 5, are further communicated by the connector box 48 to the controllable irrigation valve 42. Alternatively the line decoder 44 may receive start instructions through radio transmissions produced by a mobile handhold mark sender providing the opportunity to initiate irrigation at specific localized areas regardless of schedules of instructions. This enables manual control of the controllable irrigation valves 42.

The localized irrigation control unit 18 further comprises a sensor decoder 52, as shown in FIGS. 1 and 2, recording a specific irrigation parameter from a field sensor 54 through a pair of sensor outputs 56 and providing a conversion of the specific irrigation parameter measured by the field sensor 54 to a binary number and additionally performing a transmission of the binary number to the controller and power supply unit 30. The sensor decoder 52 id connected to the two-wire cable 28 through a pair of control and power inputs 58. The specific irrigation parameters may be soil or air temperature, soil or air humidity, water pressure in the water pipeline 16, water flow in the water pipeline 16 or water flow through one of the controllable irrigation valves 42. Furthermore the specific irrigation parameters may be mechanical movement, mechanical strain or magnetic fields which may be utilized for the determination of the functionality or operation of the controllable irrigation valves 42.

Figure 3:
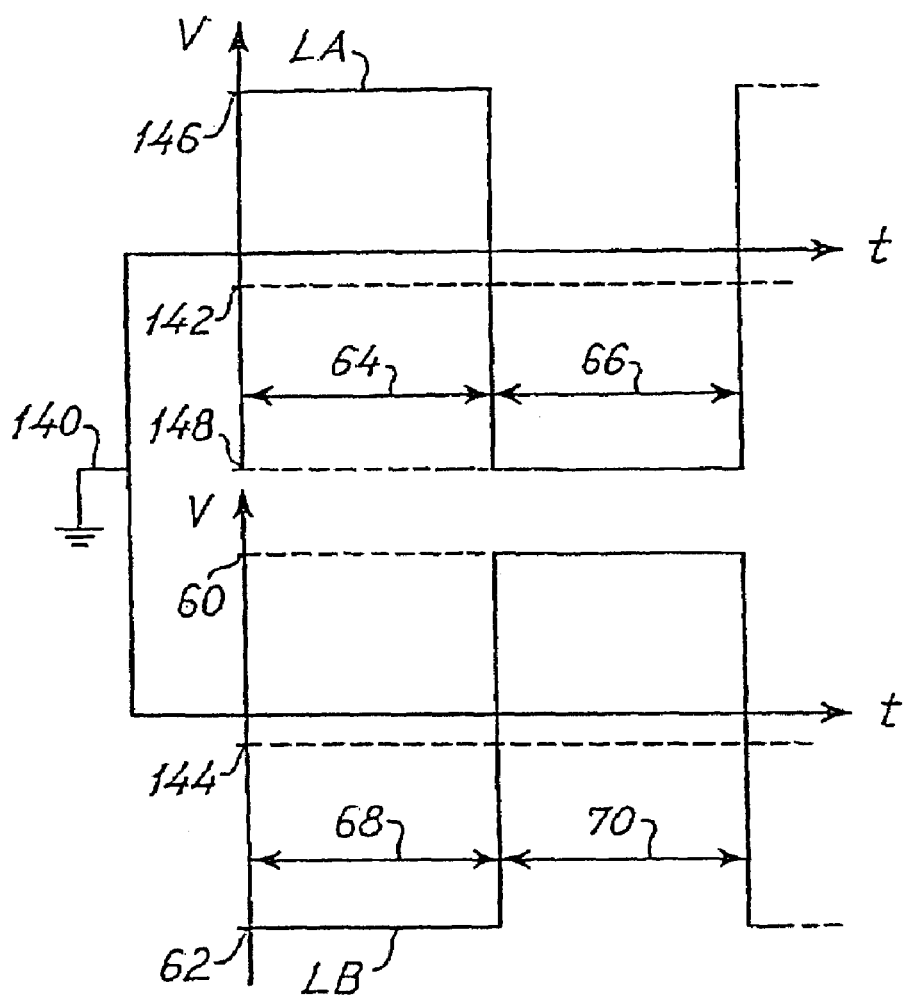
FIG. 3 shows alternating DC voltage signals versus time provided from a controller and power supply unit on the two-wire cable to at least one of the localized irrigation control units.

The line decoder 44 and the sensor decoder 52 receive power through the two-wire cable 28 from the controller and power supply unit 30. FIG. 3 shows voltage versus time curves of a first alternating DC voltage signal, designated by LA, and a second alternating DC voltage signal, designated by LB, simultaneously provided by the controller and power supply unit 30 to the two-wire cable 28 for powering of the line decoder 44 and the sensor decoder 52.

The first alternating DC voltage signal LA has a positive pulse with a pulse width 64 in the range 450 ms to 550 ms and a negative pulse with a pulse width 66 in the range 450 ms to 550 ms. In the presently preferred embodiment of the invention the pulse width 64 is substantially equal to 500 ms, and the pulse width 64 and the pulse width 66 are substantially equal.

The first alternating DC voltage signal LA has a maximum voltage 146 in the range of +10V to +20V and has a minimum voltage 148 in the range of −15V to −25V. In the presently preferred embodiment of the invention the maximum voltage 146 is +15V and the minimum voltage 148 is equal to −20V.

The first alternating DC voltage signal LA is symmetrical about a line 142 indicating a negative off set voltage of the first alternating DC voltage signal LA, in the presently preferred embodiment of the invention the off set voltage is approximately −2V.

The second alternating DC voltage signal LB is inverted in comparison with the first alternating DC voltage signal LA and has a negative pulse with a pulse width 68 in the range 450 ms to 550 ms and a positive pulse with a pulse width 70 in the range 450 ms to 5,50 ms. In the presently preferred embodiment of the present invention the pulse width 68 is substantially equal to 500 ms and the pulse width 64, the pulse width 66, the pulse width 68 and the pulse width 70 are substantially equal.

The term inverted in this context means a phase shift between the first alternating DC voltage signal LA and the second alternating DC voltage signal LB of approximately 180°.

The second alternating DC voltage signal LA has a maximum voltage 60 in the range of +10V to +20V and has a minimum voltage 62 in the range of −15V to −25V. In the presently preferred embodiment of the invention the maximum voltage 60 is equal to the maximum voltage 146 of the first alternating DC voltage signal LA, and the minimum voltage 62 is equal to the minimum voltage 148 of the first alternating DC voltage signal LA.

The second alternating DC voltage signal LA is symmetrical about a line 144, which line 144 indicates a negative off set voltage of the second alternating DC voltage signal LB. In the presently preferred embodiment of the invention the off set voltage of the second alternating DC voltage signal is approximately equal to the off set voltage of the first alternating DC voltage signal.

By off setting the first and the second alternating DC voltage signals LA, LB with a negative voltage relative to ground 140 a substantially slower corrosion of the two-wire cable 28 is achieved. In case of negative off set, the current will run from the ground level 140 to copper material of the two-wire cable 28 resulting in an alkaline process, which is less hazardous to the copper material than an electron acceptor donating process relative to ground level 140, achieved in case of positive off set forcing the current to run from the copper material to the ground level 140.

Figure 4:
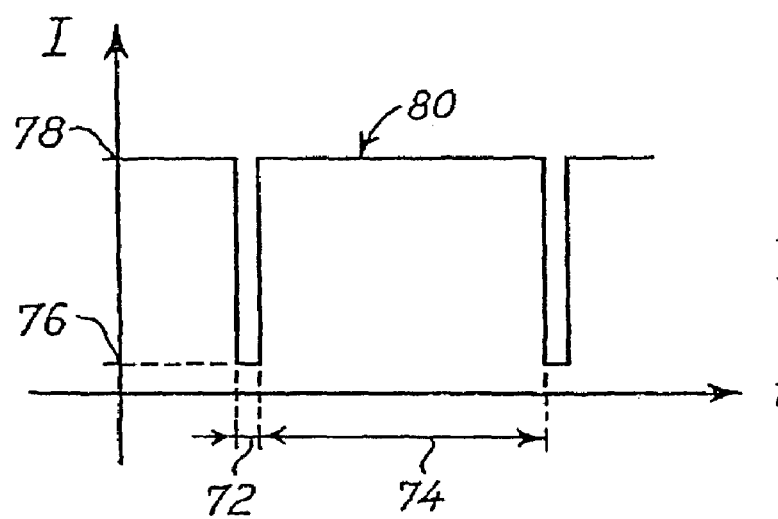
FIG. 4 shows alternating DC current signal versus time applied by the controller and power supply unit on to the two-wire cable and received by at least one of the localized irrigation control units.

FIG. 4 shows a current versus time curve of an alternating DC current signal 80 provided by the controller and power supply unit 30 between the wires of the two-wire cable 28. The alternating DC current signal 80 has a maximum current 78 in the range of 0.5 A to 2 A, and has a minimum current 76 in the range of 20 mA to 150 mA. In the presently preferred embodiment of the invention the maximum current 78 is 1.1 A and the minimum current 76 is 40 mA.

The alternating DC current signal 80 furthermore has a pulse width 72 defining the period of minimum current 76 of the alternating DC current signal 80, which pulse width 72 is in the range 0.1 ms to 10 ms, and has a pulse width 74 defining the period of maximum current 78 of the alternating DC current signal 80. In the presently preferred embodiment of the invention the pulse width 72 is shorter than 5 ms and the pulse width 74 is lesser than 500 ms. The length of the pulse width 74 is depending on which operation is performed by the controller and power supply unit 30. In case of an Arbitration or data transferring transmission consisting of a series of binary "1"s then the pulse width 74 is shorter than 20 ms. During normal operation the pulse width 74 however, is shorter than 500 ms.

FIG. 5 shows a voltage versus time curve of the control signal 100 provided by the line decoder 44 to the controllable irrigation valve 42. The control signal 100 consists of an inrush signal 102 and a hold signal 104. The inrush signal 102 provides a maximum voltage 82 for operating the controllable irrigation valve 42 in an open position enabling water to flow from the water pipeline 16 to the local pipeline 22 positioned in the localized areas 20. The inrush signal 102 defines a pulse width 88 in the range 10 ms to 1 s in the presently preferred embodiment of the invention the pulse width 88 is in the range 30 ms to 100 ms. When the controllable irrigation valve 42 is completely opened, the line decoder 44 changes the control signal 100 from the inrush signal 102 to the hold signal 104. The hold signal 104 has a reduced maximum voltage 84. The line decoder 44 continues to transmit the hold signal 104 as long as dictated by the schedules of instructions. As soon as the control signal is turned off 106 providing ground voltage 86 to the controllable irrigation valve 42, the controllable irrigation valve 42 closes and thereby disables the flow of water from the water pipeline 16 to the local pipeline 22.

In order to reduce power consumption of the controllable irrigation valves 42 the control signal 100 in the presently preferred embodiment of the invention is construed from a series of square wave pulses 114 constituting an pulsed inrush signal 110 and constituting a pulsed hold signal 112. The square wave pulse 114 defines a voltage maximum 92 having a pulse width 94 and defines a voltage minimum 90 having a pulse width 96 in the pulsed inrush signal 110 and defines the voltage maximum 92 having a pulse width 99 and defines the voltage minimum 90 having a pulse width 98 in the pulsed hold signal 112. According to a first embodiment of the present invention the pulse width 94 and the pulse width 96 and the pulse width 99 are 1 ms, but may be any value in the range 100 μs to 0.1 s. The pulse width 98 is 10 ms, but may be any value in the range 6 ms to 30 ms. The average voltage of the pulsed inrush signal 110 is equal to the maximum voltage 82 of the inrush signal 102 and the average voltage of the pulsed hold signal 112 is equal to the reduced maximum voltage 84 of the hold signal 104. According to a second and presently preferred embodiment of the invention and as shown in FIG. 5 the sum of the pulse widths 94 and 96 and the sum of the pulse widths 98 and 99 are 1 ms, but may be any value in the range 100 μs to 0.1 s. During the pulsed inrush signal 110 the pulse width 94 is substantially larger than the pulse width 96 thereby constituting an average voltage of the pulsed inrush signal 110 equal to the maximum voltage 82 of the inrush signal 102. During the pulsed hold signal 112 the pulse width 98 is substantially smaller than the pulse width 99 thereby constituting an average voltage of the pulsed hold signal 112 equal to the reduced maximum voltage 84 of the hold signal 104.

The maximum voltage 92 of the control signal 100 in the presently preferred embodiment of the invention is 35V, but may have any value in the range 5V to 45V. The minimum voltage 90 of the control signal 100 in the presently preferred embodiment of the invention is 0V equal to ground level 86, but may be in the range 0V to 5V.

Figure 6:
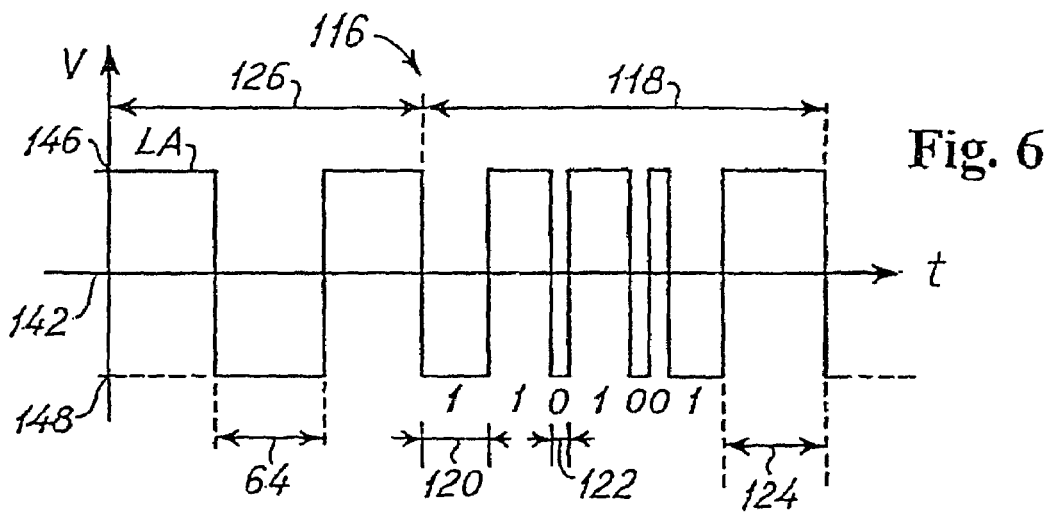
FIG. 6 shows a transmission of schedules of instructions provided by the controller and power supply unit to the localized irrigation control units.

The controller and power supply unit 30 transmits schedules of instructions simultaneously to transmitting power through the two-wire cable 28 to the line decoder 44. The schedules of instructions are transmitted to the irrigation control units 18 in a sequential binary pattern 118 construed from alternations or toggling of the first alternating DC voltage signal LA and the second alternating DC voltage signal LB. FIG. 6 shows a voltage versus time curve 116 having a normal pattern 126 where the first alternating DC voltage signal LA has the pulse width 64, the maximum voltage 146 and minimum voltage 148 and having the binary pattern 118. The sequential binary pattern 118 is provided by simultaneous alternations of the first alternating DC voltage signal LA and the second alternating DC voltage signal LB. FIG. 6 shows only the first alternating DC voltage signal for simplicity.

The binary pattern 118 defines a binary "1"s by having a pulse width 120 in the range 10 ms to 49 ms and defines a binary "0"s by having a pulse width 122 in the range 1 ms to 9 ms. In the presently preferred embodiment of the invention the pulse width 120 defining binary "1" is 20 ms and the pulse width 122 defining binary "0" is approximately 5 ms.

A transmission of the binary pattern 118 is concluded by a pulse width 124 defining a stop signal in the range of 50 ms to 70 ms. In the presently preferred embodiment of the invention the pulse width 124 is 60 ms.

Figure 7:
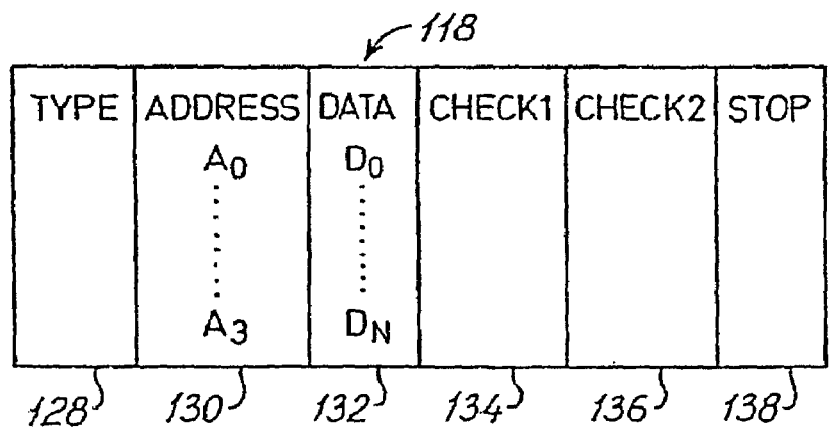
FIG. 7 shows an example of the contents of a transmission from the controller and power supply unit to the localized irrigation control units.

The transmission of schedules of instructions in the form of the binary pattern 118 from the controller and power supply unit 30 to the irrigation control unit 18, is shown as an example in FIG. 7 and according to the presently preferred embodiment of the invention the transmission consists of type declaration 128 defining the type of operation needed by the irrigation control unit 18. In the presently preferred embodiment of the invention type declarations may be "Arbitration" used for prioritising functions, "Data" used for transmitting data to the irrigation control unit 18, "Control" used for switching line decoders 44 in the irrigation control units 18 on and off, "Broadcast" used for transmission of data to all irrigation control units 18 in the two-wire controlling and monitoring system 10, "Test" used for testing the functionality of one of the irrigation control units 18 and "Pole" used for extracting specific irrigation parameters from one of the sensor decoders 52 in the irrigation control units 18.

Depending on which type declaration 128 is transmitted the binary pattern 118 may further consist of an address 130 having a transmission size in the range 0 128 bits, data having a transmission size in the range of 0 to 1 Gbits, a first check having a transmission size in the range of 0 to 128 bits, a second check having a transmission size in the range of 0 to 128 bits and finally the transmission is concluded by the stop signal defined by the pulse width 124. In the presently preferred embodiment of the invention the type declaration consists of 4 bits, the address consists of 16 bits, the data consists of up to 64 KBYTE (1 BYTE equal to 1024 bits), the first check consists of 4 bits and the second check consists of 4 bits.

Figure 8:
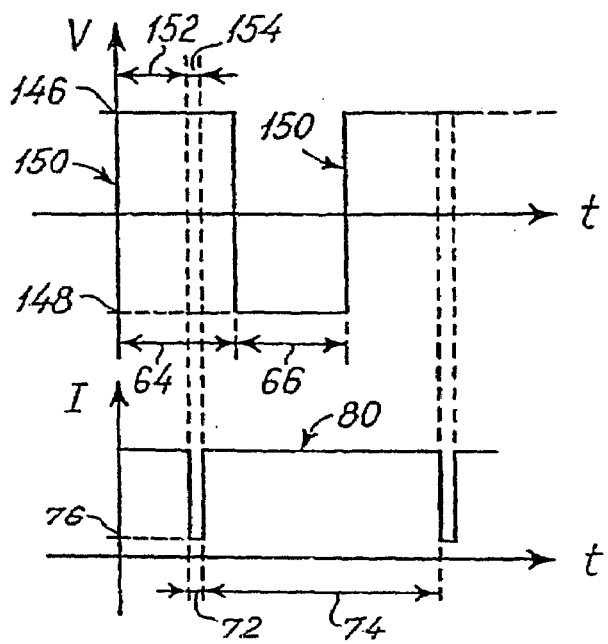
FIG. 8 shows a alternating DC voltage line signal transmitted on one conductor of the two-wire cable and corresponding alternating DC current signal between conductors of the two-wire cable.

FIG. 8 shows a voltage versus time curve of the first alternating DC voltage signal LA and simultaneously a curve of current versus time of the alternating DC current signal 80. During the positive pulse having the pulse width 64 the controller and power supply unit 30 provides an interrupt window 154 during which the alternating DC current signal applies the minimum current 76 to the two-wire cable 28 until an interrupt from the irrigation control units 18 is detected. The pulse width 72 of the minimum current 76 part of the alternating DC current signal 80 determines the active time period of the interrupt window 154. In the presently preferred embodiment of the invention, the active time period of the interrupt window is shorter than 5 ms. The precise length of the pulse width 72 is determined according to detection by the controller and power supply 30 of an interrupt from the irrigation control units 18. As soon as an interrupt is detected during the interrupt window 154, the DC alternating current signal shifts state and provides maximum current 78 to the two-wire cable.

The interrupt window 154 follows an alternation 150 of the first alternating DC voltage signal LA and a power active time period 152. In the presently preferred embodiment of the invention the power active time period 152 is 400 ms.

Figure 9:
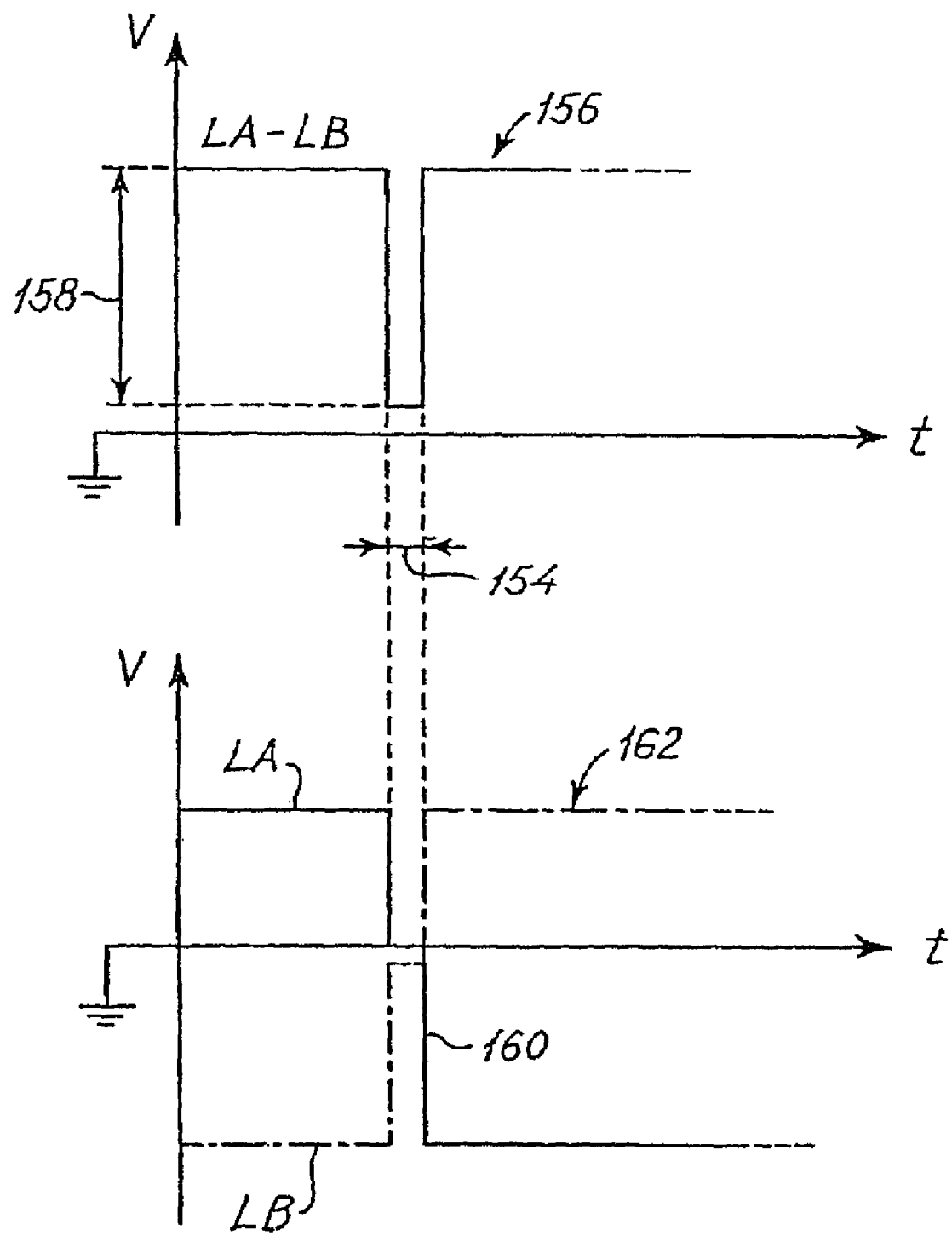
FIG. 9 shows a differential voltage signal between conductors of the two-wire cable and the corresponding two alternating DC voltage line signals.

The sensor decoder 52 comprises a short circuiting circuit for unidirectional short circuiting the pair of control and power inputs 58. The sensor decoder 52 may request an interrupt of the two-wire controlling and monitoring irrigation system 10 by unidirectional short circuiting the pair of control and power inputs 58 during the interrupt window 154 and hence provide a voltage drop 158 of a differential voltage 156 between the first alternating DC voltage signal LA and the second alternating DC voltage signal LB, shown in FIG. 9. FIG. 9 shows a voltage versus time curve of the differential voltage 156 during transmission of the request of an interrupt. In the presently preferred embodiment of the invention the maximum voltage of the differential voltage 156 is in the range 25V to 45V or preferably 35V and during the request of an interrupt the differential voltage may drop to a value in the range 15V to 30V. However, in the presently preferred embodiment of the invention the differential voltage may drop to a maximum of 25V or to a voltage of −10V relative to ground voltage.

FIG. 9 furthermore shows voltage versus time curves of the first alternating DC voltage signal LA and the second alternating DC voltage signal LB during the request for an interrupt. As FIG. 9 shows, during the request of an interrupt performed in the interrupt window 154 the voltage difference between the first alternating DC voltage signal LA and the second alternating DC voltage signal LB is significantly reduced, which reduction is detected by the controller and power supply unit 30. In response to the request of an interrupt the controller and power supply unit 30 performs an alternation 160 of the first alternating DC voltage signal LA and the second alternating DC voltage signal LB and performs a shift in state of the DC alternating current signal 80 from minimum current 76 to maximum current 78. Since the short circuiting is unidirectional the effect of the short circuit is avoided following the DC alternation of the first alternating DC voltage signal LA and the second alternating DC voltage signal LB. At the same time the DC alternation indicates to the plurality of irrigation control units 18 that the controller and power supply unit 30 has received an interrupt from one of the plurality of irrigation control units 18, and therefore the plurality of irrigation control units 18 are prepared for the controller and power supply unit's 30 initiation of a transmission 162 of the type declaration "Arbitration" on the two-wire cable 28.

Figure 10:
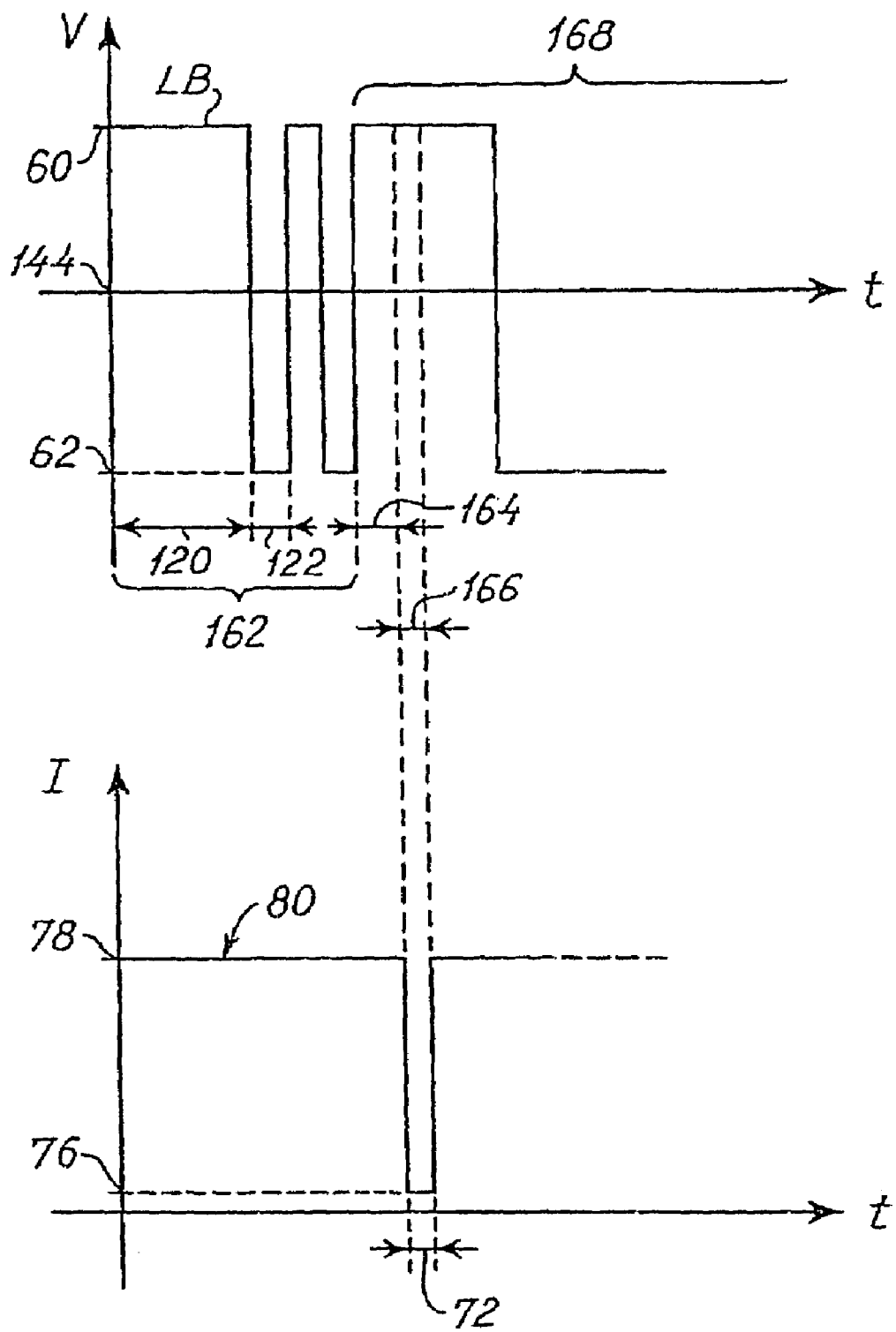
FIG. 10 shows a transmission of a type declaration followed by a sequence of binary "1"s including an answer window.

FIG. 10 shows a curve of the second alternating DC voltage signal LB transmitting the transmission 162 comprising a type declaration. If the type declaration transmitted is "Arbitration" then the controller and power supply unit 30 continues it's transmission by applying a series of binary "1"s 168 to the two-wire cable 28 in order to obtain an address of the interrupting irrigation control unit 18 having the lowest address. Each of these binary "1"s include an answer window 166 during which the minimum current 76 is applied to the two-wire cable 28. If at least one of the interrupting irrigation control units 18 during the first answer window 166 performs a unidirectional short circuiting of the pair of control and power inputs 58, then the controller and power supply unit 30 interprets the resulting voltage drop as a binary "0" indicating that the most significant bit of the address of the at least one of the interrupting irrigation control units 18 is "0". On the other hand if none of the interrupting irrigation units 18 perform a short circuiting of the pair of control and power inputs 58 during the answer window 166, then the controller and power supply unit 30 interprets a binary "1" indicating that the most significant bit of the addresses of all of the interrupting irrigation control units 18 is "1". Subsequently the controller and power supply unit 30 initiates transmission of a second binary "1" including a second answer window 166 by performing a new alternation of the first alternating DC voltage signal LA and the second alternating DC voltage signal LB and applies the maximum current 78 to the two-wire cable 28. This process is repeated until the controller and power supply unit 30 has located the interrupting irrigation control unit 18 having the lowest address. In effect the interrupting irrigation control units 18 answer "yes" or "no" to the transmission of the series of binary "1"s 168 in accordance with the interrupting irrigation control units' 18 own address. When the controller and power supply unit 30 has identified for example the interrupting sensor decoder 52 by detecting the sensor decoder's 52 answers in the answer window 166, then the controller and power supply unit 30 continues a new transmission of binary "1"s including answering windows 166 for the interrupting sensor decoder 52 to transmit data from the sensor decoder 52 to the controller and power supply unit 30 by answering "yes" or "no".

Similar communication techniques as described above between the controller and power supply unit 30 and the individual irrigation control units 18 is utilized during the controller and power supply unit's 30 request for data from the irrigation control units 18 and during any type declaration in which obtaining information from the irrigation control units 18 is required.

Voltage drops outside a designated interrupt window 154 or answer window 166 or voltage drops below an acceptable voltage minimum during such a window (154, 166) may be due to erroneous equipment. Thus voltage drops further may show if the two-wire controlling and monitoring system has faulty equipment. Alternatively, the controller and power supply unit 30 may establish a separate test window in both high and low pulses of both the first alternating DC voltage signal LA and the second alternating DC voltage signal LB. The test window may be initiated following a toggle or alternation of the first and second alternating DC voltage signal LA and LB. According to one embodiment of the present invention the test window is initiated 100 ms following a specific pre-selected alternation and has a length of 10 ms. By reducing the alternating DC current signal 80 to minimum current 76 during the test window erroneous signalling from the irrigation control unit 18 is avoided.

In the presently preferred embodiment of the invention the alternating DC current signal 80 during the answer window 166 is reduced to the minimum current 76, which minimum current 76 lasts for the pulse width 72. The length of the pulse width 72 is determined in accordance with the earliest response from one of the answering irrigation control units 18 and limited to a having a maximum length of 2.5 ms. The answer window 166 during a transmission of a series of binary "1"s is initiated following a non-active time period of approximately 5 ms.

Generally speaking the communication between the controller and power supply unit 30 and the irrigation control units 18 is implemented by utilising a unidirectional short circuiting circuit in the irrigation control units 18 for transmitting an interrupt request to the controller and power supply unit 30 and for transmitting answers to the controller and power supply unit 30. The reaction of the controller and power supply unit 30 is immediate alternation and consequently a shorter time having minimum current 76 applied to the two-wire cable 28. Even if the reaction of the controller and power supply unit 30 during the process of obtaining information from the irrigation control units 18 during the answer windows 166 is not restricted in the sense that a binary "0" must be 5 ms but rather that a binary "0" is indicated entirely by a short circuiting signal from the irrigation control units 18 at any moment within the answer window. However, the faster the short circuiting signal is detected by the controller and power supply unit the better the power transfer to the irrigation control units 18 becomes.

The two-wire controlling and monitoring system 10 may be configured in a variety of ways. The presently preferred embodiment of the electronics of the two-wire controlling and monitoring system 10 is shown in FIGS. 11 to 16.

Figure 11:
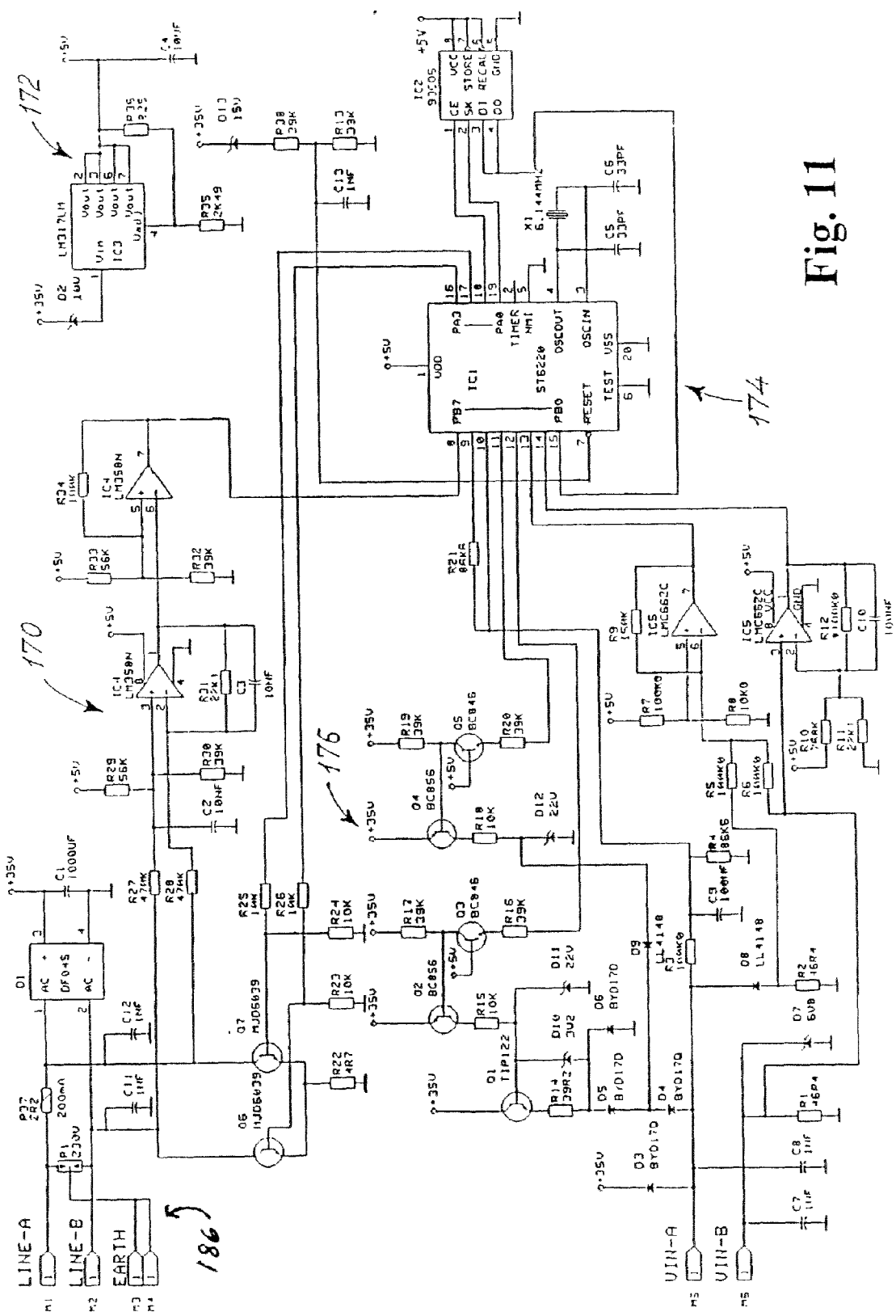
FIG. 11 shows a circuit diagram of the presently preferred embodiment of a sensor decoder.

FIG. 11 shows a circuit diagram of the presently preferred embodiment of the sensor decoder 52. The circuit diagram shows the short circuiting circuit 170, a control and power supply input section 186 having pair of control and power supply inputs designated by Line-A and Line-B, a constant voltage supply 172, a microprocessor 174 and a field sensor power supply and field sensor signal amplifier 176.

The short circuiting circuit 170 comprises a differential amplifier monitoring polarity of the lines Line-A and Line-B and communication information regarding polarity of the lines Line-A and Line-B to the microprocessor 174. The short circuiting circuit 170 further comprises two transistors for unidirectional short-circuiting of the lines Line-A and Line-B. The transistors are controlled by the microprocessor 174 and operated to open or close during interrupt windows 154 and answering windows 166.

The control and power supply input section 186 provides an electrical separation between the two-wire cable 28 and the sensor decoder 52. This is achieved by employing bridge circuitry in combination with a reservoir capacitor. During interrupt windows 154 and answering windows 166 the current supplied to the two-wire cable 28 is significantly reduced, and therefore, in order to keep the sensor decoder functioning during these short periods, the reservoir capacitor supplies the current needed for operating the sensor decoder 52.

Figure 12:
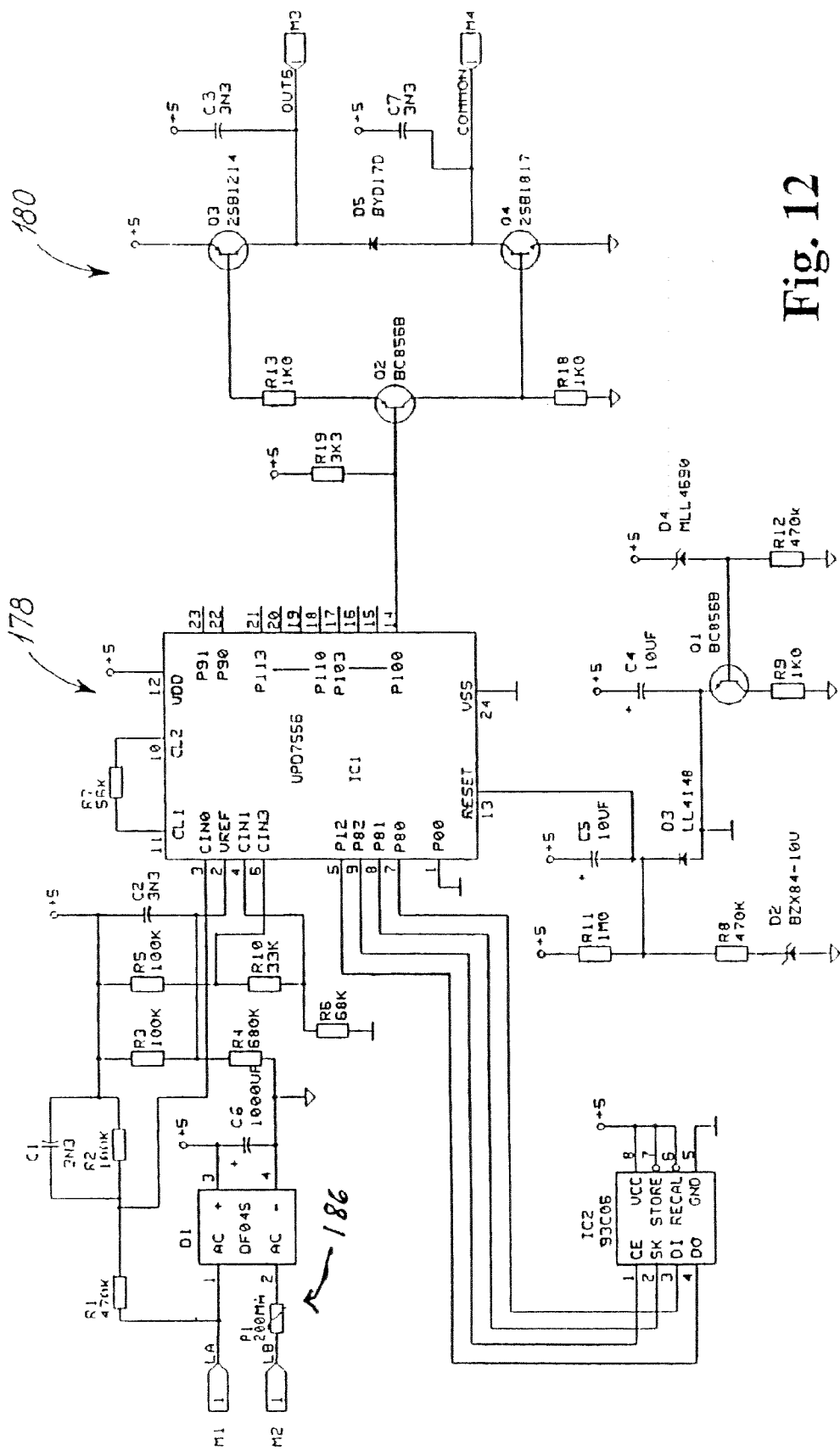
FIG. 12 shows a circuit diagram of the presently preferred embodiment of a line decoder having one valve control output.

FIG. 12 shows a circuit diagram of the presently preferred embodiment of the line decoder 44 having one valve control output. The circuit diagram shows a control and power supply input section 186 having pair of control and power supply inputs designated by LA and LB, a microprocessor 178 and an output power stage 180 for operating the controllable irrigation valves 42 to open and closed positions.

Figure 13:
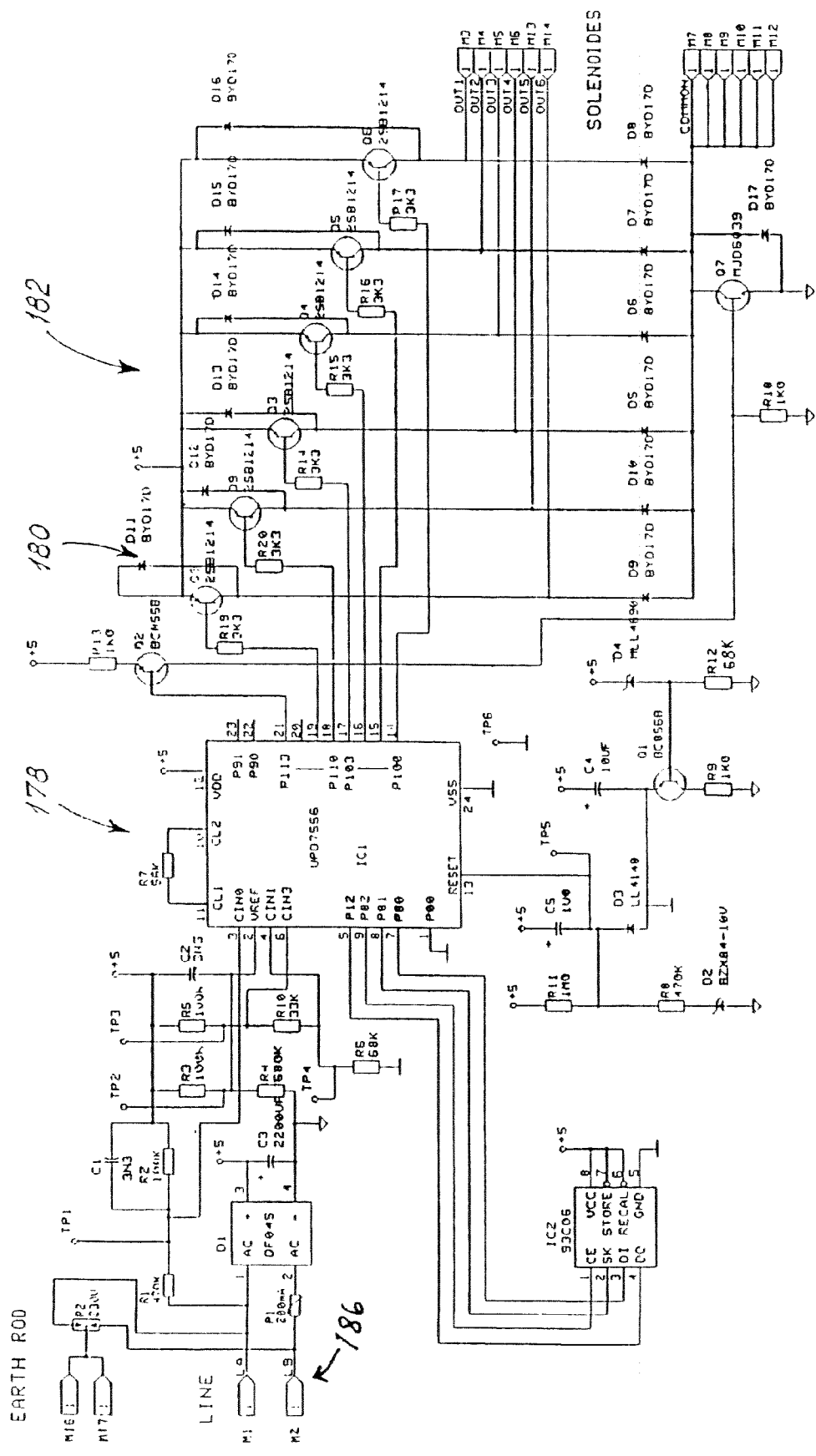
FIG. 13 shows a circuit diagram of the presently preferred embodiment of a line decoder having at least one valve control output.

FIG. 13 shows a circuit diagram of the presently preferred embodiment of the line decoder 44 having at least one valve control output. The circuit diagram shows the microprocessor 178 and a plurality 182 of the power output stage 180 for operating a series of the controllable irrigation valves 42 to open and closed positions.

Similarly to the circuit diagram for the sensor decoder 52 depicted in FIG. 11 the line decoder 44 shown in FIG. 12 and the line decoder shown in FIG. 13 comprise power supply input sections 186 electrically separating the two-wire cable 28 from the internal circuitry of the line decoders 44 in FIGS. 12 and 13. The power supply input section 186 consists of a bridge circuit and a reservoir capacitor.

Figure 14A:
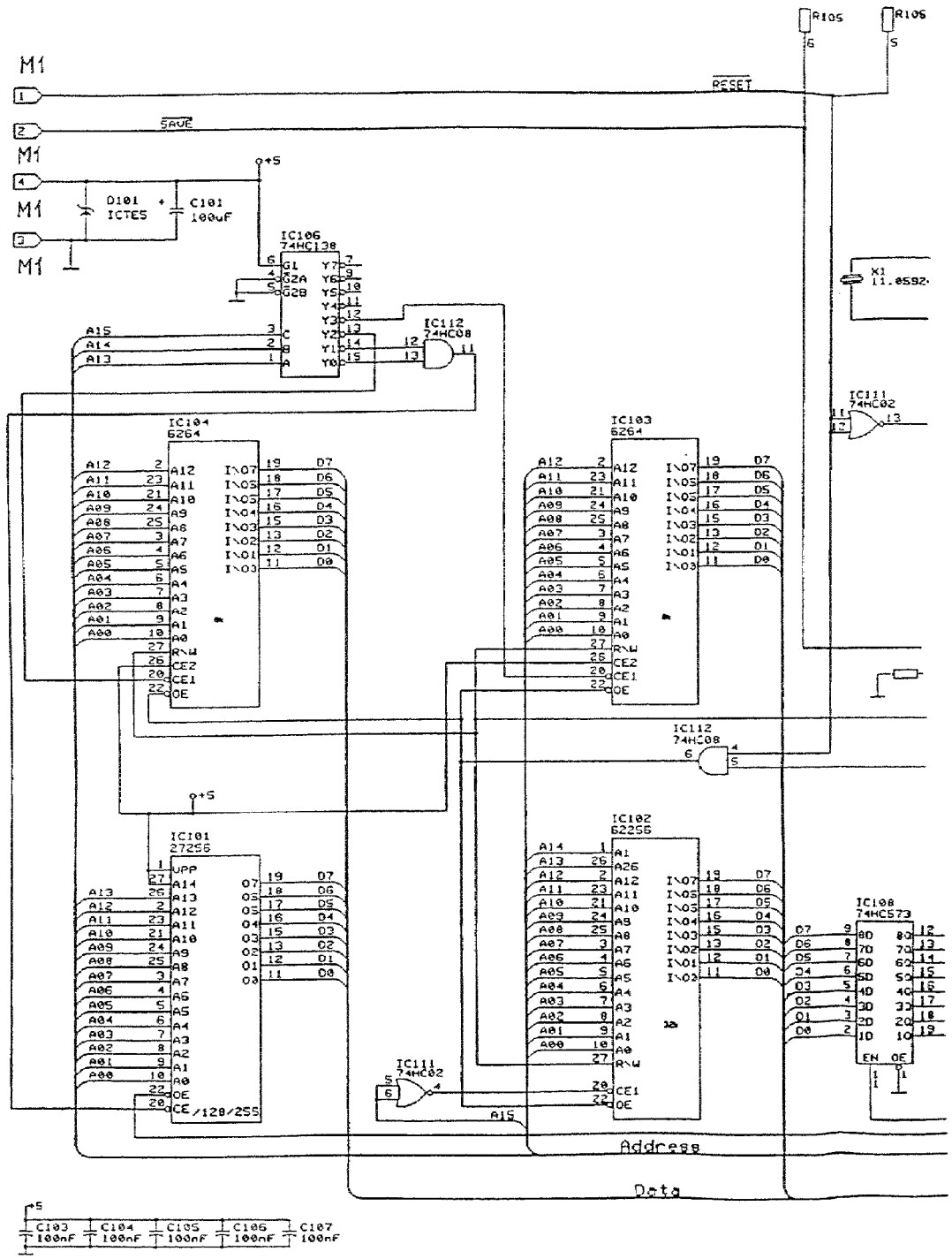
FIGS. 14a and 14b show a circuit diagram of a microprocessor and storage section included in a controller and power supply unit according to a preferred embodiment of the present invention.
Figure 14B:
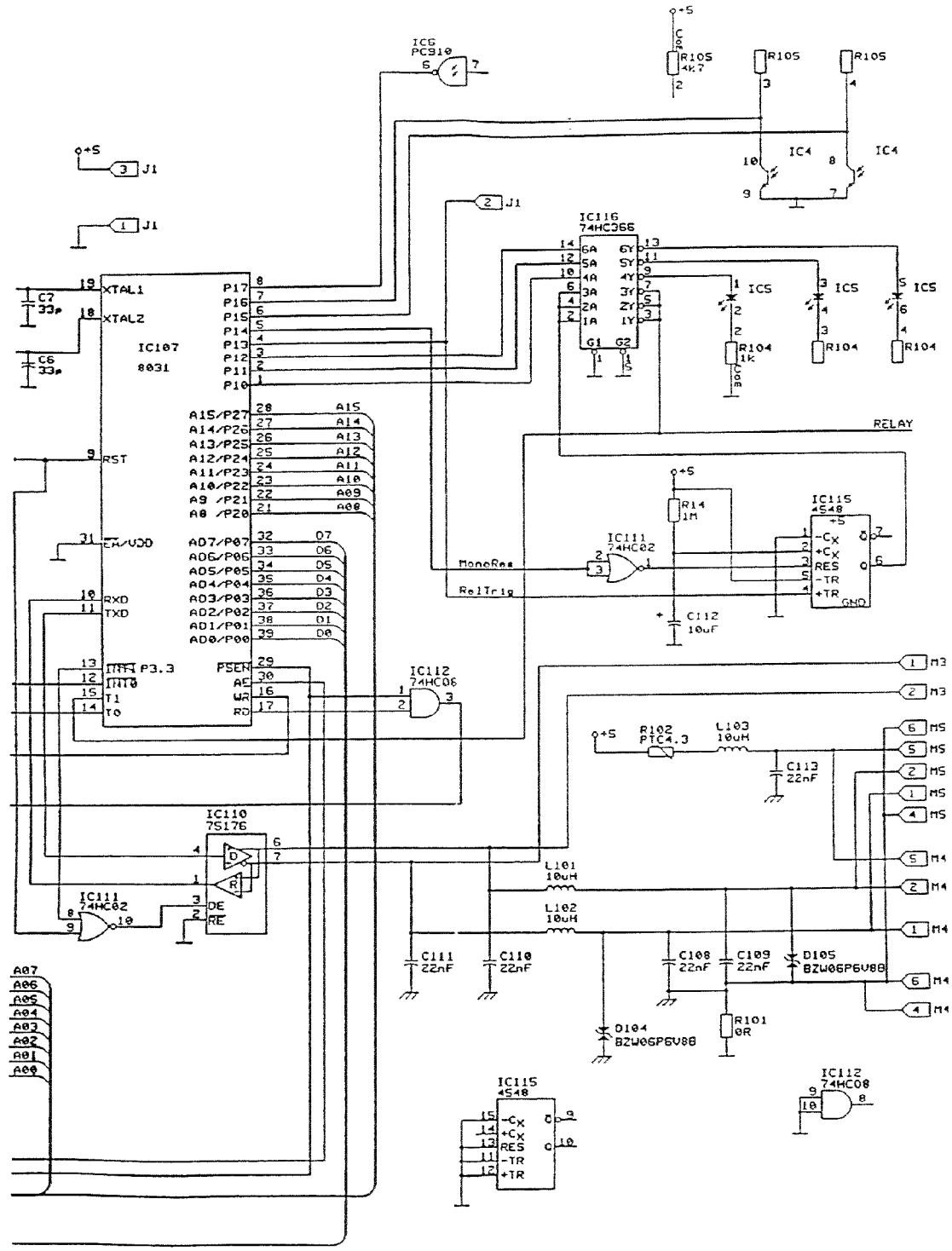

FIGS. 14*a* and 14*b* show a circuit diagram of a controller section of the presently preferred embodiment of the controller and power supply unit 30.

Figure 15A:
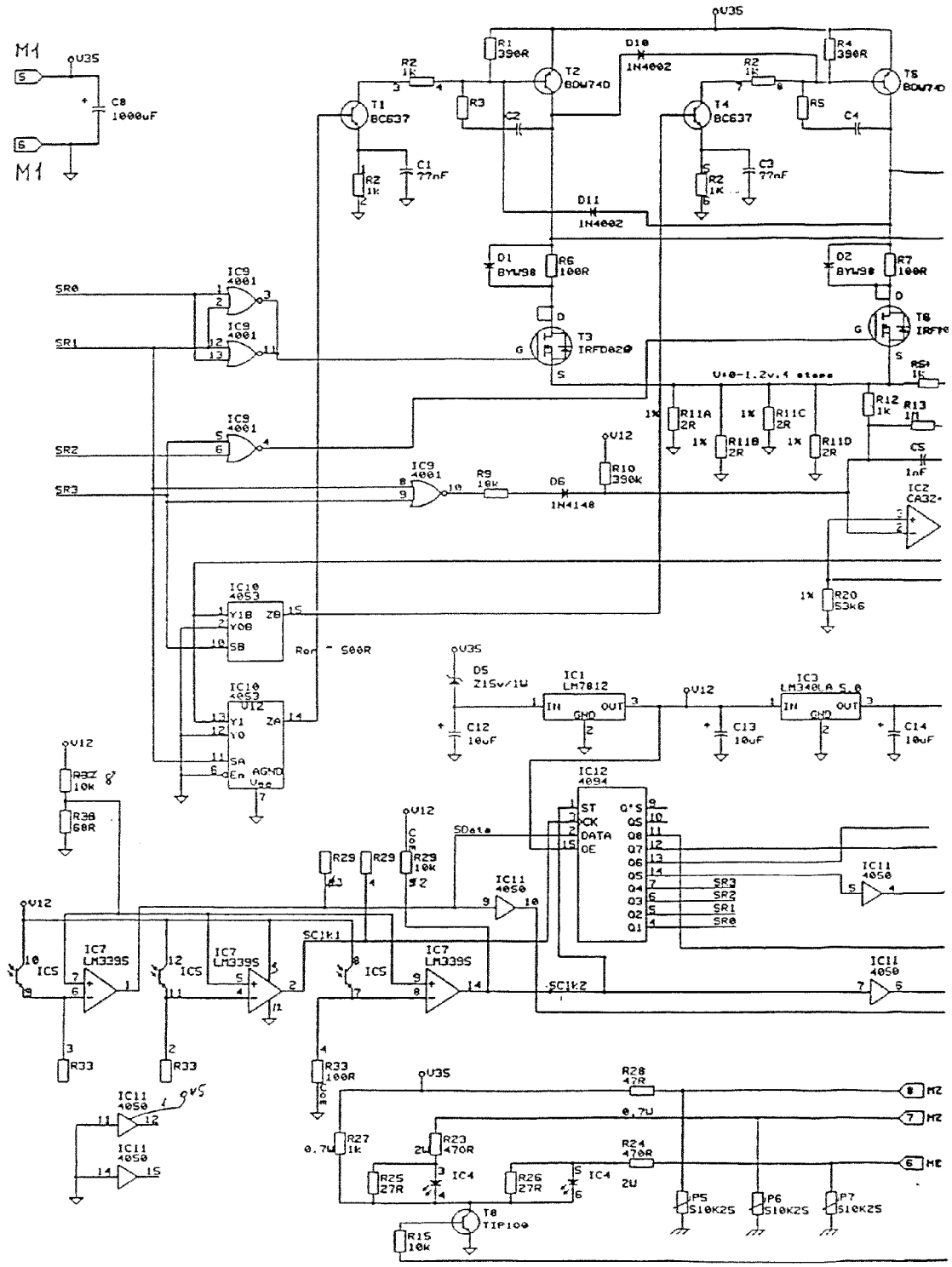
FIGS. 15a and 15b show a circuit diagram of a power output stage included in a controller and power supply unit according to a preferred embodiment of the present invention.
Figure 15B:
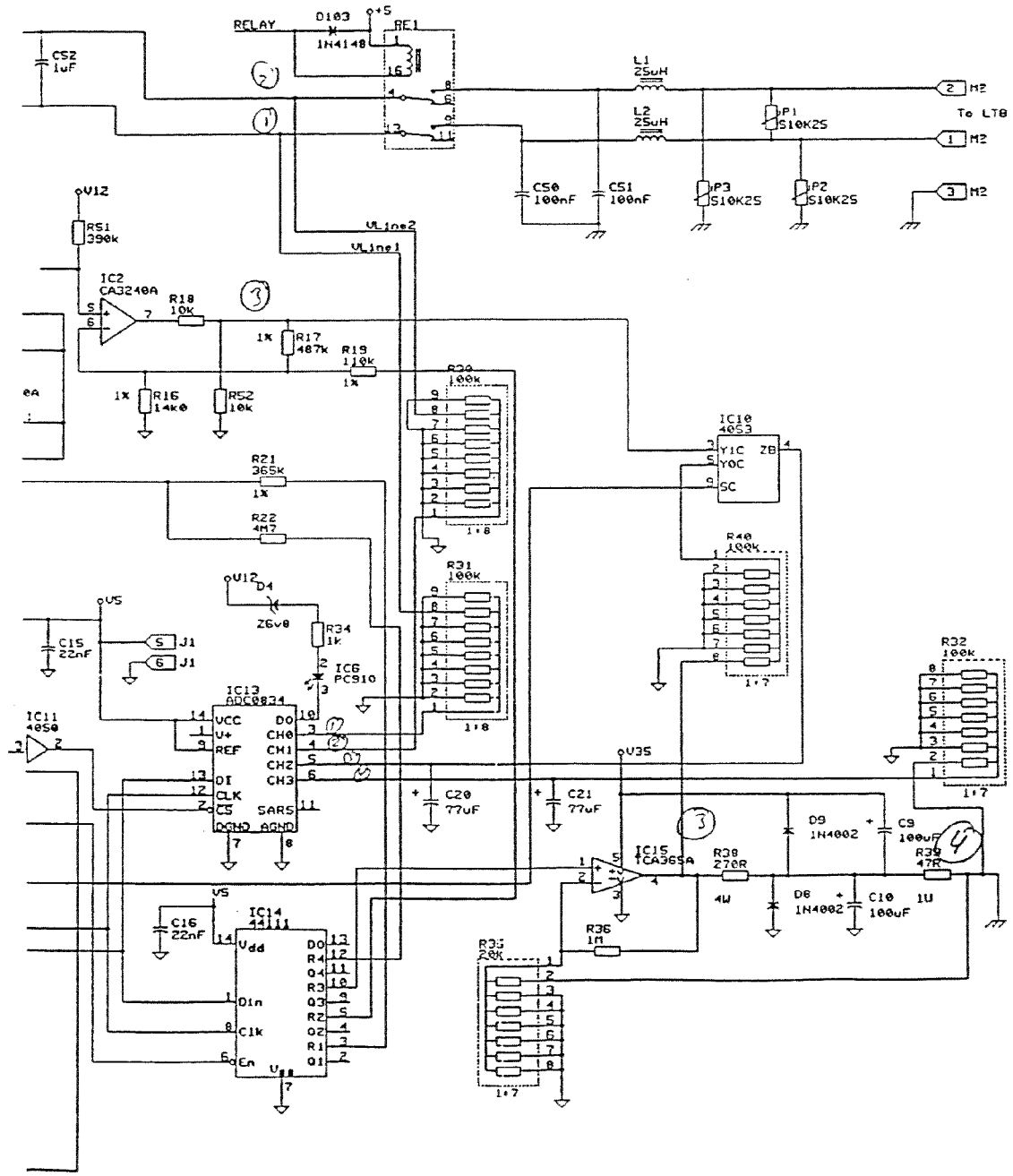

FIGS. 15*a* and 15*b* show a circuit diagram of power supply section of the presently preferred embodiment of the controller and power supply unit 30.

Figure 16A:
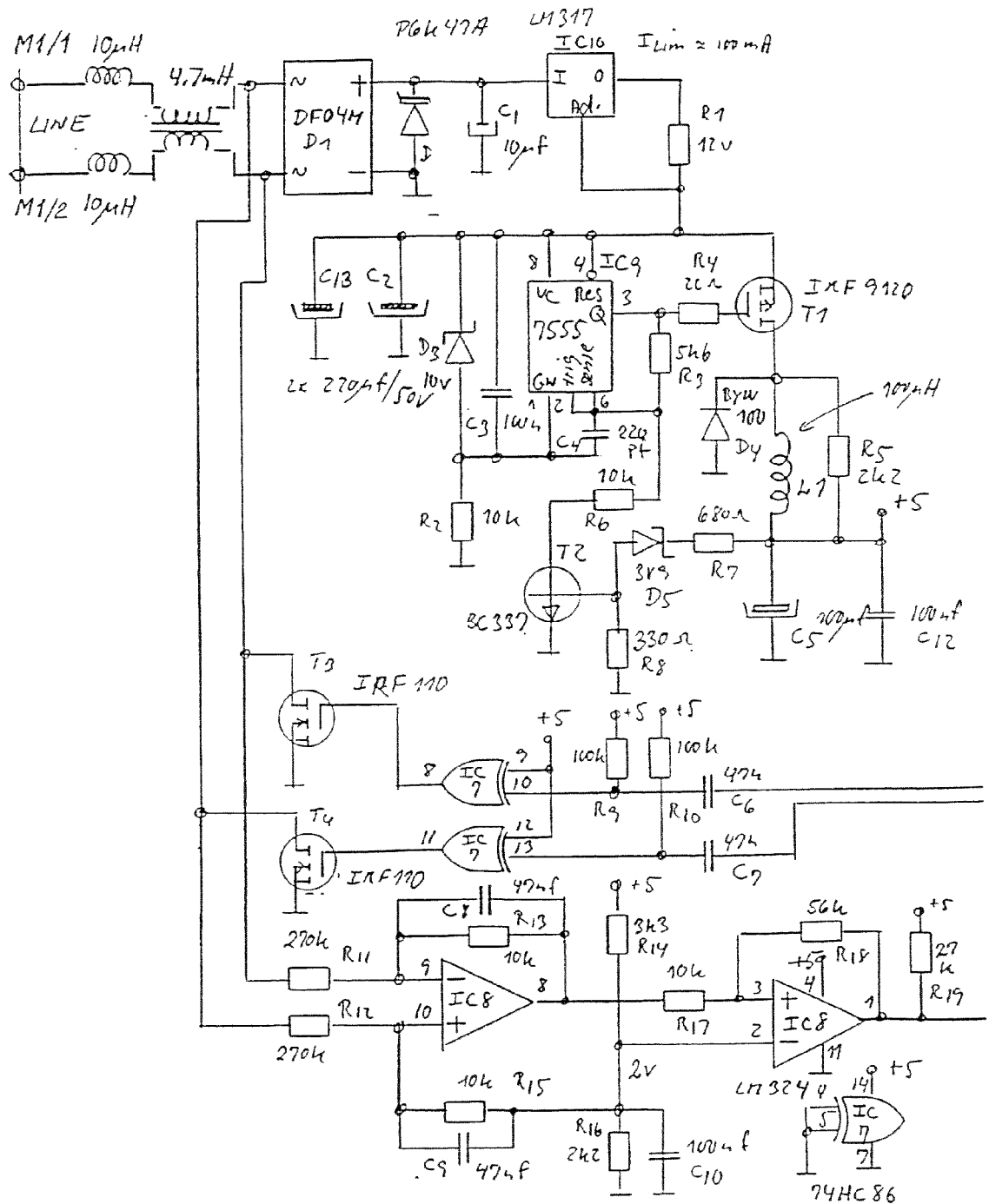
FIGS. 16a and 16b show a circuit diagram of a mark sender according to a preferred embodiment of the present invention.
Figure 16B:
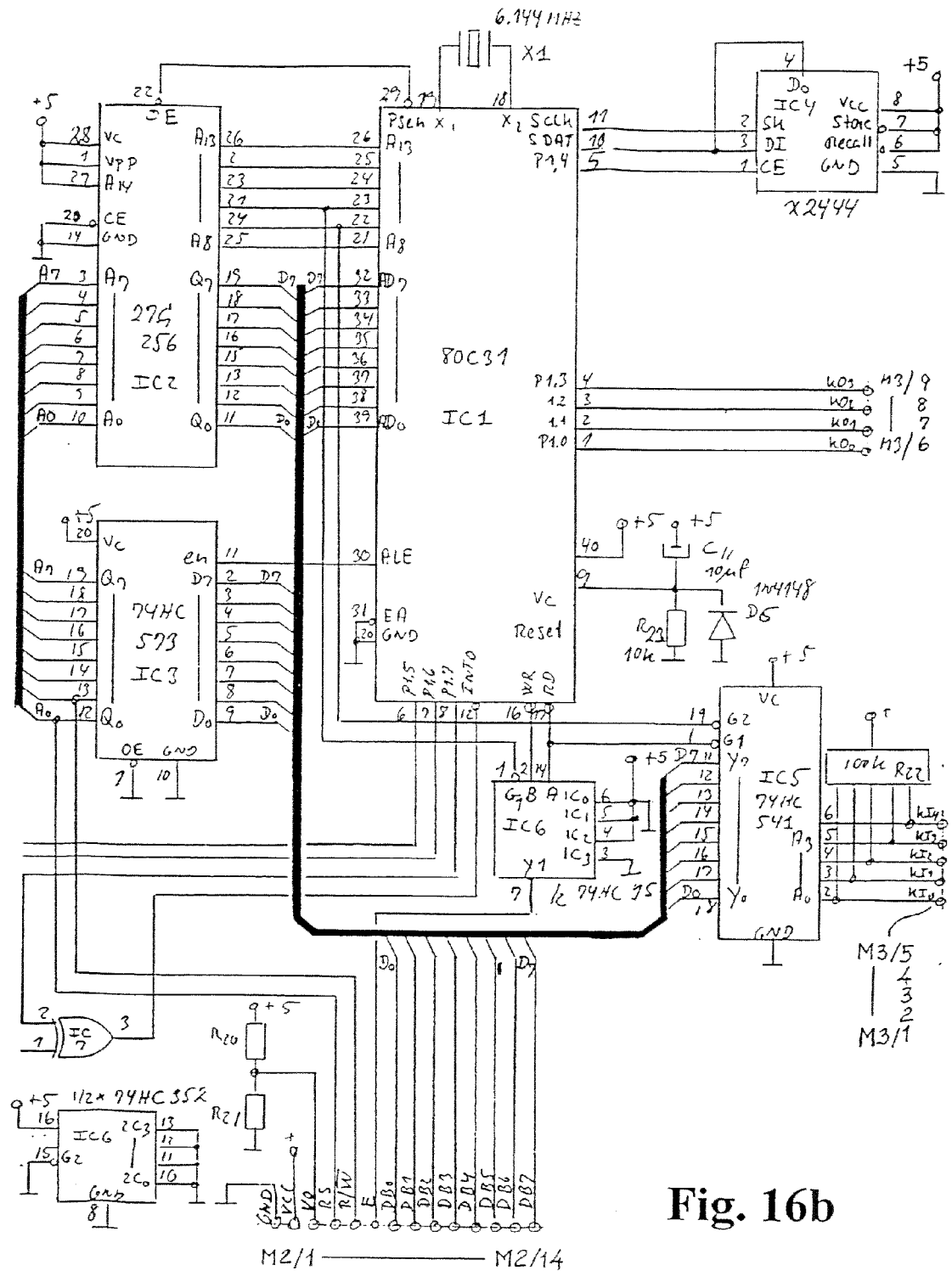

FIGS. 16*a* and 16*b* show a circuit diagram of a mark sender for transmitting start information to the controllable irrigation valves 42 irrespective of the controller and power supply unit's 34 schedules of instructions. The mark sender provides the opportunity for manually control the controllable irrigation valves 42 to open or close and thereby provide an operator the possibility to manually adjust the irrigation during inspection of for example a golf course.

In the above described two-wire controlling and monitoring system, the controller and supply unit 30 supplies a specific schedule of instructions to the two-wire cable 28 for addressing a specific decoder. After the transmission of the specific schedule of instructions to the intentional receiver of the schedule of instructions being a specific decoder, the controller and power supply unit has to carry out the above described "arbitration" in order to obtain information regarding safe receipt of the schedule of instructions and also regarding the performance of the instruction, i.e. information relating to the decoder performing the intentional action or not performing the intentional action. Provided all instructions are to be verified by the above "arbitration", app. 50% of the information band which will be used for the recognition and verification of receipt and the performing of a specific instruction. In order to allow a more simple confirmation of receipt, or in the alternative not-receipt of the intentional information or schedule of instructions by a specific intentional receiving decoder, dedicated time frames are included in the transmission window.

In the system discussed with reference to the above figures leak currents between wires in the two-wire cable 28 and the ground in which the cable is placed may occur. Even though leak currents should be avoided, it is not always possible due to "sores" in the cable/wire isolation or non-correct watertight jointing between the cable and the irrigation control unit 18.

When signalling from the controller and power supply unit 30 to the irrigation control unit 18, leak currents are usually not a problem. The leak current works as an extra load on the two-wire system, i.e. on the two-wire cable 28. But when signalling in the other direction, i.e. from the irrigation control unit 18 to the controller and power supply unit 30 leak currents may influence the ability of the controller and power supply unit 30 to interpret the signalling correctly.

Signals sent from one of the irrigation control units 18 intended to be received at the controller and power supply unit 30 as discussed with reference to FIGS. 6 and 7 are square shaped with a certain amplitude, however due to the leak currents on the transmission line—with the worst influence on the signals sent from one of the irrigation control units 18—may deteriorate the signal from the irrigation control units 18 with the result that the signals no longer are as intended, e.g. the amplitude is lowered or pulled down with the result that signals received at the controller and power supply unit 30 are misinterpreted.

Signalling from the irrigation control unit 18 to the controller and power supply unit 30 is performed by the irrigation control unit 18 in special signalling time frames in and during which it is allowed for the irrigation control unit 18 to short-circuit the two-wire cable 28 if the irrigation control unit 18 wants the voltage on the two-wire cable 28 to be shifted in polarity. The controller and power supply unit 30 detects the short circuit and makes the actual polarity shift, also named "toggling". Thereby the irrigation control unit 18 may create a sequence of polarity shifts, which shifts equal a data packet from the irrigation control unit 18 to the controller and power supply unit 30.

The voltage of the two-wire cable 28 is provided, see FIG. 3, where the two-wire cable 28 receives power from the controller and power supply unit 30. The same Fig. shows voltage versus time curves of a first and a second alternating DC voltage signal simultaneously provided by the controller and power supply unit 30, this signal being referred to in the following as the line voltage from a denoted corresponding line voltage generator.

The controller and power supply unit 30 registers the short-circuit from the irrigation control unit 18 by 1) and 2), i.e.:

1) Lowering the current limit for the line voltage generator to a low value in the special signalling time frame, typically the current limit value is 50 mA. The current limit value has to be relatively low due to—and to avoid—voltage drops in the copper resistance of the two-wire cable 28. The controller and power supply unit 30 controls the current limit for the line voltage generator. A current limiter circuit described with reference to FIG. 17 is connected in series with the line voltage generator supplying e.g. 35 V DC, the level for the max current drawn from the current limiter circuit is adjustable by an internal circuitry of the controller and power supply unit 18.

2) Sensing that the voltage $V_{2\text{-}wire}$ across the two-wire cable 28 is pulled down under a fixed voltage of 10V in the special signalling time frame. The voltage should be significantly below the minimum voltage of the two-wire cable 28 during full load voltage, e.g. 23–25V. As all irrigation control units 18 by definition have a diode with a condensator circuit towards/against the two-wire cable 28, it may only be an intentional short-circuit which pulls or draws the voltage of the two-wire cable 28 down.

Leak currents in cables work partly as an equivalent of a resistor connected between the two-wires in the two-wire cable 28. If this resistance becomes too small for leak currents, it will as a result pull the two-wire cable 28 line resistance down to a low value in and during the special signalling time and make the controller and power supply unit 30 believe that a polarity shift is desired, which is not intended and is due to the leak current or leak currents.

This causes two problems: the first problem is that the controller and power supply unit 30 will use a part of the its bandwidth to make random signalling, and the second problem: the signalling from the irrigation control unit 18 back to the controller and power supply unit 30 will not be possible, since the signalling is distorted due to leak currents.

For these reasons, according to the implementation of the invention, the leak currents and their effects are to be compensated for as discussed in the following: Leak currents and their influence on the two-wire cable 28 are constant e.g. during a short period of time, for instance 2–10 seconds, at the end of this period or even during this period the system may be considered stable, and the currents may be considered DC currents since no pulses or polarity shifts take place on the two-wire cable 28. When the leak current has been compensated for, signalling on the two-wire cable 28 may take place again. When e.g. another period has passed—or just the short period of time referred to above has passed, leak currents could have changed, which again has to be compensated for.

However, leak currents will be dependent of the two-wire polarity at that occasion because leakage from the individual wire towards the ground is important for the total load on the two-wire cable 28. Therefore the influence of the leak currents in the stable "time frame" is measured by applying a "time frame" during which it is certain that none of the irrigation control units 18 will attempt to signal back to the controller and power supply unit 30, i.e. none of the irrigation control units 18 transmits any parameters, e.g. specific irrigation control parameters to the controller and power supply unit 30. During the time frame no schedules of instructions are sent from the controller and power supply unit 18 to the irrigation control units 18.

Afterwards the leak currents may be attempted compensated out in that the irrigation control unit 18 short-circuit later will respond to a resistance constituted by e.g. the short-circuit condition and the +cable resistance electronics in the irrigation control unit 18 parallel with the known leak current which is now known.

The two methods apply a definition of a voltage detection level $V_{detection}$ and a margin $V_{margin}$ for the voltage detection level. The voltage detection level $V_{detection}$ defines the level for a received parameter from one of the irrigation control units. See for example FIGS. 20 and 21 to the left side under "normal communication", where the "shift" indicates that the measured V2-wire voltage level was under the $V_{detection}$ voltage, i.e. a pulled down voltage level was detected being a part of the bits signalling stream from one of the irrigation control units.

The margin $V_{margin}$ is seen in relation to $V_{detection}$ and is applied—when added to $V_{detection}$ as the upper level for $V_{detection}$, and conversely if $V_{margin}$ is subtracted from $V_{detection}$ it is the lower level for $V_{detection}$.

Two different solutions are possible that compensate for the leak current or leak currents, i.e. a method of current compensation and another method applying voltage compensation.

Current compensation method:

1. The controller and power supply unit 30 sets up a "time frame" at a time when it is expected that none of the irrigation control units 18 is responding, i.e. no irrigation control unit 18 signals any parameters back. Further, during the time frame no schedules of instructions are sent from the controller and power supply unit 18 to the irrigation control units 18.

2. The voltage, $V_{2-wire}$ to which the two-wire cable 28 is pulled down to, is measured.

3. If the voltage $V_{2-wire}$ is below the sum of $V_{detection}$ + $V_{margin}$ the current limitation is increased in the "time frame", i.e. the value of the current limitation $I_{max}$ is increased in step with e.g. 5 mA or with a DC current value known from earlier attempts to work properly.

4. Points 2 and 3 are repeated until the voltage is OK, i.e. until the voltage to which the two-wire cable 28 is pulled down to, i.e. $V_{2-wire}$ equals or is higher than $V_{detection}$+ $V_{margin}$.

5. Points 2–4 are repeated with reversed two-wire cable 28 polarity. When subsequent signalling from the irrigation control unit 18, the found value of the current limitation $I_{max}$ which is dependent on the polarity of the two-wire cable 28, is now used together with $V_{detection}$ to detect short-circuit from one of the irrigation control units 18.

Voltage compensation method:

1. The controller and power supply unit 30 sets up a "time frame" at a time when it is expected that none of the irrigation control units 18 is responding, i.e. no irrigation control unit 18 signals any parameters back. Further, during the time frame no schedules of instructions are sent from the controller and power supply unit 18 to the irrigation control units 18.

2. The voltage, i.e. $V_{2-wire}$ to which the two-wire cable 28 is being pulled down to, is measured.

3. If the voltage $V_{2-wire}$ is below ($V_{detection}$+$V_{margin}$), the $V_{detection}$ is lowered to $V_{margin}$ under the actual voltage $V_{2-wire}$, i.e. $V_{detection}$ equals $V_{2-wire}$ minus $V_{margin}$.

4. Points 2–3—just above—are repeated with reversed polarity of the two-wire cable 28.

When subsequent signalling from the irrigation control unit 18 the found value of $V_{detection}$ now found is used (dependent of the polarity of the two-wire cable 28) to detect short-circuit from one of the irrigation control units 18.

In difficult cases a combination of the current and the voltage compensation would be usable, e.g. in cases where leaks are difficult to compensate for by applying the current or the voltage compensation. E.g. if from past attempts it is known that a certain non-normal value of the current limitation $I_{max}$ was reached and/or the method had to repeat points 2–3 of the current compensation method more times than normally required, the current and voltage compensation may be combined methods.

Either the first or the second method, i.e. the current and the voltage compensation may be applied first.

A further advantage of the two methods—and the methods applied in combination or in succession—is that the controller and power supply unit 30 may evaluate the quality of the two-wire communication. If the compensation exceeds certain limits—as expressed in $V_{detection}$+/−$V_{margin}$ and/or in the value of the current limitation $I_{max}$—the controller and power supply unit 30 is able to warn the operator of the system in time that the two-wire communication from the irrigation control unit 18 to the controller and power supply unit 30 may be unstable due to unwanted leak currents somewhere in the cables of the two-wire controlling and monitoring system 10.

The two-wire system, i.e., the two cables of the two-wire cable 28, are, by nature, bipolar, i.e. the two-wire lines, Line-A and Line-B are symmetrical. To simplify the drawings the system is shown in the condition where Line-A is positive and Line-B is negative in relation to the ground. The line change circuit is therefore also left out in the drawings. The voltage referred to is to be seen in relation to Line-B, which is also seen and regarded as a 0V level (DC ground level) in all measurements. In FIG. 17, in the principle diagram, which shows the controller and power supply unit 30 supplying e.g. +35V DC to the two-wire lines, Line-A and Line-B. The 35 V DC is an example of the level for the line voltage for the two-cable wire signalling system.

In series with the output stage there is a current limiter—indicated with the two overlapping circles having an arrow, the arrow indicating the current flow direction, which is regulated by the signal $I_{max}$. As is known in general in the art for a current limiter circuit—regardless of its implementation—such a circuit only allows that current up to a maximum current limit may flow. In the case where a load, typically a relative low load (with a low resistance), the load will, due to Ohms law I=V/R, "try" to draw current I;

however if this current is computed to be higher than $I_{max}$, only $I_{max}$ flows. Conversely, if the current is computed to be lower than $I_{max}$ (in the case where the load is a high resistance) following Ohms law: I=V/R, I as computed then only flows.

The final voltage across the two-wire cable 28, i.e. $V_{2\text{-}wire}$ wire is compared with $V_{detection}$ and thus generates the signal "Shift" provided the final voltage on the two-wire cable 28 is lower than $V_{detection}$. $V_{2\text{-}wire}$ is measured after the current limiter circuit by means of a voltmeter measuring the voltage across its two terminals, i.e. across Line-A and Line-B.

"Shift" means that the controller and power supply unit 30 wants to re-polarise the two-wire simultaneously provided voltages (Toggle). This, however, is not shown. The two-wire lines A+B are symbolized by means of copper resistances in the wire denoted with the three $R_{cu}$ and the load considered equivalent to the leak current(s) in the cable is symbolized with $R_{leak}$. Signalling switch for the irrigation control unit 18 is shown with the circuit around S1.

In FIG. 18, a sequence by a non-compensated system in which $R_{leak}$ is not critical is shown. In this case there is no need to apply the invention (current or voltage compensation or their combination) since the value of $R_{leak}$ is not critical. The control from the irrigation control unit 18 of S1 expects "Shift" at position 2 and 4 and none at position 1 and 3. It is noted that "Shift" is correct.

FIG. 19 shows the same sequence as the foregoing figure, but now $R_{leak}$ has a critical value. The resistor is equivalent to leak(s). $R_{leak}$ now causes erroneous shifts at position 1 and 3. Communication from the irrigation control unit 18 toward the controller and power supply unit 30 is not possible due to the erroneous shifts at position 1 and 3. These two shifts are caused by leak current(s) not compensated for.

FIG. 20 shows where current compensation according to the invention is applied and $R_{leak}$ is critical. During a period when no irrigation control unit 18 is known to switch S1, i.e. the "time frame" at a time when it is expected that none of the irrigation control units 18 is responding, i.e. no irrigation control unit 18 signals back, a sequence is run through (a-d) with an increasingly reduced $I_{max}$ (here three reductions as shown) in order to find the exact $I_{max}$ which just then compensates for the error induced from $R_{leak}$. This means that the $V_{2\text{-}wire}$ voltage at this point does not go below the sum of $V_{detection}$ and $V_{margin}$.

Communication, i.e. the signalling in the form of transferring parameters from the irrigation control unit 18 to the controller and power supply unit 30 therefore functions correctly as indicated in the sequence 1 to 4.

The current compensation method—compensating out leak currents in a two cable wire signalling system signalling between a controller and power supply unit and one or more irrigation control units—may be considered to execute the steps:

setting up the first and second alternating DC voltage signals to be simultaneously provided to the two-wire cable;

defining a current limiter circuit connected in series with the simultaneously applied DC voltage signals, the current limiter circuit having $I_{max}$ as its current limitation level, the current limitation level $I_{max}$ being adjustable; defining a voltage detection level $V_{detection}$ and a margin $V_{margin}$ for the voltage detection level, the voltage detection level defining the level for a received parameter from one of the irrigation control units;

defining a line voltage, $V_{2\text{-}wire}$ which is measured as the voltage across the two-wire cable 28 at a point after the current limiter circuit;

defining a time frame in which none of the irrigation control units transmits nor the controller and power supply unit transmits parameters to one another;

measuring the line voltage, $V_{2\text{-}wire}$, in the time frame by means of a voltmeter, increasing the current limitation level $I_{max}$ of the current limiter circuit;

repeating the two foregoing steps until the measured line voltage $V_{2\text{-}wire}$ is higher than or equals the sum of the $V_{detection}$ and the margin $V_{margin}$; and applying the found current limitation level $I_{max}$ for the line voltage when receiving signals sent from one of one or more irrigation control units to the controller and power supply unit.

And in order to operate with the opposite line voltage supply from the line voltage generator which supplies the two-cable wire signalling system the current compensation method further executes the step of:

reversing the two simultaneously-supplied DC voltage levels, and applying the above steps resulting in another found current limitation $I_{max}$ for these DC voltage levels.

FIG. 21 shows where voltage compensation according to the invention is applied as the alternative to the current compensation, and again $R_{leak}$ has a critical value.

During a period when no irrigation control unit 18 is known to switch S1, i.e. the "time frame" at a time when it is expected that none of the irrigation control units 18 is responding, i.e. no irrigation control unit 18 signals back, a sequence is run through (a-b) during which sequence $V_{detection}$ in principle is reduced so that the reduced voltage for $V_{detection}$ compensates for the error induced from $R_{leak}$. This means that the $V_{2\text{-}wire}$ voltage does not go below the sum of $V_{detection}$ and $V_{margin}$. Accordingly, the voltage detection level, $V_{detection}$ is set to the line voltage, $V_{2\text{-}wire}$ minus $V_{margin}$.

Communication, i.e. the signalling in the form of transferring parameters from the irrigation control unit 18 to the controller and power supply unit 30 is subsequently to be expected to function correct as indicated in the sequence 1 to 4.

The voltage compensation method—compensating out leak currents in a two cable wire signalling system signalling between a controller and power supply unit and one or more irrigation control units—may be considered to execute the steps:

setting up the first and second alternating DC voltage signals to be simultaneously provided to the two-wire cable;

defining a time frame in which none of the irrigation control units transmits nor the controller and power supply unit transmits parameters to one another; defining a voltage detection level $V_{detection}$ and a margin $V_{margin}$ for the voltage detection level, the voltage detection level defining the level for a received parameter from one of the irrigation control units;

defining a line voltage, $V_{2\text{-}wire}$ which is measured as the voltage across the two-wire cable 28;

measuring the line voltage, $V_{2\text{-}wire}$, in the time frame by means of a voltmeter, setting the voltage detection level, $V_{detection}$ to the line voltage, $V_{2\text{-}wire}$ minus $V_{margin}$, when the voltage $V_{2\text{-}wire}$ is below ($V_{detection}+V_{margin}$); and applying the set voltage detection level, $V_{detection}$ for the level line voltage when receiving signals sent from one of one or more irrigation control units to the controller and power supply unit.

In order to operate with the opposite line voltage supply from the line voltage generator which supplies the two-wire cable signalling system, the voltage compensation method further executes the step of:

reversing the two simultaneously supplied DC voltage levels, and applying the above steps resulting in another found voltage detection level $V_{detection}$ for these DC levels.

The numerical value of the first and second DC level line voltage is e.g. 35 V. The $V_{detection}$ and/or the margin $V_{margin}$ level is/are user selectable, e.g. by means of a menu driven selection on the controller and power supply unit. This also applies to $I_{max}$.

Each of the methods—voltage and current compensation and the combination of the two—is implemented as an addition to the normal basic functioning of the system for irrigation, i.e. normally the system is used to irrigate whereby normal signalling goes forth and back between the irrigation control units and the controller and power supply unit. Normally, the methods are always active, but of course no compensation takes place when not detected to be required. However, in case that leak currents deteriorate and/or make it difficult for the controller and power supply unit to receive signalling from any of the irrigation control units, one of these three methods are applied to compensate out the leak currents.

The invention could be physically implemented as follows:

Method No. 1, i.e. the current compensation requires that there is a variable current limiter in the two-wire output stage besides a voltmeter measuring $V_{2\text{-}wire}$ across its two terminals. See the enclosed circuit diagram SDC-1 in FIG. 22. The applicant has implemented the current compensation by means of the circuit shown in the diagram.

Method No. 2 i.e. the Voltage compensation requires nothing beyond what is normally implemented for the communication between the control unit 18 and the controller and power supply unit 30 communication. This means that the electronic circuitry already present, i.e. the electronic circuitry as used prior to this invention may be applied (switching between High/Low current limitation and a voltmeter). See the enclosed circuit diagram RBC200 in FIG. 23. The applicant has implemented the voltage compensation by means of the circuit shown in the diagram.

The sensor decoder 52 shown in FIG. 11 and as described above was implemented in a prototype version from the following components.

| Fuse | |
| --- | --- |
| P1 | 230 V |
| Resistors: | |
| R1 | 46R4 |
| R2 | 46R4 |
| R3 | 100K |
| R4 | 86K6 |
| R5 | 100K |
| R6 | 100K |
| R7 | 100K |
| R8 | 10K |
| R9 | 150K |
| R10 | 768K |
| R11 | 22K1 |
| R12 | 100K |
| R13 | 39K |
| R14 | 39R2 |
| R15 | 10K |
| R16 | 39K |
| R17 | 39K |
| R18 | 10K |
| R19 | 39K |
| R20 | 39K |
| R21 | 86K6 |
| -continued | |
| R22 | 4R7 |
| R23 | 10K |
| R24 | 10K |
| R25 | 10K |
| R26 | 10K |
| R27 | 470K |
| R28 | 470K |
| R29 | 56K |
| R30 | 39K |
| R31 | 27K1 |
| R32 | 39K |
| R33 | 56K |
| R34 | 100K |
| R35 | 2K49 |
| R36 | 825R |
| R37 | 2R2 |
| R38 | 39K |
| Capacitors | |
| C1 | 1000μ |
| C2 | 10n |
| C3 | 100n |
| C4 | 10μ |
| C5 | 33p |
| C6 | 33p |
| C7 | 1n |
| C8 | 1n |
| C9 | 100n |
| C10 | 100n |
| C11 | 1n |
| C12 | 1n |
| C13 | 1n |
| Diodes | |
| D1 | DF04S |
| D2 | 10V |
| D3 | BYD17D |
| D4 | BYD17D |
| D5 | BYD17D |
| D6 | BYD17D |
| D7 | 6V8 |
| D8 | LL4148 |
| D9 | LL4148 |
| D10 | 3V2 |
| D11 | 22V |
| D12 | 22V |
| D13 | 15V |
| Transistors | |
| Q1 | TIP122 |
| Q2 | BC856 |
| Q3 | BC846 |
| Q4 | BC856 |
| Q5 | BC846 |
| Q6 | MJD6039 |
| Q7 | MJD6039 |
| Integrated Circuits and Crystal | |
| IC1 | ST6220 |
| IC2 | 93C05 |
| IC3 | LM317LM |
| IC4 | LM358N |
| IC5 | LMC662C |
| X1 | 6.144 MHz |

The line decoder 44 shown in FIG. 12 and as described above was implemented in a prototype version from the following components.

| Fuse | |
| --- | --- |
| P1 | 200 mA |
| Resistors: | |
| R1 | 470K |
| R2 | 100K |

-continued

| | |
|---|---|
| R3 | 100K |
| R4 | 680K |
| R5 | 100K |
| R6 | 68K |
| R7 | 56K |
| R8 | 470K |
| R9 | 1K |
| R10 | 33K |
| R11 | 1M |
| R12 | 470K |
| R13 | 1K |
| R18 | 1K |
| R19 | 3K3 |
| Capacitors | |
| C1 | 3n3 |
| C2 | 3n3 |
| C3 | 3n3 |
| C4 | 10μ |
| C5 | 10μ |
| C6 | 1000μ |
| C7 | 3n3 |
| Diodes | |
| D1 | DF04S |
| D2 | BZX84-10V |
| D3 | LL4148 |
| D4 | MLL4690 |
| D5 | BYD17D |
| D6 | BYD17D |
| Transistors | |
| Q1 | BC856B |
| Q2 | BC856B |
| Q3 | 2SB1214 |
| Q4 | 2SB1817 |
| Integrated Circuits | |
| IC1 | μPD7556 |
| IC2 | 93C06 |

The line decoder 44 shown in FIG. 12 and as described above was implemented in a prototype version from the following components.

| Resistors: | |
|---|---|
| R1 | 470K |
| R2 | 100K |
| R3 | 100K |
| R4 | 680K |
| R5 | 100K |
| R6 | 68K |
| R7 | 56K |
| R8 | 470K |
| R9 | 1K |
| R10 | 33K |
| R11 | 1M |
| R12 | 68K |
| R13 | 1K |
| R14 | 3K3 |
| R15 | 3K3 |
| R16 | 3K3 |
| R17 | 3K3 |
| R18 | 1K |
| R19 | 3K3 |
| Capacitors | |
| C1 | 3n3 |
| C2 | 3n3 |
| C3 | 2200μ |
| C4 | 10μ |
| C5 | 1μ |

-continued

| | |
|---|---|
| Diodes | |
| D1 | DF04S |
| D2 | BZX84-10V |
| D3 | LL4148 |
| D4 | MLL4690 |
| D5 | BYD17D |
| D6 | BYD17D |
| D7 | BYD17D |
| D8 | BYD17D |
| D9 | BYD17D |
| D10 | BYD17D |
| D11 | BYD17D |
| D12 | BYD17D |
| D13 | BYD17D |
| D14 | BYD17D |
| D15 | BYD17D |
| D16 | BYD17D |
| D17 | BYD17D |
| Transistors | |
| Q1 | BC856B |
| Q2 | BC855B |
| Q3 | 2SB1214 |
| Q4 | 2SB1214 |
| Q5 | 2SB1214 |
| Q6 | 2SB1214 |
| Q7 | MJD6039 |
| Q8 | 2SB1214 |
| Q9 | 2SB1214 |
| Integrated Circuits | |
| IC1 | μPD7556 |
| IC2 | 93C06 |

The microprocessor and storage section shown in FIGS. 14a and 14b and as described above was implemented in a prototype version from the following components.

| Resistors: | |
|---|---|
| R105 | 4K7 |
| R104 | 1K |
| R14 | 1M |
| R4 | 680K |
| R102 | PTC4.3 |
| R101 | 0R |
| Capacitors and Inductors | |
| C101 | 100μ |
| C103 | 100n |
| C104 | 100n |
| C105 | 100n |
| C106 | 100n |
| C107 | 100n |
| C108 | 22n |
| C109 | 22n |
| C110 | 22n |
| C111 | 22n |
| C112 | 10μ |
| C113 | 22n |
| C6 | 33p |
| C7 | 33p |
| L101 | 10μ |
| L102 | 10μ |
| L103 | 10μ |
| Diodes | |
| D1 | ICTE5 |
| D104 | BZW06P6V8B |
| D105 | BZW06P6V8B |
| Integrated Circuits and Crystal | |
| IC101 | 27256 |
| IC102 | 62256 |

-continued

| | |
|---|---|
| IC103 | 6264 |
| IC104 | 6264 |
| IC106 | 74HC138 |
| IC107 | 8031 |
| IC108 | 74HC573 |
| IC110 | 75175 |
| IC111 | 74HC02 |
| IC112 | 74HC08 |
| IC115 | 4548 |
| IC116 | 74HC366 |
| IC4 | PC812 |
| IC5 | PC813 |
| IC6 | PC910 |
| X1 | 11.0592 |

The power output stage shown in FIGS. 15a and 15b and as described above was implemented in a prototype version from the following components.

| Resistors: | |
|---|---|
| R1 | 390R |
| R2 | 1K |
| R3 | Not Used |
| R4 | 390R |
| R5 | Not Used |
| R6 | 100R |
| R7 | 100R |
| R8 | 10K |
| R9 | 18K |
| R10 | 390K |
| R11A | 2R |
| R11B | 2R |
| R11C | 2R |
| R11D | 2R |
| R12 | 1K |
| R13 | 1M |
| R15 | 10K |
| R16 | 14K |
| R17 | 487K |
| R18 | 10K |
| R19 | 110K |
| R20 | 53K6 |
| R21 | 365K |
| R22 | 4R7 |
| R23 | 470R |
| R24 | 470R |
| R25 | 27R |
| R26 | 27R |
| R27 | 1K |
| R28 | 47R |
| R29 | 10K |
| R30 | 100K |
| R31 | 100K |
| R32 | 100K |
| R33 | 100R |
| R34 | 1K |
| R35 | 20K |
| R36 | 1M |
| R37 | 68R |
| R38 | 270R |
| R39 | 47R |
| R40 | 100K |
| R51 | 390K |
| R52 | 10K |
| R53 | 1K |
| P1 | S10K25 |
| P2 | S10K25 |
| P3 | S10K25 |
| P5 | S10K25 |
| P6 | S10K25 |
| P7 | S10K25 |
| Capacitors and Inductors | |
| C1 | Not Used |
| C2 | Not Used |

-continued

| | |
|---|---|
| C3 | Not Used |
| C4 | Not Used |
| C5 | 1n |
| C8 | 1000μ |
| C9 | 100μ |
| C10 | 100μ |
| C12 | 10μ |
| C13 | 10μ |
| C14 | 10μ |
| C15 | 22n |
| C16 | 22n |
| C20 | Not Used |
| C21 | Not Used |
| C50 | 100n |
| C51 | 100n |
| C52 | 1μ |
| L1 | 25μ |
| L2 | 25μ |
| RE1 | Relay |
| Diodes | |
| D1 | BYW98 |
| D2 | BYW98 |
| D4 | Z6V8 |
| D5 | Z15V/1W |
| D6 | 1N4148 |
| D8 | 1N4002 |
| D9 | 1N4002 |
| D10 | 1N4002 |
| D11 | 1N4002 |
| D103 | 1N4148 |
| Transistors | |
| T1 | BC637 |
| T2 | BDW74D |
| T3 | IRFD02 |
| T4 | BC637 |
| T5 | BDW74D |
| T6 | IRFD02 |
| T8 | TIP100 |
| Integrated Circuits | |
| IC1 | LM7812 |
| IC2 | CA3240A |
| IC3 | LM340LA |
| IC7 | LM3395 |
| IC9 | 4001 |
| IC10 | 4053 |
| IC11 | 4094 |
| IC12 | 4094 |
| IC13 | ADC0834 |
| IC14 | 44111 |
| IC15 | TCA365A |

The mark sender shown in FIGS. 16a and 16b and as described above was implemented in a prototype version from the following components.

| Resistors: | |
|---|---|
| R1 | 12R |
| R2 | 10K |
| R3 | 5K6 |
| R4 | 22R |
| R5 | 2K2 |
| R6 | 10K |
| R7 | 680R |
| R8 | 330R |
| R9 | 100K |
| R10 | 100K |
| R11 | 270K |
| R12 | 270K |
| R13 | 10K |
| R14 | 3K3 |

-continued

|   |     |
|---|-----|
| R15 | 10K |
| R16 | 2K2 |
| R17 | 10K |
| R18 | 56K |
| R19 | 27K |
| R20 | 10K |
| R21 | 1K |
| R22 | 100K |
| R23 | 10K |
| Capacitors and Inductors | |
| C1 | 10µ |
| C2 | 220µ |
| C3 | 100n |
| C4 | 220p |
| C5 | 100µ |
| C6 | 47n |
| C7 | 47n |
| C8 | 47n |
| C9 | 47n |
| C10 | 100n |
| C11 | 10µ |
| C12 | 100n |
| C13 | 220µ |
| L1 | 100µ |
| Diodes | |
| D1 | DFO4M |
| D2 | P6KE47A |
| D3 | 10V |
| D4 | BYW100 |
| D5 | 3V9 |
| D6 | 1N4148 |
| Transistors | |
| T1 | IRF9120 |
| T2 | BC337 |
| T3 | IRF110 |
| T4 | IRF110 |
| Integrated Circuits and Crystal | |
| IC1 | 80C31 |
| IC2 | 26G256 |
| IC3 | 74HC573 |
| IC4 | X2444 |
| IC5 | 74HC541 |
| IC6A | 74HC95 |
| IC6B | 74HC352 |
| IC7 | 74HC86 |
| IC8 | LM324 |
| IC9 | 7555 |
| IC10 | LM317 |
| X1 | 6.144 MHz |

Figure 22A:
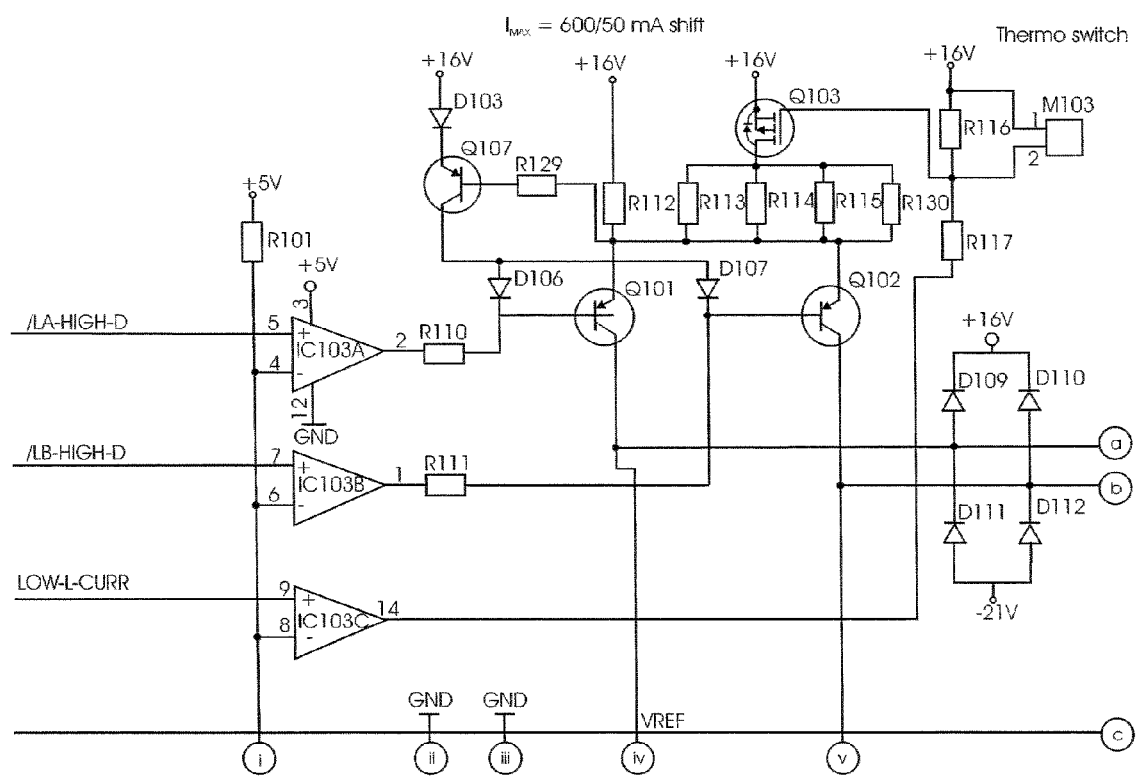
FIG. 22 shows a circuit diagram implementing current compensation.
Figure 22B:
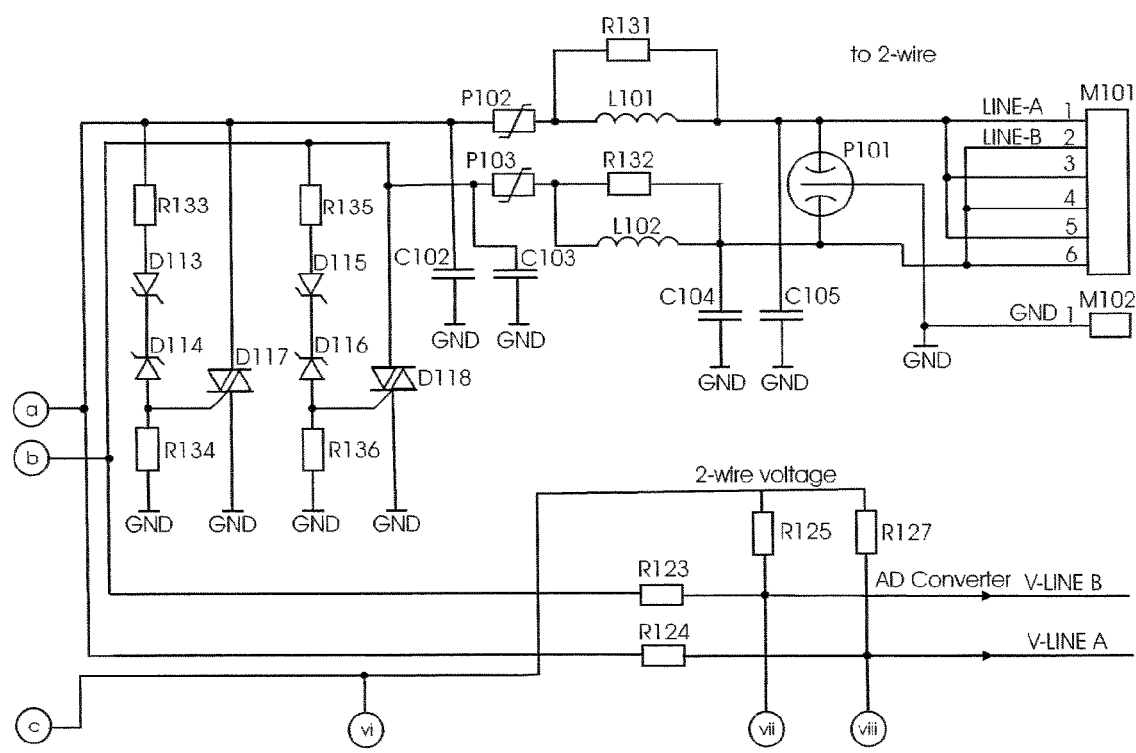
Figure 22C:
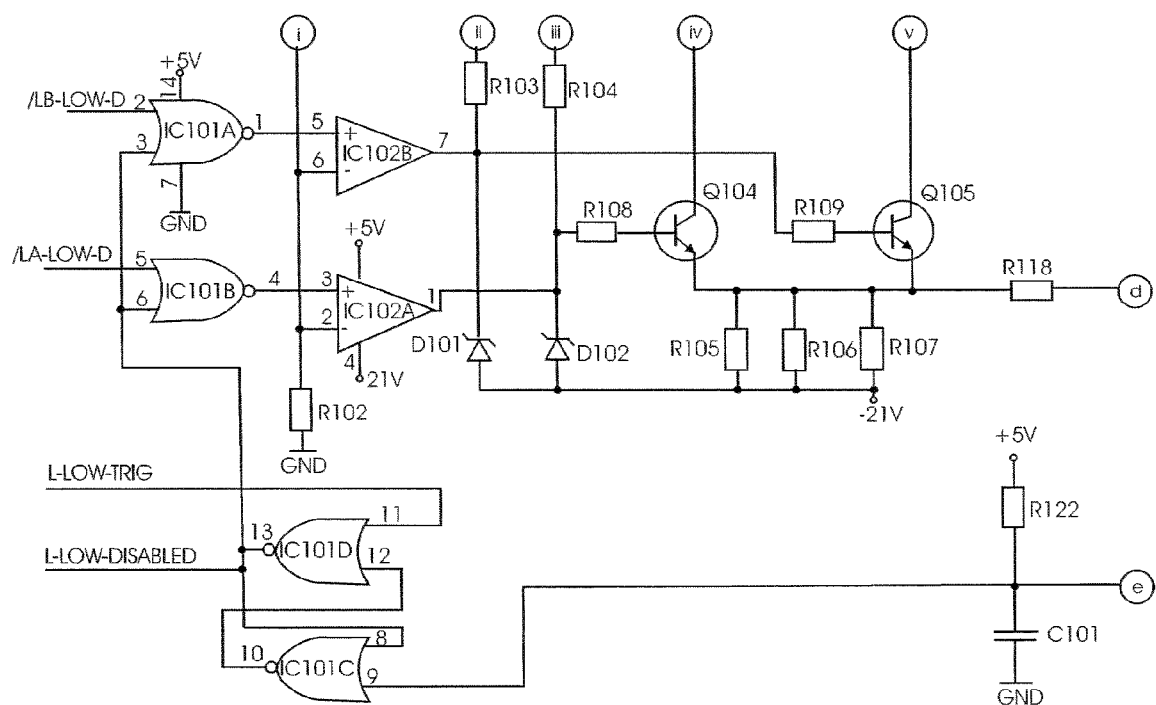
Figures 22, 22D:
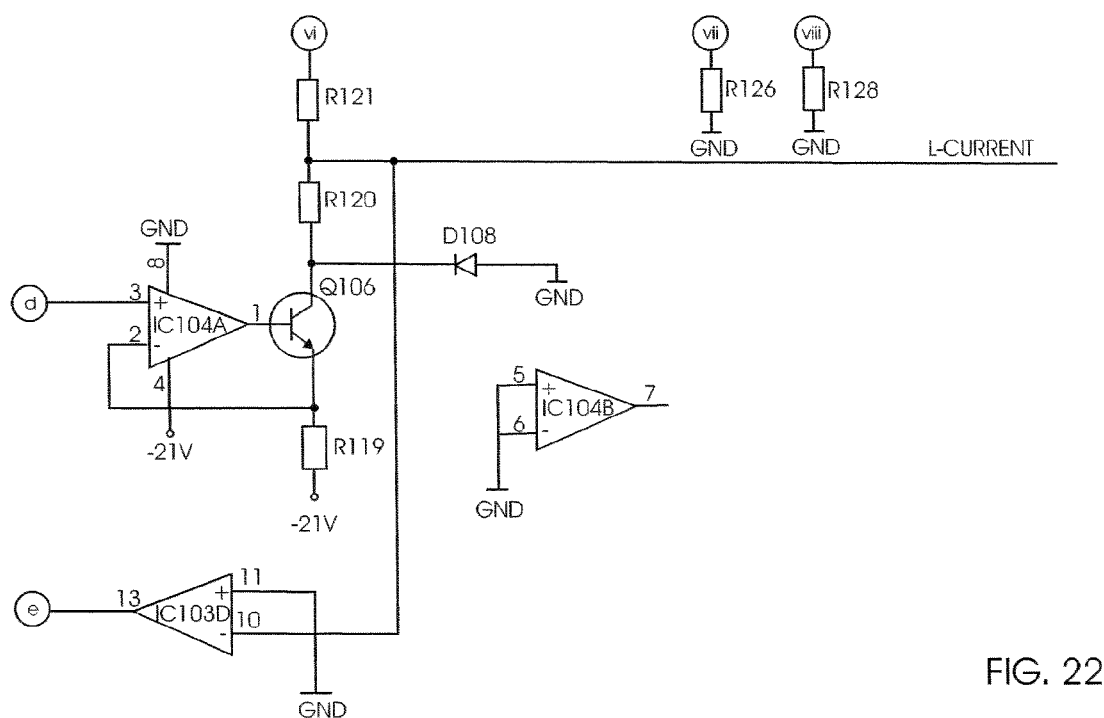

The circuit diagram in FIG. 22 implementing the current compensation was implemented in a prototype version by the applicant and is considered to be self-explanatory and consists of the following part:

| Used | Part Type | Designator |
|------|-----------|------------|
| Resistors | | |
| 2 | 0.9 A | P102 P103 |
| 9 | 100 R | R108 R109 R118 R131 R132 R133 R134 R135 R136 |
| 3 | 10K | R101 R102 R116 |
| 2 | 10K0 | R125 R127 |
| 2 | 13K0 | R126 R128 |
| 1 | 1K0 | R129 |
| 1 | 22 R | R112 |
| 1 | 300 R | R120 |
| 1 | 3K32 | R121 |

-continued

| Used | Part Type | Designator |
|------|-----------|------------|
| 3 | 3R90 | R105 R106 R107 |
| 2 | 40K2 | R123 R124 |
| 4 | 4K7 | R110 R111 R117 R122 |
| 1 | 681 R | R119 |
| 2 | 6K8 | R103 R104 |
| 4 | 8R25 | R113 R114 R115 R130 |
| capacitors | | |
| 3 | 100 NF | C101 C102 C103 |
| 2 | 1 NF/500 V | C104 C105 |
| Coils | | |
| 2 | 1000 UH/0.6 A | L101 L102 |
| Spark gabs | | |
| 1 | 90 V | P101 |
| Diodes | | |
| 4 | 22 V | D113 D114 D115 D116 |
| 2 | 3V3 | D101 D102 |
| 2 | BT136D | D117 D118 |
| 4 | BYD17 | D109 D110 D111 D112 |
| 4 | LL4148 | D103 D106 D107 D108 |
| Transistors | | |
| 1 | BC846 | Q106 |
| 1 | BC856 | Q107 |
| 2 | MJD6039 | Q104 Q105 |
| 1 | Si9400DY | Q103 |
| 2 | TIP127 | Q101 Q102 |
| Integrated Circuits | | |
| 1 | LM339 | IC103 |
| 1 | LM358 | IC104 |
| 1 | LM393A | IC102 |
| 1 | 74HC02 | IC101 |

Figure 23A:
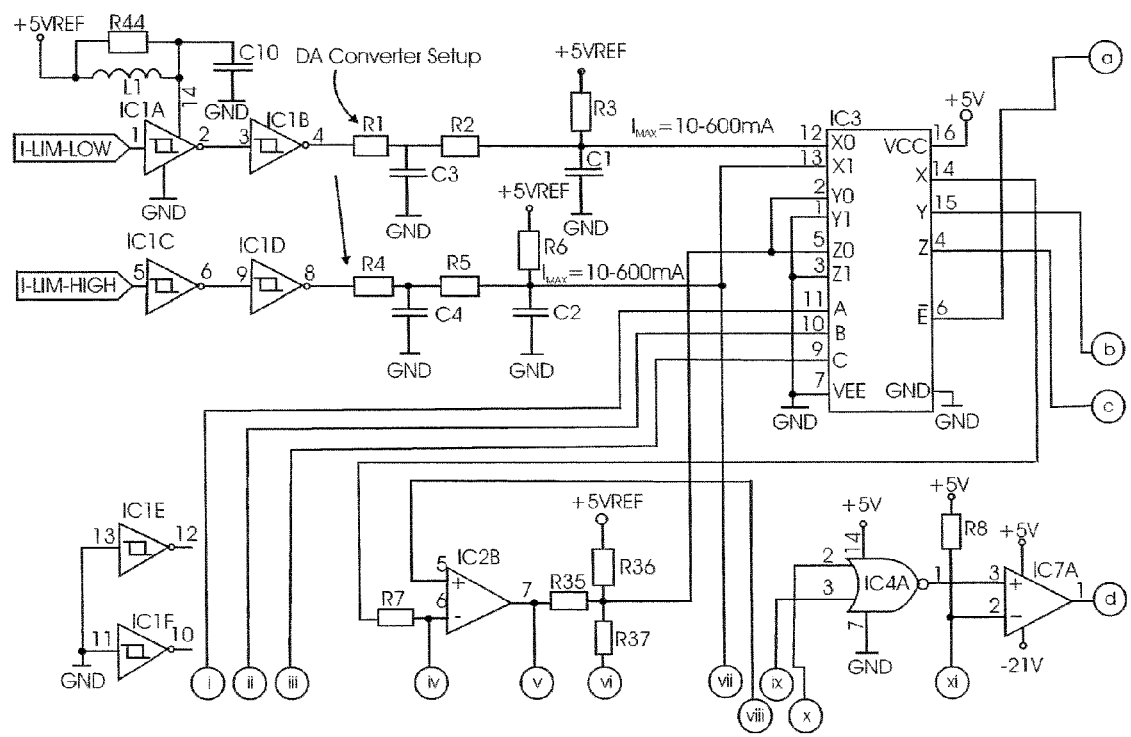
FIG. 23 shows a circuit diagram implementing voltage compensation.
Figure 23B:
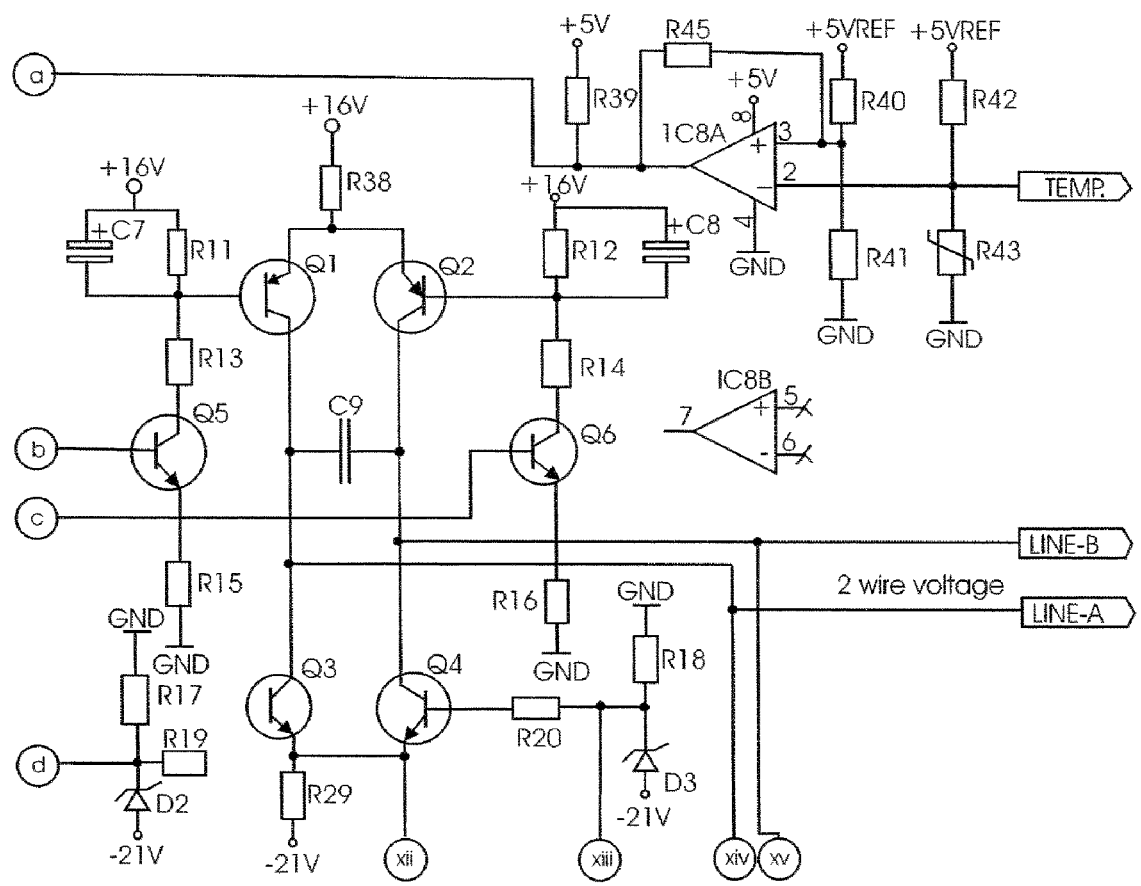
Figure 23C:
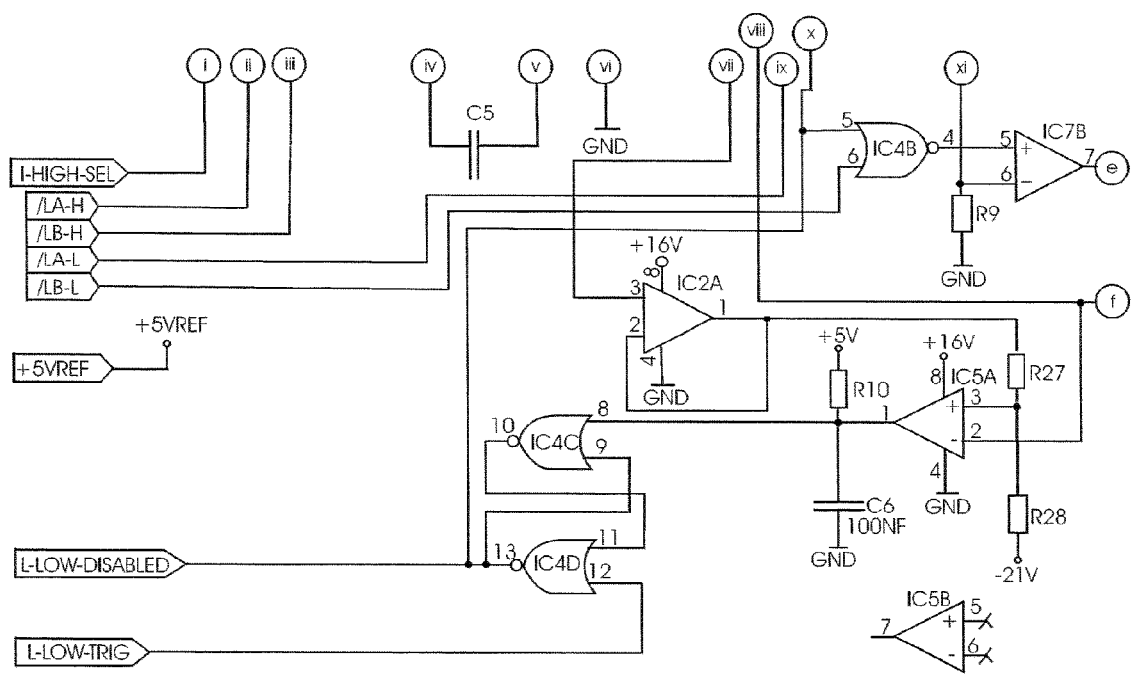
Figures 23, 23D:
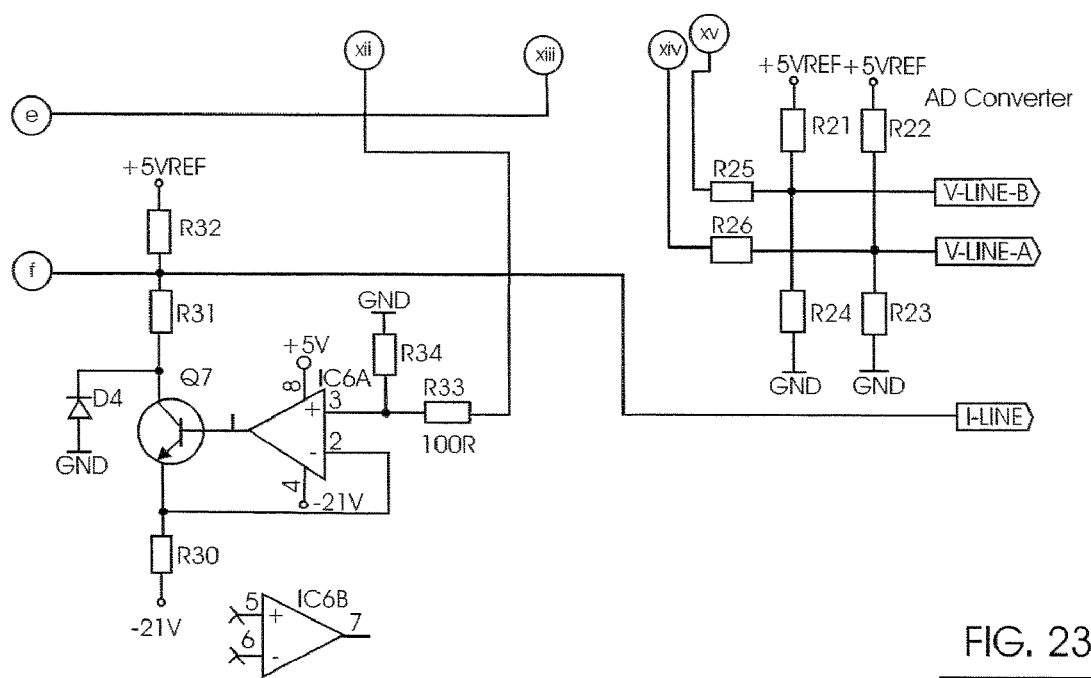

The circuit diagram in FIG. 23 implementing the voltage compensation was implemented in a prototype version by the applicant and is considered to be self-explanatory and consists of the following part:

| Used | Part Type | Designator |
|------|-----------|------------|
| Resistors | | |
| 1 | 0R51 | R29 |
| 4 | 100 R | R19 R20 R33 R44 |
| 4 | 10K | R37 R39 R8 R9 |
| 2 | 10K0 | R21 R22 |
| 2 | 13K0 | R23 R24 |
| 1 | 150K | R2 |
| 4 | 1K0 | R13 R14 R27 R7 |
| 1 | 1K00 | R41 |
| 1 | 1M0 | R45 |
| 1 | 1R0 | R38 |
| 2 | 220K | R34 R6 |
| 1 | 22K | R5 |
| 1 | 22K NTC | R43 |
| 3 | 27K | R3 R35 R36 |
| 2 | 2K2 | R1 R4 |
| 4 | 390 R | R11 R12 R15 R16 |
| 2 | 3K32 | R40 R42 |
| 2 | 40K2 | R25 R26 |
| 3 | 4K7 | R10 R17 R18 |
| 1 | 56K | R28 |
| 1 | 5K11 | R32 |
| 2 | 681 R | R30 R31 |
| Capacitors | | |
| 3 | 10 NF | C1 C10 C2 |
| 3 | 1 UF | C7 C8 C9 |

-continued

| Used | Part Type | Designator |
|---|---|---|
| 1 | 1 NF | C5 |
| 3 | 100 NF | C3 C4 C6 |
| | Coils | |
| 1 | 1 mH | L1 |
| | Diodes | |
| 2 | BZX84C2V4 | D2 D3 |
| 1 | LL4148 | D4 |
| | Transistors | |
| 3 | BC846 | Q5 Q6 Q7 |
| 2 | TIP122 | Q3 Q4 |
| 2 | TIP127 | Q1 Q2 |
| | Integrated Circuits | |
| 1 | 4053 | IC3 |
| 2 | LM358 | IC2 IC6 |
| 3 | LM393A | IC5 IC7 IC8 |
| 1 | 74HC02 | IC4 |
| 1 | 74HC14 | IC1 |

What is claimed is:

1. A two-wire controlling and monitoring system for irrigation of localized areas of soil, comprising:
   a water pipeline providing water to said localized areas of soil;
   a plurality of controllable irrigation valves, each positioned at a specific area of said localized areas of soil, communicating with said water pipeline, providing watering of said specific area controlled by said controlling and monitoring system and having a pair of valve control inputs;
   a plurality of localized irrigation control units, each comprising a line decoder having a pair of valve control outputs connected to said pair of valve control inputs of a specific controllable irrigation valve of said plurality of controllable irrigation valves for providing valve control signals to said plurality of controllable irrigation valves, said line decoders further each having a pair of control and power supply inputs;
   a controller and power supply unit having a set of schedules of instructions and having a pair of control and power outputs supplying power by applying a first alternating DC voltage signal defining a voltage maximum having a first pulse width and defining a voltage minimum having a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a current maximum having a third pulse width and defining a current minimum having a fourth pulse width to said pair of control and power outputs;
   a two-wire cable interconnecting said controller and power supply unit and said plurality of localized irrigation control units and connecting said pair of control and power outputs of said controller and power supply unit to said control and power inputs of said plurality of localized irrigation control units and providing said power from said controller and power supply unit to each of said plurality of localized irrigation control units;
   said controller and power supply unit transmitting said schedules of instructions to said plurality of localized irrigation control units through said two-wire cable and receiving said specific irrigation parameters from said plurality of localized irrigation control units through said two-wire cable; and
   a first time frame being defined in said first alternating DC voltage signal, within said first time frame of a first occurring first alternating DC voltage signal, said controller and power supply unit reducing said alternating DC current to a first short circuiting current detection level and measuring any reduction of said first alternating DC voltage signal, and within said first time frame of a succeeding first alternating DC voltage signal said controller and power supply unit increasing said first short circuiting current detection level to an increased first short circuiting current detection level so as to compensate any reduction of said first alternating DC voltage signal.

2. The two-wire controlling and monitoring system according to claim 1, further comprising a second time frame being defined in said second alternating DC voltage signal, within said second time frame of a first occurring second alternating DC voltage signal, said controller and power supply unit reducing said alternating DC current to said increased first short circuiting current detection level and measuring any reduction of said second alternating DC voltage signal, and within said second time frame of a succeeding second alternating DC voltage signal said controller and power supply unit increasing said increased first short circuiting current detection level to a second short circuiting current detection level so as to compensate any reduction of said second alternating DC voltage signal.

3. The two-wire controlling and monitoring system according to claim 1, wherein, during said first time frame, said controller and power supply unit are not transmitting said schedules of instructions to said plurality of localized irrigation control units.

4. The two-wire controlling and monitoring system according to claim 2, wherein, during said second time frame, said controller and power supply unit are not transmitting said schedules of instructions to said plurality of localized irrigation control units.

5. The two-wire controlling and monitoring system according to claim 1, wherein said controller and power supply unit subsequently apply, during said first and second alternating DC voltage signals, said increased first short circuiting current detection level and said second short circuiting current detection level.

6. The two-wire controlling and monitoring system according to claim 1, further comprising a plurality of field sensors positioned at specific areas of said localized areas of soil, providing specific irrigation parameters and having a pair of sensor outputs, wherein said plurality of localized irrigation control units further comprises a sensor decoder having a pair of sensor inputs connected to said pair of sensor outputs of a specific field sensor of said plurality of field sensors for providing power to said plurality of field sensors and recording said specific irrigation parameters from said plurality of field sensors, said sensor decoders further each having a pair of control and power supply inputs.

7. A two-wire controlling and monitoring system for irrigation of localized areas of soil, comprising:
   a water pipeline providing water to said localized areas of soil;

a first plurality of controllable irrigation valves each positioned at a specific area of said localized areas of soil, communicating with said water pipeline, providing watering of said specific area of said localized areas controlled by said controlling and monitoring system of soil and having a pair of valve control inputs;

a second plurality of field sensors positioned at specific areas of said localized areas of soil, providing specific irrigation parameters and having a pair of sensor outputs;

a third plurality of localized irrigation control units each comprising a sensor decoder having a pair of sensor inputs connected to said pair of sensor outputs of a specific field sensor of said plurality of field sensors for providing power to said plurality of field sensors and recording said specific irrigation parameters from said plurality of field sensors, said sensor decoders further each having a pair of control and power supply inputs;

a controller and power supply unit having a set of schedules of instructions and having a pair of control and power outputs supplying power by applying a first alternating DC voltage signal defining a voltage maximum having a first pulse width and defining a voltage minimum baying a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a current maximum having a third pulse width and defining a current minimum having a fourth pulse width to said pair of control and power outputs;

a two-wire cable interconnecting said controller and power supply unit and said third plurality of localized irrigation control units and connecting said pair of control and power outputs of said controller and power supply unit to said control and power inputs of said third plurality of localized irrigation control units and providing said power from said controller and power supply unit to each of said third plurality of localized irrigation control units;

said controller and power supply unit transmitting said schedules of instructions to said third plurality of localized irrigation control units through said two-wire cable and receiving said specific irrigation parameters from said third plurality of localized irrigation control units through said two-wire cable; and a first time frame being defined in said first alternating DC voltage signal, within said first time frame of a first occurring first alternating DC voltage signal, said controller and power supply unit reducing said alternating DC current to a first short circuiting current detection level and measuring any reduction of said first alternating DC voltage signal, and within said first time frame of a succeeding first alternating DC voltage signal said controller and power supply unit increasing said first short circuiting current detection level to an increased first short circuiting current detection level so as to compensate any reduction of said first alternating DC voltage signal.

8. The two-wire controlling and monitoring system according to claim 7, further comprising a second time frame being defined in said second alternating DC voltage signal, within said second time frame of a first occurring second alternating DC voltage signal, said controller and power supply unit reducing said alternating DC current to said increased first short circuiting current detection level and measuring any reduction of said second alternating DC voltage signal, and within said second time frame of a succeeding second alternating DC voltage signal said controller and power supply unit increasing said increased first short circuiting current detection level to a second short circuiting current detection level so as to compensate any reduction of said second alternating DC voltage signal.

9. The two-wire controlling and monitoring system according to claim 7, wherein, during said first time frame, said controller and power supply unit are not transmitting said schedules of instructions to said third plurality of localized irrigation control units.

10. The two-wire controlling and monitoring system according to claim 8, wherein, during said second time frame, said controller arid power supply unit are not transmitting said schedules of instructions to said third plurality of localized irrigation control units.

11. The two-wire controlling and monitoring system according to claim 7, wherein said controller and power supply unit subsequently apply, during said first and second alternating DC voltage signals, said increased first short circuiting current detection level and said second short circuiting current detection level.

12. The two-wire controlling and monitoring system according to claim 7, wherein each of said third plurality of localized irrigation control units further comprises a line decoder having a pair of valve control outputs connected to said pair of valve control Inputs of a specific controllable irrigation valve of said first plurality of controllable irrigation valves for providing valve control signals to said first plurality of controllable irrigation valves, said line decoders further each having a pair of control and power supply inputs.

13. A two-wire controlling and monitoring system for irrigation of localized areas of soil comprising:

a water pipeline providing water to said localized areas of soil;

a plurality of controllable irrigation valves each positioned at a specific area of said localized areas of soil, communicating with said water pipeline, providing watering of said specific area controlled by said controlling and monitoring system and having a pair of valve control inputs;

a plurality of localized irrigation control units each comprising a line decoder having a pair of valve control outputs connected to said pair of valve control inputs of a specific controllable irrigation valve of said plurality of controllable irrigation valves for providing valve control signals to said plurality of controllable irrigation valves, said line decoders further each having a pair of control and power supply inputs;

a controller and power supply unit having a set of schedules of instructions and having a pair of control and power outputs supplying power by applying a first alternating DC voltage signal defining a voltage maximum having a first pulse width and defining a voltage minimum having a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a current maximum having a third pulse width and defining a current minimum having a fourth pulse width to said pair of control and power outputs;

a two-wire cable interconnecting said controller and power supply unit and said plurality of localized irrigation control units and connecting said pair of control and power outputs of said controller and power supply unit to said control and power inputs, of said plurality of localized irrigation control units and providing said power from said controller and power supply unit to each of said plurality of localized irrigation control units;

said controller and power supply unit transmitting said schedules of instructions to said plurality of localized irrigation control units through said two-wire cable and receiving said specific irrigation parameters from said plurality of localized irrigation control units through said two-wire cable; and a first time frame being defined in said first alternating DC voltage signal, and a first short circuit voltage signalling detection level being defined, within said first time frame said controller and power supply unit measuring a measuring level of said first alternating DC voltage signal for detecting any reduction of said first alternating DC voltage signal, and provided said measuring level of said first alternating DC voltage signal being below said first short circuit voltage signalling detection level, said first short circuit voltage signalling detection level being set below said measuring level of said first alternating DC voltage signal.

14. The two-wire controlling and monitoring system according to claim 13 further comprising a second time frame being defined in said second alternating DC voltage signal and a second short circuit voltage signalling detection level being defined, within said second time frame said controller and power supply unit measuring a measuring level of said second alternating DC voltage signal for detecting any reduction of said second alternating DC voltage signal, and provided said mesaging level of said second alternating DC voltage signal being below said second short circuit voltage signalling detection level, said second short circuit voltage signalling detection level being set below said measuring level of said second alternating DC voltage signal.

15. The two-wire controlling and monitoring system according to claim 13, wherein, during said first time frame, said controller and power supply unit are not transmitting said schedules of instructions to said plurality of localized irrigation control units.

16. The two-wire controlling and monitoring system according to claim 14, wherein, during said second time frame, said controller and power supply unit are not transmitting said schedules of instructions to said plurality of localized irrigation control units.

17. The two-wire controlling and monitoring system according to claim 13, wherein said controller and power supply unit subsequently apply, during said first and second alternating DC voltage signals, said first and second short circuiting voltage signalling detection levels.

18. The two-wire controlling and monitoring system according to claim 13, further comprising plurality of field sensors positioned at specific areas of said localized areas of soil, providing specific irrigation parameters and having a pair of sensor outputs, wherein said plurality of localized irrigation control units further comprises a sensor decoder having a pair of sensor inputs connected to said pair of sensor outputs of a specific field sensor of said plurality of field sensors for providing power to said plurality of field sensors and recording said specific irrigation parameters from said plurality of field sensors, said sensor decoders further each having a pair of control and power supply inputs.

19. A two-wire controlling and monitoring system for irrigation of localized areas of soil, comprising:

a water pipeline providing water to said localized areas of soil;

a plurality of controllable irrigation valves each positioned at a specific area of said localized areas of soil, communicating with said water pipeline, providing watering of said specific area of said localized areas controlled by said controlling and monitoring system of soil and having a pair of valve control inputs;

a plurality of field sensors positioned at specific areas of said localized areas of soil, providing specific irrigation parameters and having a pair of sensor outputs;

a plurality of localized irrigation control units each comprising a sensor decoder having a pair of sensor inputs connected to said pair of sensor outputs of a specific field sensor of said plurality of field sensors for providing power to said plurality of field sensors and recording said specific irrigation parameters from said plurality of field sensors, said sensor decoders further each having a pair of control and power supply inputs;

a controller and power supply limit having a set of schedules of instructions and having a pair of control and power outputs supplying power by applying a first alternating DC voltage signal defining a voltage maximum having a first pulse width and defining a voltage minimum having a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a current maximum having a third pulse width and defining a current minimum having a fourth pulse width to said pair of control and power outputs;

a two-wire cable interconnecting said controller and power supply unit and said plurality of localized irrigation control units and connecting said pair of control and power outputs of said controller and power supply unit to said control and power inputs of said plurality of localized irrigation control units and providing said power from said controller and power supply unit to each of said plurality of localized irrigation control units;

said controller and power supply unit transmitting said schedules of instructions to said plurality of localized irrigation control units through said two-wire cable and receiving said specific irrigation parameters from said plurality of localized irrigation control units through said two-wire cable; and a first time frame being defined in said first alternating DC voltage signal, and a first short circuit voltage signalling detection level being defined, within said first time frame said controller and power supply unit measuring a measuring level of said first alternating DC voltage signal for detecting any reduction of said first alternating DC voltage signal, and provided that said measuring level of said first alternating DC voltage signal is below said first short circuit voltage signalling detection level, said first short circuit voltage signalling detection level being set below said measuring level of said first alternating DC voltage signal.

20. The two-wire controlling and monitoring system according to claim 19, further comprising a second time frame being defined in said second alternating DC voltage signal, and a second short circuit voltage signalling detection level being defined within said second time frame, said controller and power supply unit measuring a measuring level of said second alternating DC voltage signal for detecting any reduction of said second alternating DC voltage signal, and provided that said measuring level of said second alternating DC voltage signal is below said second short circuit voltage signalling detection level, said second short circuit voltage signalling detection level being set below said measuring level of said second alternating DC voltage signal.

21. The two-wire controlling and monitoring system according to claim 19, wherein during said first time frame, said controller and power supply unit are not transmitting said schedules of instructions to said plurality of localized irrigation control unit.

22. The two-wire controlling and monitoring system according to claim 20, wherein, during said second time frame, said controller and power supply unit are not transmitting said schedules of instructions to said plurality of localized irrigation control units.

23. The two-wire controlling and monitoring system according to claim 19, wherein said controller and power supply unit subsequently apply, during said first and second alternating DC voltage signals, said first and second short circuiting voltage signalling detection levels.

24. The two-wire controlling and monitoring system according to claim 19, wherein each of said plurality of localized irrigation control units further comprises a line decoder having a pair of valve control outputs connected to said pair of valve control inputs of a specific controllable irrigation valve of said plurality of controllable irrigation valves for providing valve control signals to said plurality of controllable irrigation valves, said line decoders further each having a pair of control and power supply inputs.

25. A two-wire controlling and monitoring system for irrigation of localized areas of soil, comprising:
   a water pipeline providing water to said localized areas of soil;
   a plurality of controllable irrigation valves each positioned at a specific area of said localized areas of soil, communicating with said water pipeline, providing watering of said specific area controlled by said controlling and monitoring system and having a pair of valve control inputs;
   a plurality of localized irrigation control units each comprising a line decoder having a pair of valve control outputs connected to said pair of valve control inputs of a specific controllable irrigation valve of said plurality of controllable irrigation valves for providing valve control signals to said plurality of controllable irrigation valves, said line decoders further each having a pair of control and power supply inputs;
   a controller and power supply unit having a set of schedules of instructions and having a pair of control and power outputs supplying power by applying a first alternating DC voltage signal defining a voltage maximum having a first pulse width and defining a voltage minimum having a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a current maximum having a third pulse width and defining a current minimum having a fourth pulse width to said pair of control and power outputs;
   a two-wire cable interconnecting said controller and power supply unit and said plurality of localized irrigation control units and connecting said pair of control and power outputs of said controller and power supply unit to said control and power inputs of said plurality of localized irrigation control units and providing said power from said controller and power supply unit to each of said plurality of localized irrigation control units;
   said controller and power supply unit transmitting said schedules of instructions to said plurality of localized irrigation control units through said two-wire cable and receiving said specific irrigation parameters from said plurality of localized irrigation control units through said two-wire cable;
   a first time frame being defined in said first alternating DC voltage signal, within said first time frame of a first occurring first alternating DC voltage signal, said controller and power supply unit reducing said alternating DC current to a first short circuiting current detection level and measuring any reduction of said first alternating DC voltage signal, and within said first time frame of a succeeding first alternating DC voltage signal said controller and power supply unit increasing said first short circuiting current detection level to an increased first short circuiting current detection level so as to compensate any reduction of said first alternating DC voltage signal;
   a second time frame being defined in said second alternating DC voltage signal, within said second time frame of a first occurring second alternating DC voltage signal, said controller and power supply unit reducing said alternating DC current to said increased first short circuiting current detection level and measuring Buy reduction of said second alternating DC voltage signal, and within said second time frame of a succeeding second alternating DC voltage signal said controller and power supply unit increasing said increased first short circuiting current detection level to a second short circuiting current detection level so as to compensate any reduction of said second alternating DC voltage signal;
   a third time frame being defined in said first alternating DC voltage signal, and a first short circuit voltage signalling detection level being defined, within said third time frame, said controller and power supply unit measuring a measuring level of said first alternating DC voltage signal for detecting any reduction of said first alternating DC voltage signal, and provided that said measuring level of said first alternating DC voltage signal is below said first short circuit voltage signalling detection level, said first short circuit voltage signalling detection level being set below said measuring level of said first alternating DC voltage signal; and
   a fourth time frame being defined in said second alternating DC voltage signal, and a second short circuit voltage signalling detection level being defined, within said fourth time frame said controller and power supply unit measuring a measuring level of said second alternating DC voltage signal for detecting any reduction of said second alternating DC voltage signal, and provided that said measuring level of said second alternating DC voltage signal is below said second short circuit voltage signalling detection level, said second short circuit voltage signalling detection level being set below said measuring level of said second alternating DC voltage signal.

26. The two-wire controlling and monitoring system according to claim 25, wherein during said first and second time frames, said controller and power supply unit are not transmitting said schedules of instructions to said plurality of localized irrigation control units.

27. The two-wire controlling and monitoring system according to claim 25, wherein, during said third and fourth time frames, said controller and power supply unit are not transmitting said schedules of instructions to said plurality of localized irrigation control units.

28. The two-wire controlling and monitoring system according to claim 25, wherein said controller and power supply unit subsequently apply, during said first and second alternating DC voltage signals, said increased first short circuiting current detection level, said second short circuiting current detection level, and said first and second short circuit voltage signalling detection levels.

29. The two-wire controlling and monitoring system according to claim 25, further comprising a plurality of field sensors positioned at specific areas of said localized areas of soil, providing specific irrigation parameters and having a pair of sensor outputs, wherein said plurality of localized irrigation control units further comprises a sensor decoder having a pair of sensor inputs connected to said pair of sensor outputs of a specific field sensor of said plurality of field sensors for providing power to said plurality of field sensors and recording said specific irrigation parameters from said plurality of field sensors, and said sensor decoders further each having a pair of control and power supply inputs.

30. A two-wire controlling and monitoring system for irrigation of localized areas of soil, comprising:

a water pipeline providing water to said localized areas of soil;

a plurality of controllable irrigation valves each positioned at a specific area of said localized areas of soil, communicating with said water pipeline, providing watering of said specific area of said localized areas controlled by said controlling and monitoring system of soil and having a pair of valve control inputs; a plurality of field sensors positioned at specific areas of said localized areas of soil, providing specific irrigation parameters and having a pair of sensor outputs;

a plurality of localized irrigation control units each comprising a sensor decoder having a pair of sensor inputs connected to said pair of sensor outputs of a specific field sensor of said plurality of field sensors for providing power to said plurality of field sensors and recording said specific irrigation parameters from said plurality of field sensors, said sensor decoders further each having a pair of control and power supply inputs;

a controller and power supply unit having a set of schedules of instructions and having a pair of control and power outputs supplying power by applying a first alternating DC voltage signal defining a voltage maximum having a first pulse width and defining a voltage minimum having a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a current maximum having a third pulse width and defining a current minimum having a fourth pulse width to said pair of control and power outputs;

a two-wire cable interconnecting said controller and power supply unit and said plurality of localized irrigation control units and connecting said pair of control and power outputs of said controller and power supply unit to said control and power inputs of said plurality of localized irrigation control units and providing said power from said controller and power supply unit to each of said plurality of localized irrigation control units;

said controller and power supply unit transmitting said schedules of instructions to said plurality of localized irrigation control units through said two-wire cable and receiving said specific irrigation parameters from said plurality of localized irrigation control units through said two-wire cable;

a first time frame being defined in said first alternating DC voltage signal, within said first time frame of a first occurring first alternating DC voltage signal, said controller and power supply unit reducing said alternating DC current to a first short circuiting current detection level and measuring any reduction of said first alternating DC voltage signal, and within said first time frame of a succeeding first alternating DC voltage signal said controller and power supply unit increasing said first short circuiting current detection level to an increased first short circuiting current detection level so as to compensate any reduction of said first alternating DC voltage signal;

a second time frame being defined in said second alternating DC voltage signal, within said second time frame of a first occurring second alternating DC voltage signal, said controller and power supply unit reducing said alternating DC current to said increased first short circuiting current detection level and measuring any reduction of said second alternating DC voltage signal, and within said second time frame of a succeeding second alternating DC voltage signal said controller and power supply unit increasing said increased first short circuiting current detection level to a second short circuiting current detection level so as to compensate any reduction of said second alternating DC voltage signal;

a third time frame being defined in said first alternating DC voltage signal, and a first short circuit voltage signalling detection level being defined, within said third time frame said controller and power supply unit measuring a measuring level of said first alternating DC voltage signal for detecting any reduction of said first alternating DC voltage signal, and provided that said measuring level of said first alternating DC voltage signal is below said first short circuit voltage signalling detection level, said first short circuit voltage signalling detection level being set below said measuring level of said first alternating DC voltage signal, and a fourth time frame being defined in said second alternating DC voltage signal, and a second short circuit voltage signalling detection level being defined, within said fourth time frame said controller and power supply unit measuring a measuring level of said second alternating DC voltage signal for detecting any reduction of said second alternating DC voltage signal, and provided that said measuring level of said second alternating DC voltage signal is below said second short circuit voltage signalling detection level, said second short circuit voltage signalling detection level being set below said measuring level of said second alternating DC voltage signal.

31. The two-wire controlling and monitoring system according to claim 30, wherein, during said first and second time frames, said controller and power supply unit are not transmitting said schedules of instructions to said plurality of localized irrigation control units.

32. The two-wire controlling and monitoring system according to claim 30, wherein, during said third and fourth time frames, said controller and power supply unit are not transmitting said schedules of instructions to said plurality of localized irrigation control units.

33. The two-wire controlling and monitoring system according to claim 30, wherein said controller and power supply unit subsequently apply, during said first and second alternating DC voltage signals, said increased first short circuiting current detection level, said second short circuiting current detection level, and said first and second short circuit voltage signalling detection levels.

34. The two-wire controlling and monitoring system according to claim 30, wherein each of said plurality of localized irrigation control units further comprises a line decoder having a pair of valve control outputs connected to said pair of valve control inputs of a specific controllable irrigation valve of said plurality of controllable irrigation valves for providing valve control signals to said plurality of controllable irrigation valves, said line decoders further each having a pair of control and power supply inputs.

35. The two-wire irrigation controlling and monitoring system according to claim 30, wherein said voltage maximum is in a range from +10V to +20V.

36. The two-wire irrigation controlling and monitoring system according to claim 30, wherein said voltage minimum is in a range from −15V to −25V.

37. The two-wire irrigation controlling and monitoring system according to claim 30, wherein said first alternating DC voltage signal and said second alternating DC voltage signal, during said first pulse width and said second pulse width, have average voltages greater than or equal to zero voltage.

38. The two-wire irrigation controlling and monitoring system according to claim 30, wherein said first alternating DC voltage signal and said second alternating DC voltage signal, during said first pulse width and said second pulse width, have average voltages less than or equal to zero voltage.

39. The two-wire irrigation controlling and monitoring system according to claim 30, wherein said first alternating DC voltage signal and said second alternating DC voltage signal have, during said first pulse width and said second pulse width, an average voltage in the range −5V to −0.5V.

* * * * *